United States Patent [19]

Tagami

[11] 4,411,519
[45] Oct. 25, 1983

[54] METHOD OF AND SYSTEM FOR MEASURING TEMPERATURE AND SPECTRAL FACTOR

[75] Inventor: Ichizo Tagami, Hachioji, Japan

[73] Assignee: Ishikawajima-Harima Heavy Industries Co., Ltd., Tokyo, Japan

[21] Appl. No.: 181,745

[22] Filed: Aug. 27, 1980

[30] Foreign Application Priority Data

| | | | |
|---|---|---|---|
| Aug. 28, 1979 | [JP] | Japan | 54-109346 |
| Sep. 15, 1979 | [JP] | Japan | 54-118330 |
| May 29, 1980 | [JP] | Japan | 55-71780 |
| Jun. 2, 1980 | [JP] | Japan | 55-73908 |
| Jun. 16, 1980 | [JP] | Japan | 55-81057 |
| Jun. 30, 1980 | [JP] | Japan | 55-88844 |

[51] Int. Cl.$^3$ .................... G01J 5/60; G01N 21/27
[52] U.S. Cl. ........................... 356/45; 356/406
[58] Field of Search ............ 356/43, 45, 406, 418; 73/355, 355 EM

[56] References Cited

U.S. PATENT DOCUMENTS

| | | | |
|---|---|---|---|
| 3,654,809 | 4/1972 | Worden et al. | 356/43 |
| 3,922,550 | 11/1975 | Crowley et al. | 73/355 EM |
| 4,061,428 | 12/1977 | Amano et al. | 356/418 |
| 4,278,349 | 7/1981 | Sander | 356/45 |
| 4,319,830 | 3/1982 | Roach | 355/1 |

OTHER PUBLICATIONS

Tskhai, N. S. "Spectral Method of Determining the Emissivity of Hot Surfaces", Jr. of App. Spectrosc. (USA), vol. 27, #3, 9-1977, published 3-1978, pp. 1111–1115.

*Primary Examiner*—William H. Punter
*Attorney, Agent, or Firm*—Irving M. Weiner; Pamela S. Burt; John L. Shortley

[57] ABSTRACT

Methods and systems for measuring the temperature and spectral factors of a number of specimens (or radiators). The radiant flux from the specimens are spectrally analyzed with respect to effective wavelengths from M different channels (M being greater than or equal to 3). A relation among the spectral radiant flux intensity, approximated spectral factor (depending only on wavelength) and the temperature is determined for each channel by using Planck's radiation law with the condition that a relation $N+K=M$ is kept among M of the number of channels, N of the number of specimens with unknown temperature values and K of the number of unknown terms of the approximated spectral factor of the specimens. Strict algebraic development of such relation is employed to cancel out all of the unknown terms of the spectral factor to obtain a one-dimensional equation concerning the sole temperature. Such equation is solved to determine the temperature of the specimens, and the spectral factor of the specimens is obtained from the determined temperature values and the aforesaid relation.

10 Claims, 32 Drawing Figures

METHOD OF AND SYSTEM FOR MEASURING TEMPERATURE AND SPECTRAL FACTOR

FIELD OF THE INVENTION

This invention relates to methods of measuring the temperature and spectral factors of specimens and also to systems for carrying out the same.

In accordance with the invention, the radiant flux from N (N≧1) radiators or specimens are spectrally analyzed with respect to M (M≧3) channels (i.e., frequency bands). In each channel, a relation among the spectral radiant flux intensity, approximated spectral factor depending only on wave length and temperature is settled using Planck's radiation law with the condition that a relation N+K=M is kept among M of the number of channels, N of the number of specimens of unknown temperature values and K of the number of unknown terms of the approximated spectral factor of the specimens. The unknown terms of the spectral factor are all cancelled out through strict algebraic development of the aforementioned relation to obtain a one-dimensional equation concerning the sole temperature, and the one-dimensional equation for the sole temperature is solved by using the spectral radiant flux intensity values of each channel, etc. The spectral radiant flux intensities are fed into an analog computer or a digital computor to obtain the measured values of the temperature of the specimens, and the spectral factor of the specimens is obtained from the obtained measured values of temperature and the aforementioned relation.

BACKGROUND OF THE INVENTION

The features of the method of and system for measuring the temperature and spectral factors are (1) that no preliminary data concerning the spectral factors in accordance with the invention of the specimen is required, (2) that the temperature and spectral factor (involving both value and color) can be measured at the same time, (3) that it is thus not necessary to regard the spectral factor as a function of temperature although actually it is a function of wavelength and temperature, (4) that the aforementioned one-dimensional equation for obtaining the temperature would not become complicated even if the number of channels were to be increased, and (5) that while when analyzing the radiant flux into M channels the spectral flavor expressed as a function of wavelength should be represented as having M×N possible values, which would give an exact value of spectral factor with respect to the overall specimens, because the spectral factor of each specimen has M possible values respectively (i.e. if the spectral factor $\epsilon_i$ for an i-th channel with respect to the n-th specimen can be $\epsilon_{n1}, \epsilon_{n2}, \ldots, \epsilon_{nM}$ for the M analyzed channels), the possible value of the spectral factor is approximated into M−N (N=1 in the case of only one specimen), however no approximation is involved in the deduction process of the equation. Therefore, the accuracy of the solution of the one-dimensional equation, (i.e. value measured) is high.

The spectral factors which are dealt with in the invention include not only the spectral emittance but also spectral reflectance and spectral transmittance which are values representing physical properties of the specimen, other factors such as those representing the surface roughness, shape and area of the specimen, positional relation between the specimen and measuring instrument, state of light path between the specimen and measuring instrument, etc. Further, a composite factor regarding the combination of the emittance, reflectance and transmittance may be included. There is no relation between the emittance $\epsilon$ and reflectance $\rho$, and the invention can be applied to the case even where $\epsilon + \rho \neq 1$.

Now, the comparison between a prior-art system and the system according to the invention will be made in connection with the case of measuring the temperature and spectral factor by spectrally analyzing the radiant flux from a single specimen (N=1) into several channels without using preliminary data concerning the spectral factor.

(a) One-channel measuring system: This system corresponds to the prior-art brightness temperature measurement. With this system, there is no freedom for the measurement of the spectral factor, so that it can be adopted only where the specimen is a blackbody. According to the invention, this system is avoided.

(b) Two-channel measuring system: This system corresponds to the prior-art distributed temperature measurement. With this system, the freedom for measuring the spectral factor is 1, and the extent of gray of the specimen (i.e., value-wise character) can be obtained. In other words, when expressing spectral factor as a function of the wavelength, the spectral factor is obtained as a constant term in the function. This system is not adopted according to the invention. In contrast, according to the invention, a method is employed in which a plurality of combinations of two channels are produced by appropriately selecting two of three or more spectral radiant flux channels, the temperature and gray spectral factor are obtained for each of the two-channel combinations by using a two-channel measuring system (based upon the principles of the two-color spectrophotometric pyrometer), and the gray factor is corrected to a color-including spectral factor such that an equal temperature is obtained for all of the two-channel combinations, which system is dissimilar to the two-channel measuring system.

(c) Three-channel measuring system: This system has not hitherto been proposed, that is, it is first adopted according to the invention. In this system, there are two possibilities for the measurement of the spectral factor, and the extent of gray of the specimen and way of presentation of color (i.e., a character resembling the value and hue) are obtained. For example, when expressing the spectral factor as a high-degree polynomial of wavelength, the constant term (factor of zero-degree term) and factor of the first-degree term can be obtained.

(d) M-channel (M≧3) measuring system: In this system, there are M−1 possibilities for the measurement of the spectral factor, and the extent of gray of the specimen, way of presentation of color and extent of partialness of color (a character resembling the value, hue and chroma) can be obtained. For example, the spectral factor can be expressed as an (M−2)-th degree polynomial of the wavelength.

SUMMARY OF THE INVENTION

The method of the present invention is an advanced technique wherein if the spectral factor is expressed as a high-degree polynomial of wavelength and M=1 is inserted in the one dimensional equation by which the value of temperature of the specimen can be obtained, the prior-art equation of brightness temperature measurement, or if M=2 is inserted instead of M=1 as mentioned above, the prior-art equation of distributed temperature measurement is arrived at. Thus, the equation of this invention is universal and involves prior-art equations.

The primary object of the invention is to provide a method of and a system for measuring the temperature and spectral factor of N different specimens, without the restrictions inherent in the prior-art measuring system, by obtaining electrical detected values of spectra of the radiant fluxes from the N different specimens received as a single radiant flux, effective wavelengths of the spectra comprising 2N colors in a particular wavelength relation to one another, by solving an equation $$\sum_{n=1}^{N} \epsilon_n U_n^{\frac{1}{\lambda i}} = Y_i (i = 1, 2, 3, \ldots 2N - 1)$$

(where $\epsilon_n$ is the typical spectral factor of the N specimens regarded as graybodies, $$U_n = \exp\left(\frac{-C_2}{T_n}\right), Y_i = \frac{X_i \cdot \lambda_i^5}{g_i \cdot C_1},$$

$T_n$ is the typical temperature of the N specimens, $g_i$ is the spectral gain at the effective wavelength $\lambda_i$, $C_1 = 3.74150 \times 10^{-16}$ w.m², $C_2 = 1.43879 \times 10^{-2}$ m.deg.) using the aforementioned particular wavelength relation to obtain the temperature for each specimen and by obtaining the spectral factor from the obtained temperature value.

A second object of the invention is to provide a method of and a system for precisely measuring the temperature and spectral factor of N different specimens, without the restrictions inherent in the prior-art measuring system, by obtaining electrical detected values of spectra of the radiant fluxes from the N different specimens received as a single radiant flux with respect to the effective wavelengths for 2N of M (M≧2 N) colors in a particular wavelength relation to one another by solving an equation $$\sum_{n=1}^{N} \epsilon_n U_n^{\frac{1}{\lambda i}} = Y_i (i = 1, 2, 3, \ldots 2N - 1)$$

(where $\epsilon_n$ is the typical spectral factor of the N specimens regarded as graybodies, $$U_n = \exp\frac{-C_2}{T_n}, Y_i = \frac{X_i \cdot \lambda_i^5}{g_i \cdot C_1},$$

$T_n$ is the typical temperature of the N specimens, $g_i$ is the gain at the effective wavelength $\lambda_i$, $C_1 = 3.74150 \times 10^{-16}$ w.m.² and $C_2 = 1.43879 \times 10^{-2}$ m.deg.) using the aforementioned particular wavelength relation to obtain the temperature and spectral factor for each specimen, and by checking whether or not the theoretical analyzed radiation converges to the detected value using the obtained temperature and spectral factor as initial values to thereby obtain the precise measurements of the temperature and spectral factor of the specimens.

A third object of the invention is to provide a method of and a system for measuring the temperature and spectral factor of a single specimen in temperature radiation without using any particular illumination light source for estimating the spectral factor through measurement and also without giving any condition that may constitute restrictions upon the measurement with respect to the specimen (such as integrating sphere, flat plate etc.) by using electrical detection values obtained for m colors and approximate values of spectral function of the effective wavelength containing m−1 unknown terms, thereby obtaining the temperature, while also solving for the unknowns contained in the approximation formula describing the spectral factor with respect to the effective wavelength to thereby obtain the spectral factor.

A fourth object of the invention is to provide a method of and an apparatus for measuring the temperature and spectral factor by producing combinations of data of two channels appropriately selected from three or more spectral channels obtained by spectrally separating the radiant flux from a specimen, by obtaining the temperature and gray factor for each combination respectively using the principles of the two-color spectrophotometric pyrometer, and by correcting the gray factor to a color-including spectral factor such that an equal temperature is obtained for all of the combinations. Thereby, the temperature and spectral factor of the specimen is obtained, and accurate measurement is permitted even when the temperature or spectral factor of the specimen instantaneously varies. Thus, measurements by scanning or measurements of moving specimens in a production line where various products are transported therealong are permitted, while at the same time permitting the measurement of the temperature and state of coloring of a colored object without any preliminary knowledge or experimental preparations for the measurement. Measurement of the temperature of fused portions in continuous arc welding may thus be made, while emitting testing of the design and reliability regarding the instrument, since the instrument adopts the principles of the well-known two-color spectrophotometric pyrometer.

A fifth object of the invention is to provide a method and an apparatus which permits measurement of the temperature and spectral factor by eliminating the effects of thermal radiation from ambient substances or of illumination light, if any, introduced into the radiant from the specimen incident on the instrument, thus permitting, for example: measurement of the temperature of clouds in daytime, measurement of the temperature of the matter in a vacuum heat treatment furnace, measurement of the temperature and spectral factor of the product flowing under illumination light along a production line for the purpose of quality control and measurement of the temperature of the outer wall of a rotary cement kiln irrespective of whether solar radiation is present or not.

A sixth object of the invention is to provide a multichannel radiation measuring system which permits multiple measurement points to be obtained with a single measuring unit by leading the radiant fluxes from a number of radiators or specimens under measurement to a single point through optical fibers, thus permitting central control of quality, reduction of the installation cost, improvement of duty service efficiency and improvement of the measuring performance as well as permitting effective time control through rapid scanning of the individual radiant fluxes for measurement and also permitting increase of the capacity of light information by spectral multiplication of optical signals on each optical fiber.

A seventh object of the invention is to provide a spectrophotometric system in which the relationship among the wavelengths of the spectra can be maintained with one interference film filter, thus permitting reduction of the number of expensive interference film filters employed and also facilitating the quality control of the interference film filter, as well as permitting reduction of the effects of the drift of the wavelengths of each channel upon the accuracy of the measurement because the drift of each channel takes place in the same direction. Therefore, wavelength ratios between each channel are invariant.

DETAILED DESCRIPTION OF PREFERRED EMBODIMENTS

Figure 1:
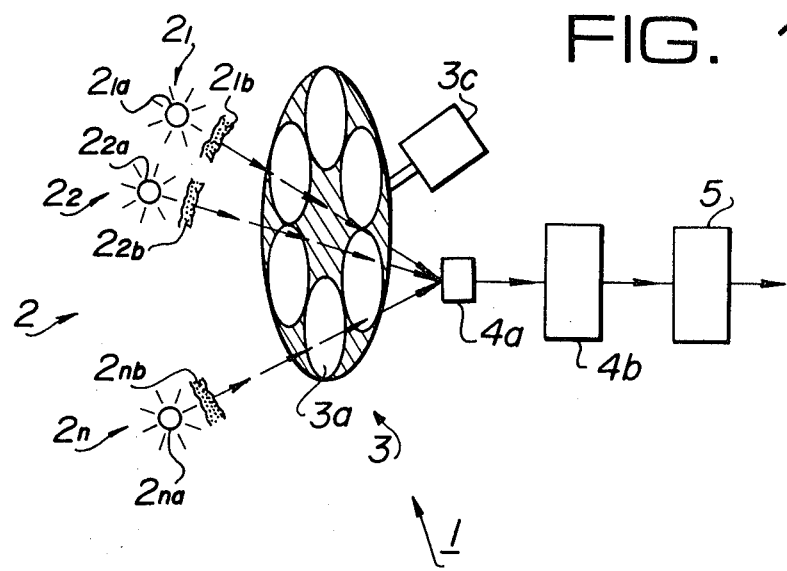
FIG. 1 shows a first embodiment of the system according to the invention.

The invention will first be described in connection with its application to the measurement of two or more different specimens or radiators (for instance light sources). Where there are two or more different specimens, the greater the number N the less will be the number K, so that the freedom of expressing the spectral factor of each specimen is decreased, and the approximation to the spectral factor is less accurate.

According to the invention, each specimen radiator is approximated by a graybody, the measurement is made within a wavelength range within which Wien's equation for radiation holds, and a particular relationship among the wavelengths of the individual spectral channel is established. The obtained spectral radiant flux intensities are used to solve an equation containing one unknown value of the temperature, and the obtained temperature and measured values are used to obtain the density of gray regarding the spectral factor.

Further, if it is desired to take the color of the specimen into consideration without providing any particular relationship among the individual channels of effective wavelengths, multi-unknown simultaneous equations regarding the temperature and spectral factor are solved by numerical calculations using the obtained temperature and spectral factor gray extent as reference values, thus obtaining both the temperature and the spectral factors indicating color of the specimen.

Prior to describing the first three embodiments of the system according to the invention, the measuring method that is implemented by these systems will first be described to facilitate the understanding of these systems.

For the measuring method according to the invention, either an approximate measuring method or a precise measuring method can be used.

In the approximate measuring method (which is referred to as N-graybody 2N-color spectrophotometric method as will be made apparent hereinafter), radiant fluxes from N different radiating specimens, for instance N light sources, at respective temperatures $T_1, T_2, \ldots, T_N$ and with respective spectral factor values $\epsilon_1, \epsilon_2, \ldots, \epsilon_N$ incident as a single radiant flux upon the measurement apparatus. This single radiant flux is spectrally separated with respect to the effective wavelengths into 2N different colors by setting a relation regarding the wavelengths such that $$\frac{1}{\lambda_i} - \frac{1}{\lambda_i + 1} = c \text{ (constant)} \tag{101}$$

where $i = 1, 2, \ldots, 2N - 1$, always holds with respect to consecutive effective wavelengths. The spectral radiant flux are converted into electric values $X_1, X_2, \ldots, X_{2N}$. If Wien's radiation law is to be used for calculating the spectral radiant emission of the perfect blackbody, denoting the spectral gain at each of the effective wavelengths $\lambda_i$ in the process of the spectral analysis and electric conversion by $g_1, g_2, \ldots, g_{2N}$, the detection value $X_i$ is given as $$X_i = g_i C_1 \lambda_i^{-5} \sum_{n=1}^{N} \epsilon_n \exp \frac{-C_2}{\lambda_i T_n} \tag{102}$$

where $C_1 = 3.74150 \times 10^{-16}$ W.m$^2$, $C_2 = 1.43879 \times 10^{-2}$ m.deg., $i = 1, 2, 3, \ldots, 2N$, and $T_n$ and $\epsilon_n$ are respectively the temperature and spectral emissivity of the typical light source.

Substitution of equations $$Y_i = \frac{X_i \lambda_i^5}{g_i C_1} \tag{103}$$

where $i = 1, 2, 3, \ldots, 2N$, and $$U_n = \exp \frac{-C_2}{T_n} \tag{104}$$

where $n = 1, 2, \ldots, N$, into equation (102) yields $$\sum_{n=1}^{N} \epsilon_n U_n^{\frac{1}{\lambda_i}} = Y_i \tag{102A}$$

where $i = 1, 2, 3, \ldots, 2N$.

In equation (102A), $\epsilon_n$ and $U_n$ are symmetrical with respect to one another, that is, interchanging the order of N light sources gives the same mathematical model. Thus, the correspondence of the roots obtained by solving equation (102A), i.e., the values of temperature and spectral emissivity, to the light sources should be appropriately determined.

By using the relation of equation (101) for the set of 2N-unknown simultaneous irrational equations expressed as equation (102A), the temperature and spectral emittance can be obtained using simple equations to be described below.

From equation (101) the portion $z_n$ of the exponential function of the ratio of the spectral radiant flux emission of the n-th light source representing N light sources with respect to adjacent wavelengths is $$Z_n = \exp \frac{-C_2 C}{T_n} \tag{105}$$

Also, regarding equation (102A) there exist the following N-unknown simultaneous equations for giving each z in equation (105).

$$\frac{\sum_{k=1}^{N} A_k Y_{n+k}}{\sum_{k=1}^{N} A_k Y_{n-1+k}} = \frac{1}{z} \tag{106}$$

where $A_k$ ($k = 1, 2, \ldots, N$) is a function of z, and $n = 1, 2, \ldots, N$.

For $N = 1$, equation (106) can be $$\frac{Y_1}{Y_2} = z \tag{106-1}$$

so that z can be directly obtained.

For $N \geq 2$, by solving the first $N - 1$ relations ($n = 1, 2, \ldots, N - 1$) of equation (106) as $N - 1$ dimensional simultaneous equations with $A_k/A_1$ ($k = 2, 3, \ldots, N$) as the unknowns, substituting the solution into the last relation of equation (106), i.e., the equation for $n = N$, and rearranging the result by using the formula regarding the determinant, equation (107) involving an $(N+1)$-th degree determinant is obtained.

$$\begin{vmatrix} z^N & z^{N-1} \cdots z & 1 \\ Y_2 & Y_2 \cdots Y_N & Y_{N+1} \\ Y_2 & Y_3 \cdots Y_{N+1} & Y_{N+2} \\ \vdots & \vdots \quad \vdots & \vdots \\ Y_N & Y_{N+1} \cdots Y_{2N-1} & Y_{2N} \end{vmatrix} = 0 \tag{107}$$

The elements in the first row in equation (107) give z in equation (105), stated as $$Z = \exp \frac{-C_2 C}{T}$$

thus making the sole temperature T to be unknown. $Y_i$ contained in the individual rows other than the first row in the determinant of the left side of equation (107) is determined if the detection value $X_i$ given by equation (103) is input. Thus, the input of the detection value $X_i$ equation (107) regarding z is reduced to a single one-dimensional N-th degree equation, which can be readily solved either analog-wise or digitally to obtain the value of Z.

The N roots of equation (107) are $z_1, z_2, \ldots, z_N$ expressed by equation (105). To solve equation (107), algebraic solution is applied up to $N = 3$, and numerical calculations are used for $N \geq 4$ as will be seen.

Thus, by substituting the root $z_n$ obtained by solving equation (107) into an equation $$T_n = \frac{-C_2}{l_n z_n} \left( \frac{1}{\lambda_1} - \frac{1}{\lambda_2} \right) \tag{105A}$$

where n = 1, 2, ..., N, which is obtained by transforming equation (105), the temperature $T_n$ of the n th of N light sources can be obtained.

Substitution of $T_n$ obtained in the above way into equation (104) permits $U_n$ to be obtained. Substitution of $U_n$ into N equations suitably derived from equation (102A) yields the following set of N dimensional first-degree simultaneous equations with $\epsilon_n$ (n=1, 2, ..., N) as unknown.

$$\sum_{n=1}^{N} \epsilon_n U_n^{\frac{1}{\lambda_i}} = Y_i \tag{108}$$

where $U_n$ represents the numeral values obtained in the above way.

Thus, equation (108) can be solved by Cramer's method, and $\epsilon_n$ can be obtained as the following equation $$\epsilon_n = \frac{|D_n|}{|D_O|} \tag{109}$$

where $|D_O|$ is, for instance when deriving N equations in the selection of equation (108) from equation (102A), the combination of $(\lambda_1, \lambda_2, ..., \lambda_N)$ and $Y_1, Y_2, ..., Y_N$), namely $$|D_O| = \begin{vmatrix} U_1^{\frac{1}{\lambda_1}} & U_2^{\frac{1}{\lambda_1}} & \cdots & U_N^{\frac{1}{\lambda_1}} \\ U_1^{\frac{1}{\lambda_2}} & U_2^{\frac{1}{\lambda_2}} & \cdots & U_N^{\frac{1}{\lambda_2}} \\ \vdots & \vdots & & \vdots \\ U_1^{\frac{1}{\lambda_N}} & U_2^{\frac{1}{\lambda_N}} & \cdots & U_N^{\frac{1}{\lambda_N}} \end{vmatrix} \tag{110}$$

and $|D_n|$ is the result of substitution of $Y_1, Y_2, ..., Y_N$ for n-th column in $|D_O|$, namely $$|D_n| = \begin{vmatrix} U_1^{\frac{1}{\lambda_1}} & U_2^{\frac{1}{\lambda_1}} & \cdots & Y_1 & \cdots & U_N^{\frac{1}{\lambda_1}} \\ U_1^{\frac{1}{\lambda_2}} & U_2^{\frac{1}{\lambda_2}} & \cdots & Y_2 & \cdots & U_N^{\frac{1}{\lambda_2}} \\ \vdots & \vdots & & \vdots & & \vdots \\ U_1^{\frac{1}{\lambda_N}} & U_2^{\frac{1}{\lambda_N}} & \cdots & Y_N & \cdots & U_N^{\frac{1}{\lambda_N}} \end{vmatrix} \tag{111}$$

The case of measuring the temperature and spectral emissivity by spectrally separated radiant fluxes from three graybody light sources into six colors with a spectrophotometric system set to satisfy the condition of equation (101) will now be described.

From the electrical detection value $X_i$ for each spectral radiant flux, effective wavelength $\lambda_i$, spectral gain $g_i$ and $C_1$, $Y_i$ (i=1, 2, ..., 6) for each effective wavelength is obtained using equation (103).

Even in this case, equation (107) holds because the spectrophotometric system is set to meet the condition of equation (101), and N=3 is set in equation (107). Expansion of the left side of equation (107) yields $$Pz^3 + Qz^2 + Rz + S = 0 \tag{112}$$

where the coefficients of each term are $$P = Y_4(Y_3Y_5 - Y_4^2) + Y_5(Y_3Y_4 - Y_2Y_5) + Y_6(Y_2Y_4 - Y_3^2) \tag{113}$$

$$Q = -Y_1(Y_4Y_6 - Y_5^2) - Y_2(Y_4Y_5 - Y_5Y_6) - Y_3(Y_3Y_5 - Y_4^2) \tag{114}$$

$$R = Y_4(Y_2Y_4 - Y_3^2) + Y_5(Y_2Y_3 - Y_1Y_4) + Y_6(Y_1Y_3 - Y_2^2) \tag{115}$$

and $$S = -Y_1(Y_3Y_5 - Y_4^2) - Y_2(Y_3Y_4 - Y_2Y_5) - Y_3(Y_2Y_4 - Y_3^2) \tag{116}$$

Equation (112) is a three-degree equation, so that three roots can be obtained from it by using Cardano's formula or other formulas. From these roots and equation (105A) the measured value of temperature can be obtained.

From the measured temperature, $U_i$ (i=1, 2, ..., 6) can be obtained using equation (104), and the measured value of spectral emissivity can be obtained using equation (109).

While in the above description it is assumed that equation (106) for developing equation (107) holds, the fact that equation (106) actually holds will be shown.

From equation (102A) the following equation can be obtained $$\epsilon_1 U_1^{\frac{1}{\lambda_i}} + \epsilon_2 U_2^{\frac{1}{\lambda_i}} + \epsilon_3 U_3^{\frac{1}{\lambda_i}} = Y_i \tag{117}$$

where i=1, 2, ..., 6.

By setting equal the roots $\epsilon_1$, $\epsilon_2$ and $\epsilon_3$ obtained by solving three dimensional first-degree simultaneous solutions representing the relations of equation (117) for i=1, 2 and 3 for $\epsilon_1$, $\epsilon_2$ and $\epsilon_3$ and the roots $\epsilon_1$, $\epsilon_2$ and $\epsilon_3$ obtained by solving three dimensional first-degree simultaneous equations representing the relations of equation (117) for i=2, 3 and 4 for $\epsilon_1$, $\epsilon_2$ and $\epsilon_3$, for instance setting equal the roots $\epsilon_1$, the following equation is obtained $$\frac{1}{z_1} = \frac{Y_2 - Y_3(z_2 + z_3) + Y_4 z_2 z_3}{Y_1 - Y_2(z_2 + z_3) + Y_3 z_2 z_3} \tag{118-$\epsilon_1$}$$

Similarly, by setting the root $\epsilon_1$ among the roots $\epsilon_1$, $\epsilon_2$ and $\epsilon_3$ obtained by solving the relations of equation (117) for i=2, 3 and 4 as three dimensional first-degree simultaneous equations for $\epsilon_1$, $\epsilon_2$ and $\epsilon_3$ and the root $\epsilon_1$ among the roots $\epsilon_1$, $\epsilon_2$ and $\epsilon_3$ obtained by solving the relations of equation (117) for i=3, 4 and 5 as three dimensional first-degree simultaneous equations for $\epsilon_1$, $\epsilon_2$ and $\epsilon_3$, the following equation is obtained $$\frac{1}{z_1} = \frac{Y_3 - Y_4(z_2 + z_3) + Y_5 z_2 z_3}{Y_2 - Y_3(z_2 + z_3) + Y_4 z_2 z_3} \tag{119-$\epsilon_1$}$$

Likewise, by setting equal the root $\epsilon_1$ among the roots $\epsilon_1$, $\epsilon_2$ and $\epsilon_3$ obtained by solving the relation of equation (117) for i=3, 4 and 5 and the root $\epsilon_1$ among the roots $\epsilon_1$, $\epsilon_2$ and $\epsilon_3$ obtained by solving the relations of equation (117) for i=4, 5 and 6 as three dimensional first-degree simultaneous equations for $\epsilon_1$, $\epsilon_2$ and $\epsilon_3$ the following equation is obtained $$\frac{1}{z_1} = \frac{Y_4 - Y_5(z_2 + z_3) + Y_6 z_2 z_3}{Y_5 - Y_4(z_2 + z_3) + Y_5 z_2 z_3} \quad (120\text{-}\epsilon_1)$$

It will be seen from equations (118-$\epsilon_1$), (119-$\epsilon_1$) and (120-$\epsilon_1$) that $z_2$ and $z_3$ can be expressed as functions of $z_1$. Denoting the functions of $z_1$ as $A_2/A_1$ and $A_3/A_1$, they are expressed as $$-(z_2 + z_3) = \frac{A_2}{A_1} \quad (121)$$

and $$z_2 z_3 = \frac{A_3}{A_1} \quad (122)$$

By substituting equations (121) and (122) into equations (118-$\epsilon_1$), (119-$\epsilon_1$) and (120-$\epsilon_1$) and rearranging $$\frac{Y_2 A_1 + Y_3 A_2 + Y_4 A_5}{Y_1 A_1 + Y_2 A_2 + Y_3 A_3} = \frac{Y_3 A_1 + Y_4 A_2 + Y_5 A_3}{Y_2 A_1 + Y_3 A_2 + Y_4 A_3} = \quad (123)$$

$$\frac{Y_4 A_1 + Y_5 A_2 + Y_6 A_3}{Y_3 A_1 + Y_4 A_2 + Y_5 A_3} = \frac{1}{z_1}$$

Since equation (117) is a symmetrical equation, the same form of equations as equation (123) can also be obtained for $z_2$ and $z_3$. In other words, roots representing the same value can be obtained by solving anyone of $z_1$, $z_2$ and $z_3$. Equation (123) represents the case where k and n in equation (106) are 1, 2 and 3.

As has been described in connection with the process of deriving equations (118-$\epsilon_1$), (119-$\epsilon_1$) and (120-$\epsilon_1$), $\epsilon_1$, $\epsilon_2$ and $\epsilon_3$ can be calculated by either one of combinations comprising three out of n=1, 2, ..., 6.

While in the above case equation (112) for obtaining z is developed under the assumption that equation (107) holds, it is possible to obtain z without the assumption that equation (107) holds.

By setting equal the root $\epsilon_2$ among the roots $\epsilon_1$, $\epsilon_2$ and $\epsilon_3$ obtained by solving the relations of equation (117) for i=1, 2 and 3 as three-dimensional first-degree simultaneous equations for $\epsilon_1$, $\epsilon_2$ and $\epsilon_3$ and the root $\epsilon_2$ among the roots $\epsilon_1$, $\epsilon_2$ and $\epsilon_3$ obtained by solving the relations of equation (117) for i=2, 3 and 4 as three-dimensional first-degree simultaneous equations for $\epsilon_1$, $\epsilon_2$ and $\epsilon_3$, there is obtained $$\frac{1}{z_2} = \frac{Y_2 - Y_3(z_3 + z_1) + Y_4 z_3 z_1}{Y_1 - Y_2(z_3 + z_1) + Y_3 z_3 z_1} \quad (124\text{-}\epsilon_2)$$

By setting equal the root $\epsilon_2$ among the roots $\epsilon_1$, $\epsilon_2$ and $\epsilon_3$ obtained by solving the relations of equation (117) for i=3, 4 and 5 as three-dimensional first-degree simultaneous equations for $\epsilon_1$, $\epsilon_2$ and $\epsilon_3$ and the root $\epsilon_2$ among the roots $\epsilon_1$, $\epsilon_2$ and $\epsilon_3$ obtained by solving the relations of equation (117) for i=3, 4 and 5 as three-dimensional first-degree simultaneous equations for $\epsilon_1$, $\epsilon_2$ and $\epsilon_3$, there is obtained $$\frac{1}{z_2} = \frac{Y_4 - Y_5(z_3 + z_1) + Y_6 z_3 z_1}{Y_3 - Y_4(z_3 + z_1) + Y_5 z_3 z_1} \quad (125\text{-}\epsilon_2)$$

Setting equal equations (124-$\epsilon_2$) and (125-$\epsilon_2$) to eliminate $z_2$ and rearranging yields $$A_1 z_3^2 + A_2 z_3 + A_3 = 0 \quad (126)$$

where the coefficients of each term are $$A_1 = (Y_4 Y_5 - Y_3 Y_6) z_1^2 + (Y_2 Y_6 - Y_4^2) z_1 + (Y_3 Y_4 - Y_2 Y_5) \quad (127)$$

$$A_2 = (-Y_4^2 + Y_2 Y_6) z_1^2 + (2 Y_3 Y_4 - Y_2 Y_5 - Y_1 Y_6) z_1 + (Y_1 Y_5 - Y_3^2) \quad (128)$$

and $$A_3 = (Y_3 Y_4 - Y_2 Y_5) z_1^2 + (-Y_3^2 Y_1 Y_5) + (Y_2 Y_3 - Y_1 Y_4) \quad (129)$$

Similar to the process of developing equation (126) by setting equal equations (124-$\epsilon_2$) and (125-$\epsilon_2$) obtained by eliminating $\epsilon_2$, corresponding equations (124-$\epsilon_3$) and (125-$\epsilon_3$) (not shown) obtained by eliminating $\epsilon_3$ are set equal, followed by rearrangement. In this way, relations concerning $z_1$ and $z_2$ are obtained. This equation is obtainable by substituting $z_2$ for $z_3$ in equation (126). This is the natural consequence of the fact that equation (117) is a symmetrical equation with respect to $U_2$ and $U_3$. Thus, the roots of equation (126) solved for $z_3$ are $z_2$ and $z_3$.

Further, $A_1$, $A_2$ and $A_3$ given by the respective equations (127), (128) and (129) are functions of $z_1$, while the relations of the roots and coefficients of equation (126) stipulates that $A_1$, $A_2$ and $A_3$ coincide respectively with $A_1$, $A_2$ and $A_3$ of equations (121) and (122). Thus, $z_1$, $z_2$ and $z_3$ can be obtained even without having resort to equation (107).

While the foregoing description has concerned the method of measuring the temperature and spectral emissivity by assuming the specimens or radiators as graybodies (i.e., N-graybody 2N-color spectrophotometry), the precise measuring method based on multi-color analysis, in which the measured values obtained by the above method are used as approximate values (or initial values) with which to make precise measurements, will now be shown.

In the precise measuring method based upon multi-color spectral analysis, the radiant fluxes from N different radiators, which are received as a single radiant flux, are spectrally separated with respect to effective wavelengths for M (M≧2N) different colors. Of these effective wavelengths, the channels for those for 2N colors are made under the assumption that there holds the same effective wavelength condition as with the N-graybody 2N-color spectrophotometry, i.e., the condition of equation (101).

The temperature and spectral emissivity of the n-th of N different specimens or radiators (for instance light sources) are denoted respectively by $T_n$ and $\epsilon_n$, and it is assumed that $\epsilon_n$ is expressed as a $K_n$-th degree polynomial concerning the wavelength $\lambda$, namely $$\epsilon_n = \sum_{k=0}^{K_n} A_{nk} \lambda^k \quad (130)$$

where n=1, 2, ..., N, $A_{nk}$ is an unknown factor independent of $\lambda$, and the effective wavelength $\lambda$ is a variable and can take values $\lambda_1, \lambda_2, \ldots, \lambda_M$.

The spectrophotometric system is constructed such that the number M of channels is $$M = \sum_{n=1}^{N} K_n + 2N \tag{131}$$

Each of the spectral radiant flux is converted into a corresponding electrical value $X_j$ (j=1, 2, ..., M).

From the detection values $X_j$ (j=1, 2, ..., M) obtained for the respective effective wavelengths for 2N colors, counting from smaller subscript numbers, i (i=1, 2, ... N) corresponding to shorter wavelengths. The temperature values $T_1, T_2, \ldots, T_N$ and spectral emittance values $\epsilon_1, \epsilon_2, \ldots, \epsilon_N$ of the N light sources (specimens) are obtained by using the aforementioned N-graybody 2N-color spectrophotometry, and these values are used respectively as the approximate values $t_1, t_2, \ldots, t_N$ of the temperatures $T_1, T_2, \ldots, T_N$ and approximate values $a_{10}, a_{20}, \ldots, a_{N0}$ of unknown coefficients $A_{10}, A_{20}, \ldots, A_{N0}$ of zero-degree terms of the wavelengths $\lambda$ corresponding to the spectral emissivity values $\epsilon_1, \epsilon_2, \ldots, \epsilon_N$.

The approximate values $a_{11}, a_{12}, \ldots, a_{NK_N}$ of the M−2N remaining unknown coefficients $A_{11}, A_{12}, \ldots, A_{NK_N}$ among $A_{nk}$ in the spectral emissivity are obtained by substituting the aforementioned values $t_1, t_2, \ldots, t_n$ and $a_{10}, a_{20}, \ldots, a_{N0}$ for $T_n$ and $A_{n0}$ in $\epsilon_n$ in the following equations using the electrical detection value $X_j$ $$X_j = g_j C_1 \lambda_j^{-5} \sum_{n=1}^{N} \epsilon_n \frac{1}{\exp\frac{C_2}{\lambda_j T_n} - 1} \tag{132}$$

[where $g_j$ is the spectral gain at the effective wavelength $\lambda_j$, j=1, 2, ..., M, and $C_1$ and $C_2$ are the same as those in equation (102)] for j=2N+1 to j=M and solving the following M−2N dimensional first-degree simultaneous equations involving M−2N unknown coefficients as unknown $a_{nk}$ (k≧1)

$$X_j = g_j C_1 \lambda_j^{-5} \sum_{n=1}^{N} \left( a_{n0} + \sum_{k=1}^{K_N} a_{nk}\lambda_j^k \right) \frac{1}{\exp\frac{C_2}{\lambda_j t_n} - 1} \tag{133}$$

where j=2N+1, 2N+2, ..., M.

In this way, the initial values (i.e., approximate values) $t_n$ and $a_{nk}$ for the unknowns $T_n$ (n=1, 2, ..., N) and unknown coefficients $A_{nk}$ (n=1, 2, ..., N, k=0, 1, 2, ..., $K_N$) concerning $\epsilon_n$ in equation (132) for the iterative convergence calculations with the detected values $X_j$ and theoretical values $x_j$ are obtained.

In the iterative convergence calculation, an equation $$\frac{(X_j - x_j)\lambda_j^5}{g_j C_1} = \sum_{n=1}^{N} \left( E_{nj} \Delta t_n + \sum_{k=0}^{K_N} F_{njk} \cdot \Delta a_{nk} \right) \tag{134}$$

(where j=1, 2, ..., M) is solved with the increment $\Delta t_n$ and $\Delta a_{nk}$ as the unknowns to obtain new approximate measured values, i.e., approximate measured values $t_1, t_2, \ldots, t_n$ of the temperature and approximate measured values $a_{10}, a_{20}, \ldots, a_{N0}, a_{11}, a_{21}, \ldots, a_{NK_N}$. In equation (134), $x_j$ is given as $$x_j = g_j C_1 \lambda_j^{-5} \sum_{n=1}^{N} \left( \frac{1}{\exp\frac{C_2}{\lambda_j t_n} - 1} \sum_{k=0}^{K_N} a_{nk}\lambda_j^k \right) \tag{135}$$

(where j=1, 2, ..., M), $E_{nj}$ is given as $$E_{nj} = \frac{C_2 \exp\frac{C_2}{\lambda_j t_n}}{t_n^2 \left( \exp\frac{C_2}{\lambda_j t_n} - 1 \right)^2} \sum_{k=0}^{K_N} a_{nk}\lambda_j^{k-1} \tag{136}$$

(where j=1, 2, ..., M, n=1, 2, ..., N), and $F_{njk}$ is given $$F_{njk} = \frac{\lambda_j^k}{\exp\frac{C_2}{\lambda_j t_n} - 1} \tag{137}$$

(where j=1, 2, ..., M, n=1, 2, ..., N, k=1, 2, ..., $K_N$).

Equation (134) which represents a set of M dimensional first degree simultaneous equations, is used for calculations with the theoretical values $x_j$ and differential factors of $X_j$ against for each unknown ($a_{nk}, t_n$) until new values $x_j$ converge to the detection values $X_j$. The increments $\Delta t_n$ and $\Delta a_{nk}$ obtained by solving this equation are used for calculation of revised values using the following equations.

$$t_n = t_n + \Delta t_n \tag{138}$$

$$a_{nk} = a_{nk} + \Delta a_{nk} \tag{139}$$

In equations (138) and (139) $t_n$ and $a_{nk}$ on the right side are values before executing calculations with equations (138) and (139), and $t_n$ and $a_{nk}$ on the left side are values obtained as the result of the calculations. If the theoretical values $x_j$ obtained by substituting $t_n$ and $a_{nk}$ on the left side into equation (135) converge up to predetermined values with respect to $X_j$, $t_n$ and $a_{nk}$ on the left side of equations (138) and (139) are used as the measured values $T_n$ and $A_{nk}$ in $\epsilon_n$. The measured value $\epsilon_n$ can be obtained from these $A_{nk}$.

If the aforementioned theoretical values $x_j$ do not converge to the predetermined values with respect to $X_j$, $t_n$ and $a_{nk}$ on the left side of equations (138) and (139) are substituted into equation (134) to obtain new increments $\Delta t_n$ and $\Delta a_{nk}$, and new approximate values are obtained using equations (138) and (139). This is repeated until the convergence is obtained. In this way, the precise measurement method based upon multi-color spectrophotometry permits precise measurement of the temperature and spectral emittance of the specimen even if the specimens are colored bodies.

If the effective wavelengths of the filters are in the relation of equation (101), Wien's radiation law for approximation holds and the specimen is a graybody, equation (102A) holds, and equation (107) gives N precise roots. By varying the value of z in equation (107) maxima and minima appear between adjacent roots as the value of the left side of equation (107), and the values of z at these maxima and minima are not liable to be affected by the aforementioned approximation or hardware errors of the effective wavelengths of the filters. Thus, it is possible to make use of the value of z which gives maxima or minima of the value of the left side of equation (107) as the approximate value in the precise measuring method.

By the aforementioned measuring method, the measurement of the temperature and spectral emittance of a plurality of specimens can be obtained by receiving the radiant fluxes from the specimens as a single radiant flux without requiring the physical distinctions among the plurality of specimens. Thus, it is possible to avoid restrictions imposed upon the prior-art measuring system in the measurement of the temperature and so forth of a plurality of specimens being in temperature radiation, for instance restrictions imposed upon filter devices in particular relations to the burner flame issuing into a furnace for the detection of the flame, and also restrictions upon the installation of a measuring system at a position free from the influence of radiant flux from the burning chamber for the measurement of the temperature of the front edge of the first-stage turbine blade in a jet engine. Also, by choosing the effective wavelengths of the analyzed channels under the aforementioned conditions, less calculating capacity is required. While the measurement of high speed moving objects and of images, in which it is necessary to process a great deal of detected values, requires high speed data processing, the approximate measuring method permits considerable precision, so that its application to the measurement of high speed moving bodies or the like precision is greatly useful within limits of precision.

Further, no particular condition is given to the spectral emissivity. In other words, even with a specimen whose spectral emittance changes instantaneously, for instance steel mass at a hot strip mill, continuous temperature measurement can be obtained.

Furthermore, the measuring method according to the invention is a passive method, so that it is possible to obtain temperature measurement of a rotor, non-destructive measurement, etc.

Further, the measuring method according to the invention can be applied to the analysis of the composition of the specimen by correlating the spectral emissivity obtained by the measuring method according to the invention with known data.

The use of the aforementioned measuring method for the measurement of the spectral reflectance and transmittance will now be discussed.

A situation will be described in which the radiant flux from a specimen, for instance a light source with spectral emissivity $\epsilon_L$, propagates through a medium with spectral transmittance $f_L$, is reflected by a specimen with spectral reflectance (inclusive of geometrical effects) and is detected by a measuring system.

Assuming that Planck's radiation law is used for calculating the spectral radiant flux divergence of a blackbody, the detected value X is $$X = g\rho f_L \epsilon_L C_1 \lambda^{-5} \frac{1}{\exp\frac{C_2}{\lambda T} - 1} \quad (140)$$

where T is the temperature of the light source, $\lambda$ is the effective wavelength of the filter of the measuring system and g is the spectral gain. Here, $$r_E = \rho f_L \epsilon_L \quad (141)$$

is to be called equivalent reflectance. By using this $r_E$ equation (140) can be written as $$X = g r_E C_1 \lambda^{-5} \frac{1}{\exp\frac{C_2}{\lambda T} - 1} \quad (140A)$$

Substituting $g = g_j$, $\lambda = \lambda_j$ and $T = T_n$ into equation (140A) and comparing the resultant equation with equation (132) proves that equation (140A) represents the relation of the same kind as that obtained by substituting $\epsilon_n$ of the n-th light source in equation (132) into $r_E$. Thus, the spectral reflectance can be measured by using the aforementioned measuring method.

When the spectral transmittance f (inclusive of the effects of geometrical shape) is used in lieu of the spectral reflectance $\rho$(inclusive of the effects of geometrical shape) of the specimum in the measurement of the spectral reflectance, provided the other parameters are the same as in the case of the measurement of the spectral reflectance, the measured value X of the transmitted radiation is $$X = gff_L\epsilon_L C_1 \lambda^{-5} \frac{1}{\exp\frac{C_2}{\lambda T} - 1} \quad (142)$$

Here $$f_E = ff_L\epsilon_L \quad (143)$$

is to be called equivalent transmittance. By using this $f_E$ equation (142) can be written as $$X = gf_E C_1 \lambda^{-5} \frac{1}{\exp\frac{C_2}{\lambda T} - 1} \quad (142A)$$

Comparison of equations (142A) and (132) shows that equation (142A) represents the relation of the same kind as that obtained by substituting $\epsilon_n$ of the n-th light source expressed by equation (132) into $f_E$. Thus, the spectral transmittance can be measured by using the aforementioned measuring method.

Now, embodiments of the measuring system implementing the aforementioned method will be described.

The measuring system for carrying out the method of measurement described above will now be described.

FIG. 1 shows a first embodiment of the measuring system according to the invention. Designated at 1 is the measuring system. The measuring system 1 comprises a spectrophotometric system which receives radiant fluxes from N different specimens 2 under thermal radiation [only a first light source $2_1$ consisting of a perfect blackbody $2_{1a}$ and a film $2_{1b}$, a second light source $2_2$ consisting of a perfect blackbody $2_{2a}$ and a film $2_{2b}$ and a n-th light source $2_n$ consisting of a perfect blackbody $2_{na}$ and a film $2_{nb}$ being shown in FIG. 1, i.e., the third to (n-1)-th light sources being omitted as a single or composite radiant flux] and monochromator 3 with respect to predetermined effective wavelength; a converting means 4 for converting the output of the monochromator 3 representing the spectra of the radiant flux into corresponding electric values; and a computer 5, which includes a memory for memorizing effective wavelengths, spectral gains at the effective wavelengths and constants $C_1 = 3.74150 \times 10^{-16} W \cdot m^2$ and $C_2 = 1.43879 \times 10^{-2} m \cdot deg.$ and a computer for calculating the temperature and spectral factor or the sole temperature as mentioned earlier in connection with the method of measurement.

The monochromator 3 includes a switch 3c. Where it is intended to obtain precise or approximate measurement values of the temperature and spectral factor of the N radiators 2 such as the aforementioned light sources $2_1, 2_2, \ldots, 2_N$, the switch 3c is operated successively to switch over narrow bandpass filters 3a. For 2N colors, for instance, effective wavelengths of filters (at which theoretical transmitted energy is equivalent to overall energy in wavelength band are set to $$\frac{1}{\lambda_i} - \frac{1}{\lambda_{i+1}} = c$$

($i = 1, 2, \ldots, 2N - 1$), and where it is intended to obtain precise measurement of the temperature and spectral factor of the N radiators 2, switch 3c is operated successively to switch M ($M \geq 2N$) different narrow bandpass filters with the respective effective wavelengths set to meet $$\frac{1}{\lambda_i} - \frac{1}{\lambda_{i+1}} = c$$

with respect to the effective wavelengths for 2N among the M different colors such as in the case of obtaining approximate measurement values.

The converting means 4 includes for instance a photoelectric converter 4a for converting the spectral radiant flux into analog electric signals and an analog-to-digital converter (hereinafter referred to as A-D converter) for converting the analog values into digital values (detected values).

Where it is intended to obtain the measurement or approximate values of the temperature and spectral factor of N different specimens such as the aforementioned light sources $2_1, 2_2, \ldots, 2_N$, the computer 5 is instructed to obtain the temperature and spectral factor of the N specimens from a formula $$\sum_{n=1}^{N} \epsilon_n U_n^{\frac{1}{\lambda_i}} = Y_i \quad (102A)$$

(where $T_n$ and $\epsilon_n$ represent temperature and spectral factor of n-th specimens respectively among N thermal radiators which are regarded as graybodies, $$U_n = \exp \frac{-C_2}{T_n}, \quad Y_i = \frac{X_i \lambda_i^5}{g_i C_1})$$

by using detected values read out from the memory. Also, where it is intended to obtain precise measurement of the temperature and spectral factor of the N specimens 2, the computer further includes a means for iteratively correcting the values representing the temperature and spectral factor of the N thermal radiators by using these values obtained in the above manner as initial values and by checking whether or not theoretical values converge to these electrical detected values until the difference between the theoretical value and electric digital value converges to a predetermined value.

The operation of the measuring system 1 of the above construction according to the invention will now be described by using data processing flow charts in FIGS. 4 and 5. In the data processing in FIGS. 4 and 5, equation (107) is relied upon for obtaining measurement values.

Figure 4:
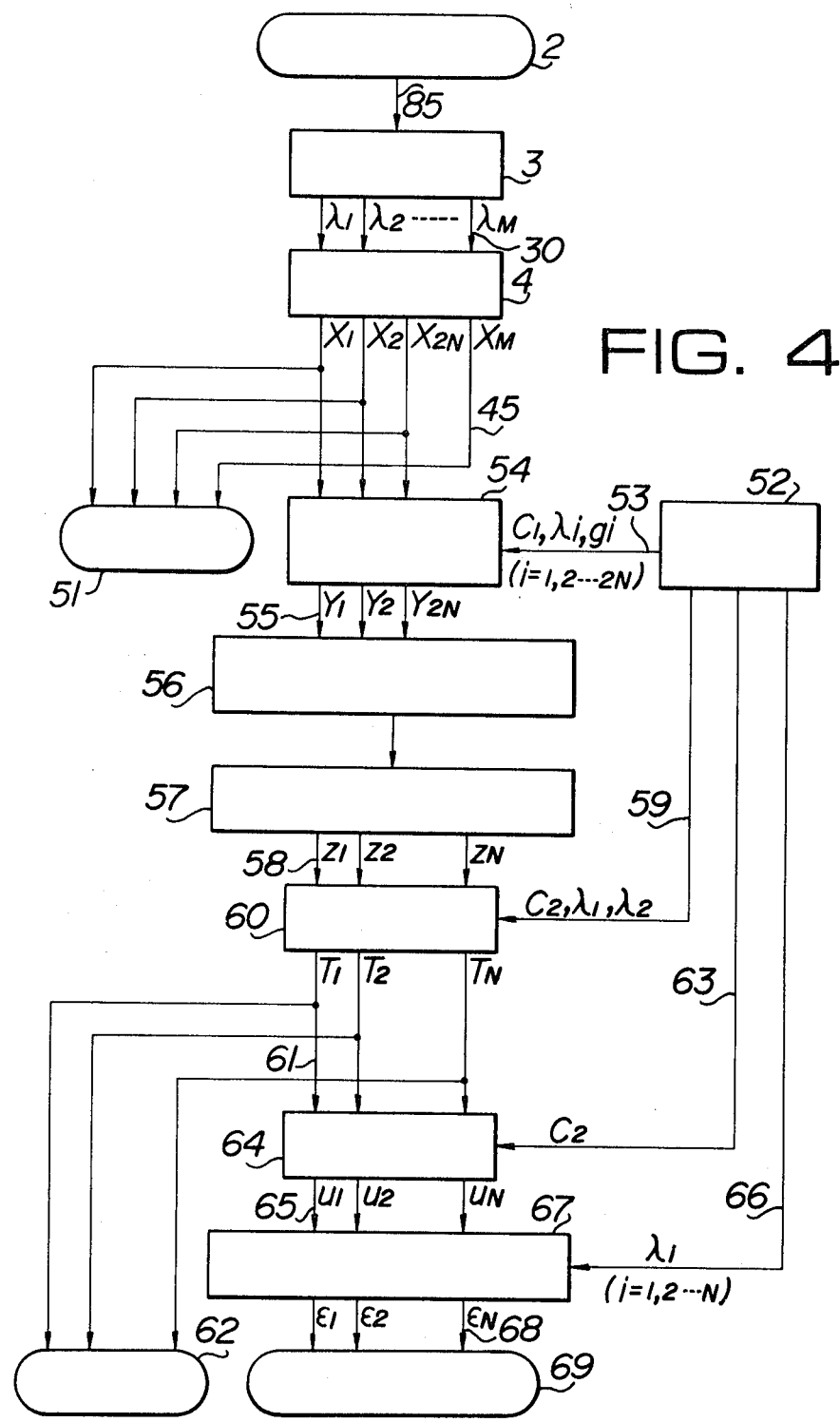
FIGS. 4 and 5 show flow charts of the data processing performed in the first embodiment of the system.

Referring now to FIG. 4, the radiant flux 85 coming from the N different light sources (i.e., radiators) 2 is spectrally separated at the monochromator 3 with respect to effective wavelengths $\lambda_1, \lambda_2, \ldots, \lambda_M$ 30 for M different colors. The spectra 30 are converted by the converting means 4 into corresponding electrical digital values (detected values) $X_1, X_2, \ldots, X_M$ (indicated at 45).

These detected values $X_1, X_2, \ldots, X_M$ (45) are memorized in a memory 51. Meanwhile, values $Y_1, Y_2, \ldots, Y_{2N}$ (55) are obtained in a calculating step 54 in the computer 5 by using the detected values $X_1, X_2, \ldots, X_{2N}$ (45) and $C_1, g_i$ and $\lambda_i$ (53) ($i = 1, 2, \ldots, 2N$) read out from a memory 52, in which $C_1, C_2, g_1$ and $\lambda_i$ (these values being set at the time of manufacture) are memorized.

These values $Y_i$ 55 ($i = 1, 2, \ldots, 2N$) are set as elements in equation (107) in a step 56.

Then, the one-dimensional N-th-degree equation (107) is solved to obtain N different values of z (58) in a step 57.

Then, in a step 60, temperature values $T_1, T_2, \ldots, T_N$ (indicated at 61) are obtained by substituting the values of z (58) and $C_2, \lambda_1$ and $\lambda_2$ (59) read out from the memory 52 into equation (105A). These values of temperature are output or memorized in a memory 62 as the measured values of the temperature of the N light sources 2.

Then, in a step 64 values $U_1, U_2, \ldots, U_N$ (65) are obtained by substituting the measured temperature values $T_1, T_2, \ldots, T_N$ (61) and $C_2$ (63) read out from the memory 52 into equation (104).

Then, $$U_i^{\frac{1}{\lambda_i}}$$

is obtained from these values of $U_i$ (65), ($i = 1, 2, \ldots, N$) and $\lambda_i$ (66), ($i = 1, 2, \ldots, N$), and then N-dimensional first-degree simultaneous equations (102A) are solved by equation (109) using these values of $$U_i^{\frac{1}{\lambda_i}}$$

to obtain the values of spectral emissivity $\epsilon_1, \epsilon_2, \ldots, \epsilon_N$ 68. These values are output or memorized in a memory 69 as the spectral emissivity of the respective N different radiators 2.

The data processing described so far according to the flow chart of FIG. 4, for determining the temperature and spectral emittance of the N different radiators, is based upon the aforementioned N-graybody 2N-color spectrophotometry. To obtain precise determination of the temperature and spectral emissivity of the radiators, it is necessary to carry out iterative calculations with the measured values obtained in the above way as initial values as will be described hereinafter.

Figure 5:
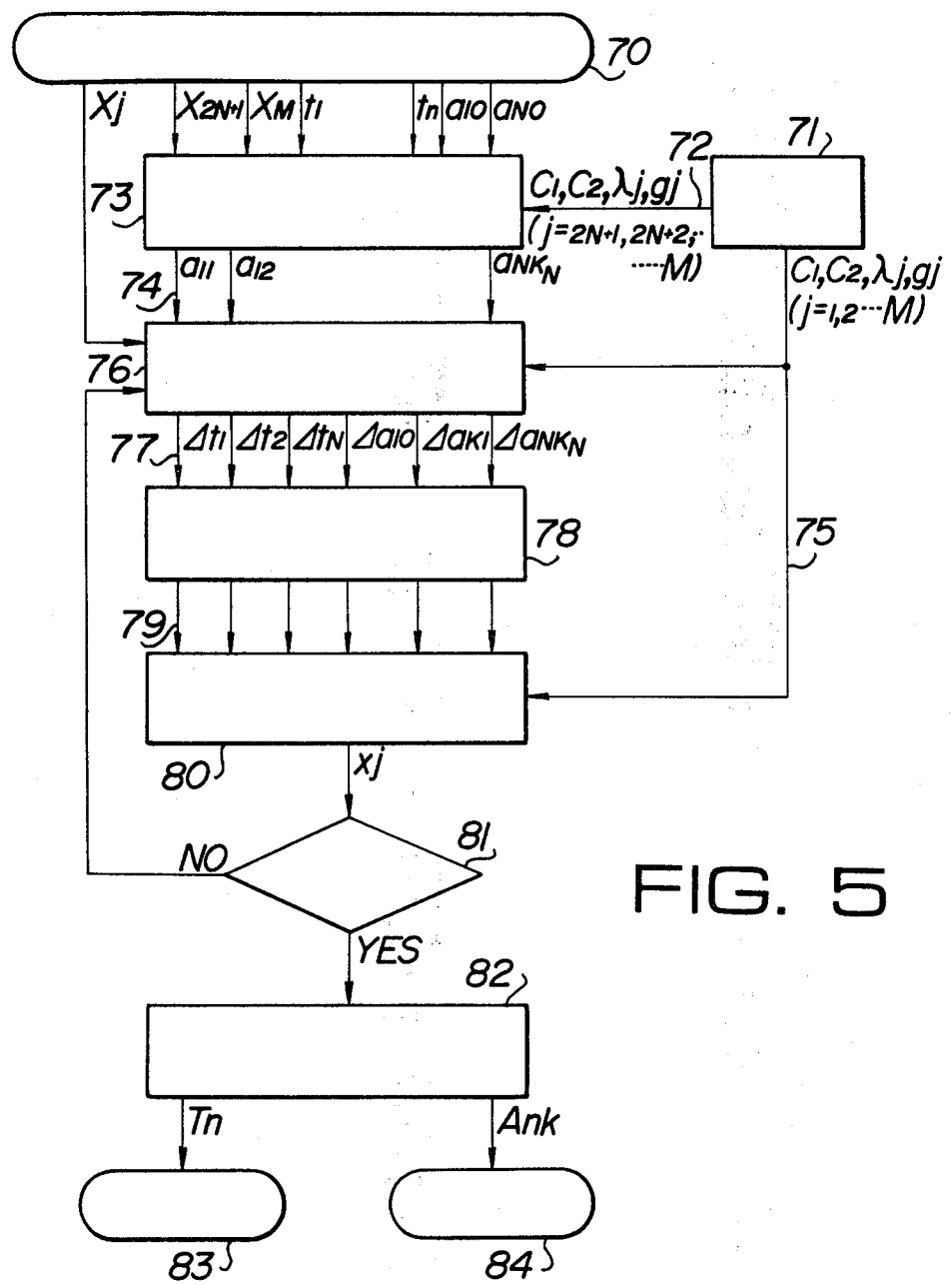

In a first step 70 in the data processing flow chart shown in FIG. 5, the detected values 51, measured values of temperature $T_1, T_2, \ldots, T_N$ and measured values of spectral emissivity $\epsilon_1, \epsilon_2, \ldots, \epsilon_N$ as shown in FIG. 4 are respectively used as detected values $X_j$ ($j = 1, 2, \ldots, M$), temperature approximation values $t_1, t_2, \ldots$ ., $t_N$ and spectral factor approximation values $a_{10}, a_{20}, \ldots, a_{N0}$.

In a step 73, equation (133) mentioned earlier in connection with the method of measurement described above is solved by using the approximate measurement values $t_1, t_2, \ldots, t_N$ and $a_{10}, a_{20}, \ldots, a_{N0}$ and detected values $X_j$, values of the effective wavelength $\lambda_j$ and spectral gain $g_j$ ($j=2N+1, 2N+2, \ldots, M$) and constants $C_1$ and $C_2$ 72 read out from a memory 71, in which the values of $g_j, \lambda_j$ ($j=1, 2, \ldots, M$) and constants $C_1$ and $C_2$ are memorized, thus obtaining other initial values $a_{11}, a_{21}, \ldots, a_{NKN}$ 74.

These initial values $t_1, t_2, \ldots, t_N$, and $a_{10}, a_{20}, \ldots, a_{N0}, a_{11}, a_{21}, \ldots, a_{NKN}$ and the data of the memory, i.e., $\lambda_j$ and $g_j$ ($j=1, 2, \ldots, M$) and $C_1$ and $C_2$ 75 and $X_j$, are used to solve equation (134) mentioned in connection with the aforementioned measurement method, i.e., M-dimensional first-degree simultaneous equations to obtain increments $\Delta t_1, \Delta t_2, \ldots, \Delta t_N$ and $\Delta a_{10}, \Delta a_{20}, \ldots, \Delta a_{N0}, \Delta a_{11}, \Delta a_{21}, \ldots, \Delta a_{NKN}$ 77.

In a step 78, these increments are used to correct the values $t_1, t_2, \ldots, t_N, a_{10}, a_{20}, \ldots, a_{N0}$ and $a_{11}, a_{21}, \ldots, a_{NKN}$ using equations (138) and (139) to obtain new approximations $t_1, t_2, \ldots, t_n, a_{10}, a_{20}, \ldots, a_{N0}$ and $a_{11}, a_{21}, \ldots, a_{NKN}$ 79.

In a step 80, these new approximation values 79 and data from a memory 71, i.e., $\lambda_j, g_j$ ($J=1, 2, \ldots, M$), $C_1$ and $C_2$ (75) are used to calculate equation (135) mentioned in connection with the aforementioned measurement method to derive theoretical values $x_j$ ($j=1, 2, \ldots, M$) of the spectra based upon a mathematical model.

Then, in a step 81 whether or not the theoretical value $x_j$ converges to the detected value $X_j$ 51 is checked.

If the decision in the step 81 is "NO", that is, if no convergence is obtained, the process returns to the step 76 to repeat the calculations. If the step 81 decision is "YES", that is, if the convergence is obtained, the approximation values $t_n$ and $a_{nk}$ at this time are made to be the respective measured values of temperature $T_n$ and $A_{nk}$ regarding the spectral emissivity in a step 82.

The measured values $T_n$ are directly output as precise measured values of temperature (indicated at 83), while the values obtained by substituting $A_{nk}$ into equation (130) are output as the precise measured values of the spectral emissivity 84.

The above measuring system can thus effectively implement the aforementioned measurement method. Also, it can be used for the measurement of the spectral reflectance and spectral transmittance as well.

Figure 2:
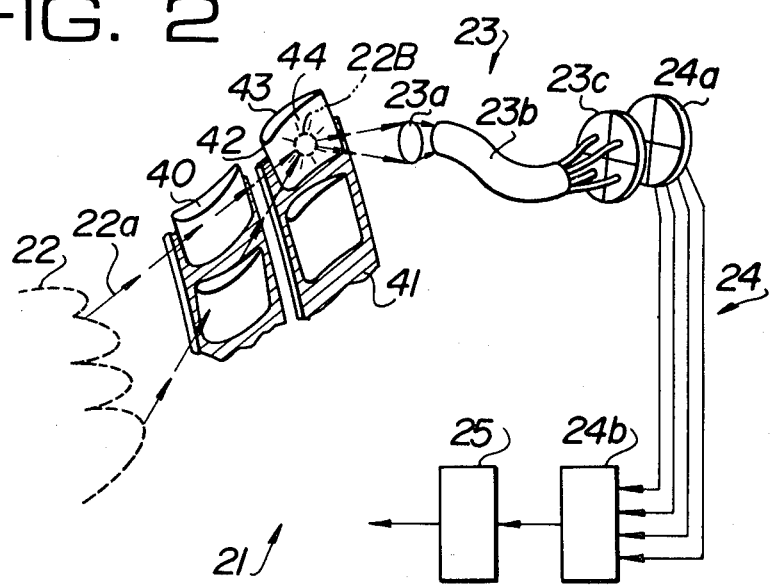
FIG. 2 shows a second embodiment of the system according to the invention applied to the measurement of the temperature of a jet engine.

FIG. 2 shows a second embodiment of the measuring system according to the invention applied to the case where the radiator is a rotor and there are two light sources. More particularly, it is a system for measuring the temperature of a first stage turbine blade in a jet engine.

The radiant flux received by a monochromator 23 in this measuring system 21 includes a radiant flux 22a from high pressure combustion gas 22 and a radiant flux from the first stage turbine blade 22B. In FIG. 2, designated at 40 is a nozzle, at 41 a rotor, at 42 a front edge portion of the first stage turbine blade 22B, at 43 the back thereof and at 44 the belly thereof.

The monochromator 23 includes a condenser 23a for condensing the radiant flux from the high pressure combustion gas 22 and first stage turbine blade 22B, and optical-fiber cable 23b for guiding the radiant flux condensed by the condenser 23a through four optical paths and an optical filter 23c for spectrally separating each light from the respective optical paths of the optical-fiber cable 23b. Each of the effective wavelengths of the filter 23c is set to satisfy equation (101). If it is intended to obtain precise measured values of temperature, as in the preceding embodiment of FIG. 1, a required number of spectral filters may be provided in addition to the above four filters. In this case, precise measurement can be obtained by using the detected values from all the filters with the measured values from the first-mentioned four filters used as the approximation values.

A converting means 24 for converting the spectra from the monochromator 23 into corresponding electric values includes a photoelectric converter 24a and a multiplexer and an A-D converter 24b for converting the analog electric signals from the photoelectric converter 24a into corresponding digital electric signals.

The digital signals from the converting means 24 are coupled to a computer 25.

The computer 25 has the same construction as computer 5 in the preceding embodiment of FIG. 1 except for $N=2$.

In the computer calculating system 25, the temperature and spectral emissivity of the turbine blade 22B and high pressure combustion gas 22 are calculated on the basis of the aforementioned measurement method by using the spectral detected value for the effective wavelengths chosen as in equation (101) and data $\lambda_i, g_i, C_1$ and $C_2$ from the memory in the manner as described earlier in the operation of the embodiment of FIG. 1.

With this measuring system 21 according to the invention, the temperature of the front edge portion 42 and belly 44 of the turbine blade 22B can be directly measured. Thus, it is not necessary to adopt restrictions that have to be inevitably considered in the prior-art indirect measurement in which access is provided only to the back 43 of the blade where the temperature is not so serious as at the belly 44. In other words, it is possible to set permissible temperature of the turbine blade 22B at the highest allowable value and hence a high heat efficiency of the jet engine is available. Also, since according to the invention the temperature measurement can be obtained without any limitation whatsoever upon the spectral emissivity, the temperature can be accurately measured irrespective of secular changes of the spectral emissivity of the turbine blade 22B. This also greatly contributes to the efficient operation of the jet engine. Further, while the radiant flux incident upon the monochromator 23 from the turbine blade 22B periodically changes with the movement of the turbine blade 22B, by providing memorized data about coefficients for correction for the periodic changes and using them in the data processing it is possible to obtain measurement of the comparatively fast periodic changes of the radiant flux from the turbine blade 22B.

Figure 3:
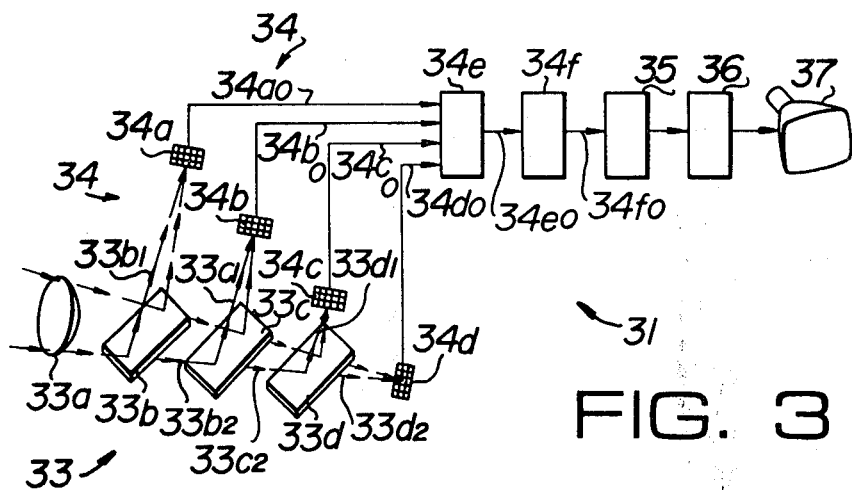
FIG. 3 shows a third embodiment of the system according to the invention applied to the measurement of temperature distribution.

FIG. 3 shows a third embodiment of the measuring system 31, which measures the temperature distribution in a heated body by making use of the measuring method according to the invention.

In this measuring system 31, the number N as mentioned in connection with the monochromator 3 in the measuring system in FIG. 1 is set to $N=2$. In this system, a monochromator 33 includes an objective lens 33a for receiving a radiant flux from a heated body, for instance a heated substance within a furnace (not shown); a first dichroic mirror 33b reflecting radiant flux at particular wavelengths from the objective lens 33a to produce a first spectrum $33b_1$ while transmitting the other wavelengths $33b_2$; a second dichroic mirror $33c$ reflecting part of the radiant flux $33b_2$ transmitted through the first dichroic mirror $33b$ to produce a second spectrum $33c_1$ while transmitting the rest as a second transmitted radiant flux $33c_2$; and a third dichroic mirror $33d$ reflecting part of the second transmitted radiant flux $33c_2$ to produce a third spectrum $33d_1$ while transmitting the rest to produce a third transmitted radiant flux, i.e., the fourth spectrum flux $33d_2$. The effective wavelengths of the first, second and third dichroic mirrors are selected to satisfy the conditions of equation (101).

Also, if necessary, as in the embodiment of FIG. 1 the number of spectra may be increased by providing additional dichroic mirrors for permitting precise measurement. A converting means 34 in the measuring system 31 effects conversion of the spectra into electric digital signals (detected values) not as a whole single but with respect to respective points which are each a collection of particular single points, that is, which are image point signals.

A converting means 34 includes a first image sensor $34a$ having a plurality of photoelectric converters arranged such that each corresponds to image point co-ordinates for converting light images for the respective image point co-ordinates, obtained from the first spectrum $33b_1$ from the first dichroic mirror $33b$, into electric analog signals $34a_0$; a second image sensor $34b$ receiving the second spectrum $33c_1$ from the second dichroic mirror $33c$ and having the same function and construction as the first image sensor $34a$; a third image sensor $34c$ receiving the third spectrum $33d_1$ and having the same function and construction as the first image sensor $34a$; a fourth image sensor $34d$ receiving the fourth spectrum $33d_2$ transmitted through the third dichroic mirror $33d$ and having the same function and construction as the first image sensor $34a$; a scanner $34e$ for scanning and taking out as serial signals the image point signals $34a_0$, $34b_0$, $34c_0$ and $34d_0$ from the first, second, third and fourth image sensors; and an A-D converter $34f$ for converting the individual image point signals $34e_0$ from the scanner $34e$ into electric digital signals $34f_0$.

The electric digital signals $34f_0$ from the converting means 34 is coupled to a computer 35 of the same construction as the computer 5 in the embodiment of FIG. 1.

In the computer 35, a similar data processing to that described earlier in connection to the embodiment of FIG. 1 is performed to produce measured values of temperature and spectral emissivity for the individual image point coordinates.

The measured values are supplied to an interface 36 where they are converted into a video signal, which is displayed as the image representing the temperature distribution in the heated material within the furnace on a receiver tube 37.

As has been shown, with the measuring system 31 the temperature distribution in the heated material in the furnace can be accurately measured without being affected by the gas within the furnace, etc. By monitoring this temperature distribution it is possible to find an abnormal temperature in an early stage and prevent an accident. This system can be applied to rotators, chemical reaction apparatus, etc.

While the filters and dichroic mirrors are used in the monochromator in the above embodiment, it is also possible to use prisms, replicas, etc.

In case of using prisms or replicas, a single photoelectric converter may be used to receive the input radiant flux, and the prisms or replicas may be mechanically driven for the scanning of wavelengths. Alternatively, a number of elements may be provided so that radiant fluxes of different wavelengths are incident on them, and the scanning may be electrically effected.

With regard to the photoelectric converter, there are various types made of metals, semiconductors, dielectrics, etc., and these are usually used in the cooled state in far ultraviolet measurements. While the pyroelectric type can be used at normal temperature, in this case a chopper for regularly on-off controlling the incident radiant flux has to be provided. In general, photoelectric converters may appropriately chosen depending upon desired use, and may be used with or without accessory means.

Further, where a number of points constitute the subject of a measurement, the scanning may be made by means of beam scanner. Furthermore, it is possible to provide a reference light source for making the calibration of the measuring instrument or to use a sector to refer ambient temperature of the photoelectric converter for compensation.

Further, instead of the real time data processing it is possible to record data on photographic film, magnetic tape, etc. for processing afterwards.

When an analog computer is used for the calculations with equation (112), high speed data processing can be obtained; for example, current may represent the detected value $X_i$ in equation (103), resistance may collectively represent the other constants, thus voltage produced across the resistor when the current $X_i$ is caused to represent $Y_i$, and by so doing it is possible to compensate for the slow processing of the digital computer.

The invention will now be described in connection with the case where there is only a single radiator as the subject of measurement. In this case, no limitation are imposed upon the relationship among the wavelengths of the individual channels, so that it is possible to select wavelengths suited for the conditions of the measurement. Also, there is no trouble in the selection of filters.

In the following embodiments, either the temperature is measured by using the measured values of the radiant flux intensities of all channels, or the temperature is measured as common to all of the combinations, each of which combinations comprises two or more channels appropriately selected from the available channels and represents its own temperature as a result of combination, and the spectral factor is calculated from this measured value of temperature and the spectral radiant flux intensities.

Prior to describing fourth to seventh embodiments of the invention, the underlying measuring method employed therein according to the invention will first be discussed to facilitate the understanding thereof. The radiant flux from a radiator being in temperature radiation is spectrally separated by a monochromator with respect to effective wavelenths $\lambda_1$ to $\lambda_M$ for M different channels. The spectra are converted to respective electric values $X_1$ to $X_M$.

From the electric detection values for M channels electric values $X_i$ for the effective wavelengths $\lambda_i$ ($i=1, 2, \ldots, m$) for m channels are obtained, and equations relating the temperature, spectral factor and spectral radiant intensity are developed for the individual effective wavelengths $\lambda_i$ by using an equation approximating the spectral factor values for the individual effective wavelengths which equation contains m−1 unknowns and an unknown term representing the temperature of the specimen. Also employed is an equation for spectral radiant emission of blackbody. The temperature and spectral factor are derived as the roots of the equation thus developed. For the approximate calculation of the spectral radiant emission of blackbody for each effective wavelength, Wien's radiation law is used, while for the precise calculation Planck's radiation law is used, as will be described hereinafter.

With the capacity of the up-to-date electronic computer the aforementioned equation can be directly solved. To alleviate the burden on the computer and permit quicker calculations in a simpler calculation process, the following calculation method is effective.

For the formula of the spectral factor a function of the wavelength including m−1 unknowns, for instance an (m−2)-th-degree polynomial of the effective wavelength is used. Unknowns concerning the spectral factor in the aforementioned formula are algebraically eliminated to obtain a one-dimensional irrational equation (225) (as will be described) with respect to the temperature and this equation is solved to obtain the temperature. The temperature thus calculated is substituted into the aforementioned equation to derive the spectral factor. When the effective wavelengths are chosen such that the aforementioned relation $$\left( \frac{1}{\lambda_i} - \frac{1}{\lambda_{i+1}} = \alpha \right)$$

holds and Wien's radiation law is applied, the aforementioned one-unknown irrational equation is reduced to a one-dimensional (m−1)-th-degree equation, and in case of m=3 or m=4 the temperature can be directly calculated using the well-known formula for roots.

While the spectral factor and temperature T are measured in the above way, implementation of Wien's radiation law will now be discussed in detail, followed by a detailed discussion as to implementation of Planck's radiation law.

While according to the invention the radiant flux from a specimen under thermal radiation, for instance a spectrum obtained through a condenser and a filter, subsequently passes through a means for converting it into an electrical value such as a photoelectric converter and an A-D converter, such characteristics as the condensing factor of the condenser and transmitting factor of the filter in the spectrophotometric system, conversion factor of the photoelectric converter in the converting means, the gain of the A-D converter and the tendency of the spectral factors of the specimen in cases where such tendency is predetermined, are held under control such that they can always be known, and they are collectively expressed as spectral gain g. Thus spectral gain g can be employed as a known quantity. On the other hand, unknown optical characteristics of the optical path which cannot be controlled, for instance in the case of a coal burning furnace the shape of coal, spectral emissivity of ash covering the coal, spectral transmittance of the surrounding burning gas, spectral transmittance of the burning chamber observation window and spectral transmittance of the optical path leading from the coal burning furnace to the aforementioned spectrophotometric system, are collectively regarded as the spectral factor of the specimen and denoted as $\epsilon$. The values of the spectral gain g and spectral factor $\epsilon$ vary with the effective wavelength.

First, the three-color spectrophotometric method will be described. In this case, the spectrophotometric system is constructed as the three-color spectrophotometric system, and the spectral factor and temperature are measured in the following way.

The effective wavelengths of each channel are respectively denoted by $\lambda_1$, $\lambda_2$ and $\lambda_3$; the spectral factor, spectral gain and spectral electric detection value for the individual effective wavelengths respectively by $\epsilon_1$, $\epsilon_2$ and $\epsilon_3$, $g_1$, $g_2$ and $g_3$ and $X_1$, $X_2$ and $X_3$, and the temperature of the specimen by T. For the individual effective wavelengths the spectral radiant emission expressed by Wein's equation are $$M_1 = C_1 \lambda_1^{-5} \exp \frac{-C_2}{\lambda_1 T} \tag{201}$$

$$M_2 = C_1 \lambda_2^{-5} \exp \frac{-C_2}{\lambda_2 T} \tag{202}$$

and $$M_3 = C_1 \lambda_3^{-5} \exp \frac{-C_2}{\lambda_3 T} \tag{203}$$

where $C_1 = 3.74150 \times 10^{-6}$ W.m$^2$ and $C_2 = 1.43879 \times 10^{-2}$ m.deg.

The spectral radiant emission $M_1$, $M_2$ and $M_3$ are related to the respective electric detection values $X_1$, $X_2$ and $X_3$ as $$X_1 = g_1 \epsilon_1 M_1 = g_1 \epsilon_1 C_1 \lambda_1^{-5} \exp \frac{-C_2}{\lambda_1 T} \tag{204}$$

$$X_2 = g_2 \epsilon_2 M_2 = g_2 \epsilon_2 C_1 \lambda_2^{-5} \exp \frac{-C_2}{\lambda_2 T} \tag{205}$$

$$X_3 = g_3 \epsilon_3 M_3 = g_3 \epsilon_3 C_1 \lambda_3^{-5} \exp \frac{-C_2}{\lambda_3 T} \tag{206}$$

Even if the values of $X_1$, $X_2$, $X_3$ are fixed at equation (204), (205) and (206), $\epsilon_1$, $\epsilon_2$ and $\epsilon_3$ are basically indefinite. But if the following equation, i.e., a first-degree equation relating the effective wavelength and spectral factors is provided to constrict conditions, $\epsilon_1$, $\epsilon_2$ and $\epsilon_3$ become obtainable.

$$\epsilon_1(\lambda_2 - \lambda_3) + \epsilon_2(\lambda_3 - \lambda_1) + \epsilon_3(\lambda_1 - \lambda_2) = 0 \tag{207}$$

Figure 6:
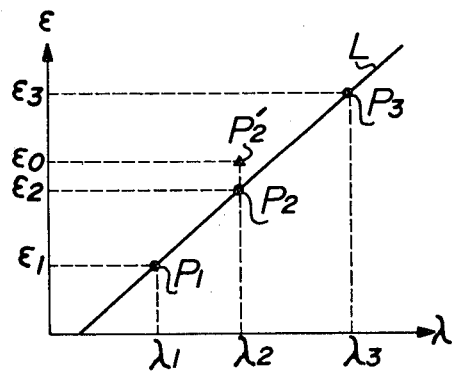
FIG. 6 is a graph showing a spectral emissivity versus effective wavelength plot used for the illustration of the three-color spectrophotometry according to the invention.

FIG. 6 shows a plot for equation (207). In FIG. 6, the ordinate is taken for the spectral factor $\epsilon$, and the abscissa for the effective wavelength $\lambda$. Co-ordinates $P_1$ ($\lambda_1$, $\epsilon_1$), $P_2$ ($\lambda_2$, $\epsilon_2$) and $P_3$ ($\lambda_3$, $\epsilon_3$) are on a straight line L.

By directly solving equation (207) using equations (204), (205) and (206) with a computer, the spectral factors $\epsilon_1$, $\epsilon_2$ and $\epsilon_3$ and temperature T can be obtained.

To simplify the solution of equation (207), a spectrophotometric system, in which a nominal relationship among $\lambda_1$, $\lambda_2$ and $\lambda_3$ as given by the following equation holds, is selected.

$$\frac{1}{\lambda_1} - \frac{1}{\lambda_2} = \frac{1}{\lambda_2} - \frac{1}{\lambda_3} = \alpha \quad (208)$$

where $\alpha$ is a constant, and $\lambda_1 < \lambda_2 < \lambda_3$

By solving equation (207) using equations (204), (205), (206) and (208), the following two different kinds of measured values of the spectral factor and temperature are obtained.

$$T = \frac{1}{\ln\left(\frac{X_{3g1}\lambda_3^4 k}{X_{1g3}\lambda_1^4 \bar{k}}\right)^{\frac{1}{2C_2\alpha}}} \quad (209)$$

$$\epsilon_1 = \frac{X_2\lambda_2^4\lambda_1}{C_{1g2}} \left(\frac{X_{2g1}\lambda_2^4}{X_{1g2}\lambda_1^4}\right)^{\frac{\lambda_1}{\lambda_2-\lambda_1}} k^{\frac{\lambda_2}{\lambda_2-\lambda_1}} \quad (210)$$

$$\epsilon_2 = \frac{X_2\lambda_2^5}{C_{1g2}} \left(\frac{X_{3g1}\lambda_3^4 k}{X_{1g3}\lambda_1^4 \bar{k}}\right)^{-\frac{\lambda_3+\lambda_1}{2(\lambda_3-\lambda_1)}} \quad (211)$$

and $$\epsilon_3 = \frac{X_2\lambda_2^4\lambda_3}{C_{1g2}} \left(\frac{X_{2g3}\lambda_2^4}{X_{3g2}\lambda_3^4}\right)^{\frac{\lambda_3}{\lambda_2-\lambda_3}} \bar{k}^{\frac{\lambda_2}{\lambda_2-\lambda_3}} \quad (212)$$

where k and $\bar{k}$ are respectively given by equations (213) and (214) for the first kind of measured values and by equations (215) and (216) for the second kind of measured values.

$$k = 1 + \sqrt{1 - \frac{X_1 X_{3g2}^2 \lambda_1^4 \lambda_3^4}{X_2^2 g_1 g_3 \lambda_2^8}} \quad (213)$$

$$\bar{k} = 1 - \sqrt{1 - \frac{X_1 X_{3g2}^2 \lambda_1^4 \lambda_3^4}{X_2^2 g_1 g_3 \lambda_2^8}} \quad (214)$$

$$k = 1 - \sqrt{1 - \frac{X_1 X_{3g2}^2 \lambda_1^4 \lambda_3^4}{X_2^2 g_1 g_3 \lambda_2^8}} \quad (215)$$

$$\bar{k} = 1 + \sqrt{1 - \frac{X_1 X_{3g2}^2 \lambda_1^4 \lambda_3^4}{X_2^2 g_1 g_3 \lambda_2^8}} \quad (216)$$

The content within the root symbol in equations (213), (214), (215) and (216) is not always negative since it can be transformed to $$1 - \frac{X_1 X_{3g2}^2 \lambda_1^4 \lambda_3^4}{X_2^2 g_1 g_2 \lambda_2^8} = 1 - \frac{4}{\left(\sqrt{\frac{\epsilon_1 \lambda_3}{\epsilon_3 \lambda_1}} + \sqrt{\frac{\epsilon_3 \lambda_1}{\epsilon_1 \lambda_3}}\right)^2} \geq 0$$

Figure 7:
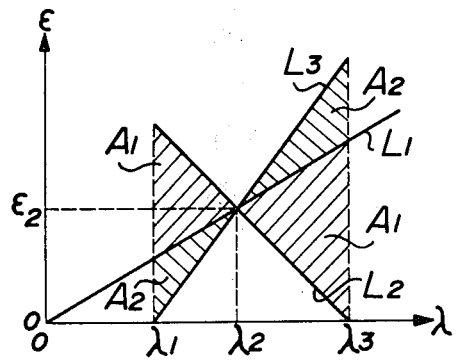
FIG. 7 is a graph showing regions containing measured values obtainable with the three-color spectrophotometric method.

FIG. 7 is a graph showing the aforementioned two different kinds of measured values of the spectral factor $\epsilon$ and temperature T. In FIG. 7, the ordinate is taken for the spectral factor $\epsilon$, and the abscissa for the effective wavelength $\lambda$. The measured values of the first kind are found within a shaded region $A_1$ enclosed by a straight line $L_1$ connecting the origin (0, 0) and a point $(\lambda_2, \epsilon_2)$ and a straight line $L_2$ connecting a point $(\lambda_3, 0)$ and a point $(\lambda_2, \epsilon_2)$. The measured values of the second kind are found within the shaded region $A_2$ enclosed by the straight line $L_1$ and a straight line $L_3$ connecting a point $(\lambda_1, 0)$ and a point $(\lambda_2, \epsilon_2)$.

Equation (209) describing the temperature T and equations (210), (211) and (212) describing the spectral factor can be expressed in other forms; for example, equation (209) can be written as $$T = \frac{1}{\ln\left(\frac{X_{2g1}\lambda_2^4}{X_{1g2}\lambda_1^4}k\right)^{\frac{1}{C_2\alpha}}} = \frac{1}{\ln\left(\frac{X_{2g3}\lambda_2^4}{X_{3g2}\lambda_3^4}\bar{k}\right)^{\frac{-1}{C_2\alpha}}} \quad (209')$$

and equations (210) and (212) can be written as $$\epsilon_1 = \frac{\lambda_1}{\lambda_2} k \epsilon_2 \quad (210')$$

$$\epsilon_3 = \frac{\lambda_3}{\lambda_2} \bar{k} \epsilon_2 \quad (212')$$

The precision of the aforementioned three-color spectrophotometric method can be ensured so long as the spectral factor changes with the wavelength to such an extent that the relation of the spectral factor to the effective wavelength can be given as a first-degree equation, however the three-color spectrophotometric method can no longer be adopted in cases where the spectral factor changes in a complicated manner with the effective wavelength. However, for wavelengths within a narrow band where the spectral factor changes linearly against wavelength, and particular wavelengths where the minima or maxima of a distribution curve appear and the envelope of those points changes linearly against wavelength, it is possible to use approximation by the three-color spectrophotometric method, i.e., a straight line given by equation (207).

A method of measuring the spectral factor $\epsilon$ and temperature T with respect to wavelength for M different channels by adopting the aforementioned three-color spectrophotometric method for every narrow effective wavelength range or every particular effective wavelength as mentioned above is referred to herein as the M-color spectrophotometric method, which employs the three-color spectrophotometric method.

Figure 8:
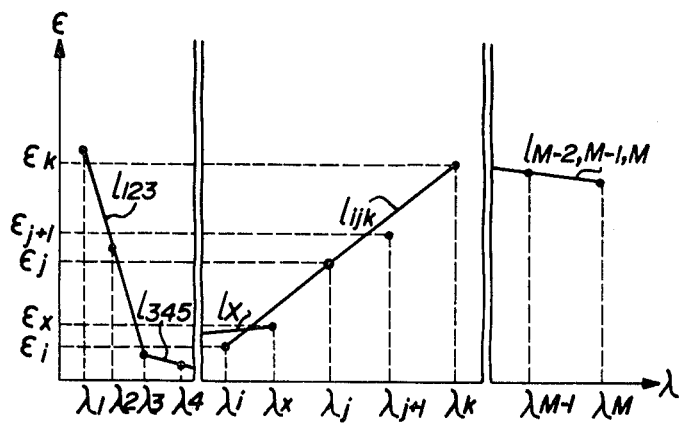
FIG. 8 is a graph showing spectral emissivity versus wavelength plot segments used for the illustration of the M-color spectrophotometric method making use of the three-color spectrophotometry.

FIG. 8 illustrates a case of measuring the spectral factor $\epsilon$ for individual effective wavelengths and temperature T by the M-color spectrophotometric method making use of the three-color spectrophotometric method. Again in FIG. 8, the ordinate is taken for the spectral factor $\epsilon$, and the abscissa fo the effective wavelength $\lambda$. M effective wavelengths are given on the abscissa. As mentioned earlier, in this method the spectral factor $\epsilon$ for each effective wavelength and temperature T is obtained under the assumption that the relation of equation (207) holds for every three given effective wavelengths in a narrow wavelength range or every three particular effective wavelengths. In FIG. 8, the relation of the spectral factor $\epsilon_1$, $\epsilon_2$ and $\epsilon_3$ to the effective wavelength $\lambda_1$, $\lambda_2$ and $\lambda_3$ is approximated by a line segment $l_{123}$; the relation of $\epsilon_3$, $\epsilon_4$ and $\epsilon_5$ to $\lambda_3$, $\lambda_4$ and $\lambda_5$ is approximated by a line segment $l_{345}$; the relation of $\epsilon_i$, $\epsilon_j$ and $\epsilon_k$ to $\lambda_i$, $\lambda_j$ and $\lambda_k$ is approximated by a line segment $l_{ijk}$; and the relation of $\epsilon_{M-2}$ (not shown), $\epsilon_{M-1}$ and $\epsilon_M$ to $\lambda_{M-2}$ (not shown), $\lambda_{M-1}$ and $\lambda_M$ is approximated by a line segment $l_{M-2\ M-1\ M}$.

Here, $\lambda_i$, $\lambda_j$ and $\lambda_k$ need not be adjacent to one another, and there may be other intervening effective wavelengths such as $\lambda_x$ and $\lambda_{j+1}$. Also, the spectral factor $\epsilon_x$ corresponding to the effective wavelength $\lambda_x$ is free to be found on the line segment $l_x$, the spectral factor $\epsilon_{j+1}$ corresponding to the effective wavelength $\lambda_{j+1}$ for the calculations based on the three-color spectrophotometric method may be avoided and the spectral factor $\epsilon_3$ corresponding to the effective wavelength $\lambda_3$ for both of the line segments $l_{123}$ and $l_{345}$ may be used repeatedly. Further, the monochromator for the wavelength $\lambda_x$ may be omitted, thus eliminating the corresponding electric detection value $X_x$, and the imaginary spectral factor $\epsilon_x$ against the imaginary effective wavelength $\lambda_x$ derived from the effective wavelengths $\lambda_i$ and $\lambda_j$ and the corresponding electric detection values $X_i$ and $X_j$ may be employed.

When the electric detection values $X_i$, $X_j$ and $X_k$ for the subgroup of these three effective wavelengths $\lambda_i$, $\lambda_j$ and $\lambda_k$ are fixed, and the relation of $\epsilon_i$, $\epsilon_j$ and $\epsilon_k$ to $\lambda_i$, $\lambda_j$ and $\lambda_k$ is regarded to be capable of being expressed by equation (207) similar to the aforementioned three-color spectrophotometric method, the two different kinds of the measured values of spectral factor $\epsilon_i$, $\epsilon_j$ and $\epsilon_k$ corresponding to the respective effective wavelengths $\lambda_i$, $\lambda_j$ and $\lambda_k$ of the subgroup and temperature T are obtained for each subgroup by solving equation (207) using the aforementioned values $X_i$, $X_j$ and $X_k$.

While the spectral factor $\epsilon$ for the individual effective wavelengths and temperature T that are measured in the above way are univalent in nature, in the measurement system, multiple values (equal in number to double the number of subgroups) are obtained. As to these plurality of values, of two different types, for each subgroup those of either type are selected as the spectral factor $\epsilon$ and temperature T. At this time, the measured values for each of the subgroups are compared and studied so that the spectral factor and temperature may be consistently determined.

In one method, the temperature values for the individual subgroups are averaged to obtain the average temperature $T_0$. From this average temperature the spectral factor $\epsilon_1$ for each effective wavelength is obtained using an equation $$\epsilon_1 = \frac{X_i \lambda_i^5}{g_i C_1} \exp \frac{C_2}{\lambda_i T_0} \tag{217}$$

Also, by choosing the effective wavelengths such as to satisfy a relation $$\frac{1}{\lambda_i} - \frac{1}{\lambda_{i+1}} = \alpha \tag{208'}$$

(where $\alpha$ is a constant, and $i = 1, 2, \ldots, M-1$) and forming each subgroup with three consequtive effective wavelengths, the average temperature $T_0$ is given as $$T_0 = (T_{123} + T_{234} + \ldots + T_{M-2\,M-1\,M}) \cdot \frac{1}{M-2} \tag{218}$$

$$= \ln\left(\frac{X_{M-1} X_M g_1 g_2 \lambda_{M-1}^4 \lambda_M^4 k_{123} k_{234} \cdots k_{M-2\,M-1\,M}}{X_1 X_2 g_{M-1} g_M \lambda_1^4 \lambda_2^4 \bar{k}_{123} \bar{k}_{234} \cdots \bar{k}_{M-2\,M-1\,M}}\right)^{\frac{-1}{2C_2\alpha}} \times$$

-continued $$\frac{1}{M-2}$$

where $k_{i\,i+1\,i+2}$ and $\bar{k}_{i\,i+1\,i+2}$ ($i = 1, 2, \ldots, M-2$) are values obtained by adopting equations (213), (214) and (215), (216) for the subgroup of effective wavelengths $\lambda_i$, $\lambda_{i+1}$ and $\lambda_{i+2}$.

The aforementioned three-color spectrophotometric method and M-color spectrophotometric method making use of the three-color spectrophotometric method permits approximation of the temperature T and spectral factor $\epsilon$ of a radiator as very simple positive functions, and the obtained values can be directly used as approximations in cases where accurate measurement values are not required. Where accurate measurement values are required, a measuring method which will be described hereinafter has to be used. As will be made apparent hereinafter, in this measuring method approximate values are required for obtaining precise values, and these approximate values are obtainable by the aforementioned three-color spectrophotometric method or M-color spectrophotometric method making use of the three-color spectrophotometric method. Alternatively, values obtained using equations (240-1) or (240-2) to be described later are used to obtain exact measurement values.

In this measuring method, the spectrophotometric system is constructed as an m-channel spectrophotometric system, and Planck's radiation law is used to obtain precise values of the spectral factor and temperature. This method will be hereinafter referred to as precise m-color spectrophotometry.

Denoting the effective wavelength by $\lambda_i$ for any given channel within m different channels of the m-color spectrophotometric system denoting the spectral gain, electrical detection value and spectral factor of the radiator respectively by $g_i$, $X_i$ and $\epsilon_i$ with respect to the effective wavelength $\lambda_i$, and the temperature of the specimen by T, the spectral radiation emission $M_i$ with respect to the effective wavelength $\lambda_i$ is expressed as $$M_i = C_1 \lambda_i^{-5} \left(\exp\left(\frac{C_2}{\lambda_i T}\right) - 1\right)^{-1} \tag{219}$$

where $C_1$ and $C_2$ are of the same values as for Wien's radiation law.

As is well-known, the spectral radiation emission $M_i$ and electric detection value $X_i$ are related to each other as $$X_i = g_i \epsilon_i M_i \tag{220}$$

$$= g_i \epsilon_i C_1 \lambda_i^{-5} \left(\exp \frac{1}{\lambda_i T} - 1\right)^{-1}$$

From equation (220) we can obtain an equation relating the spectral factor $\epsilon_i$, temperature T, effective wavelength $\lambda_i$, spectral gain $g_i$ and electrical detection value $X_i$ as $$\epsilon_i = \frac{X_i}{g_i M_i} = \frac{X_i \lambda_i^5}{g_i C_1} \left(y^{\frac{1}{\lambda_i}} - 1\right) \tag{221}$$

where $$y = \exp \frac{C_2}{T} \qquad (222)$$

While the spectral factor $\epsilon_i$ for the effective wavelength $\lambda_i$ can take utterly free values between 0 and 1, the following restrictive condition to provide for $m-1$ possible values in mutual subordinate relations is established.

$$\epsilon(\epsilon_1, \epsilon_2, \ldots, \epsilon_m) = 0 \qquad (223)$$

The form of the function $\epsilon$ in equation (223) can be appropriately determined. The solution of equation (223) simultaneously equation (221) consisting of a set of m equations can be solved directly with an digital computer to obtain y, i.e., temperature T, and m values of the spectral factor $\epsilon_1, \epsilon_2, \ldots, \epsilon_m$.

Now, a special case of equation (223), in which the spectral factor corresponding to the effective wavelength $\lambda_i$ is approximated by the following $(m-2)$-th-degree polynomial and m sets of co-ordinates $(\lambda_1, \epsilon_1)$, $(\lambda_2, \epsilon_2), \ldots, (\lambda_m, \epsilon_m)$ are all regarded to be found on a curve represented by the $(m-2)$-th-degree polynomial, will be described in detail. In the other cases, a one-dimensional irrational equation with respect to the temperature T can be readily developed similarly to the process of developing equation (225), and thus the detailed description is omitted.

$$\sum_{i=1}^{m} A_i \epsilon_i = 0 \qquad (223')$$

$$A_i = (-1)^{i-1} \pi(\lambda_k - \lambda_j) \qquad (224)$$

where k and j are natural numbers satisfying conditions $k \neq i$, $j \neq i$, $k < j$, $2 \leq k \leq m$, $1 \leq j \leq m-1$. The expression $\pi(\lambda_k - \lambda_j)$ in equation (224) represents a product obtained by multiplying the factor $(\lambda_k - \lambda_j)$ with respect to all of the combinations of k and j.

From equations (221) and (223') the following irrational equations are derived.

$$\sum_{i=1}^{m} B_i y^{\frac{1}{\lambda_i}} - \sum_{i=1}^{m} B_i = 0 \qquad (225)$$

$$B_i = \frac{X_i \lambda_i^5}{g_i C_1} A_i \qquad (226)$$

By substituting $$H(y) = \sum_{i=1}^{m} B_i y^{\frac{1}{\lambda_i}} - \sum_{i=1}^{m} B_i \qquad (227)$$

into the left side of equation (225), differentiation of H(y) with respect to y yields $$\frac{\partial H(y)}{\partial y} = \sum_{i=1}^{m} D_i y^{\frac{1}{\lambda_i} - 1} \qquad (228)$$

$$D_i = \frac{X_i \lambda_i^4}{g_i C_1} A_i \qquad (229)$$

Equation (225) is solved for y using equations (228) and (229) on the basis of Newton-Raphson's law which is well-known for numerical calculations. The iterative expression for deriving y is $$y = y_0 - \frac{H(y_0)}{\frac{\partial H(y)}{\partial y}\bigg|_{y=y_0}} \qquad (230)$$

In equation (230), the values of H(y) and $$\frac{\partial H(y)}{\partial y}$$

for $y = y_0$ are respectively expressed as $H(y_0)$ and $$\frac{\partial H(y)}{\partial y}\bigg|_{y=y_0}$$

$y_0$ is the initial value of y. It is possible to substitute as the initial value $y_0$ for obtaining y the measured values obtained by the aforementioned three-color spectrophotometry or M-color spectrophotometry making use of the three-color spectrophotometry or values obtained by using equations (240-1) or (240-2) (to be described later) into equation (222), and by so doing the calculation time can be reduced. From y obtained in this way the measured values of the spectral factor and temperature are obtained using equations (221) and (222).

The measured values obtained in this way are of m different kinds. From these m different kinds of measured values the right measured value is obtained in the following way. Negative temperature values, infinity temperature and spectral factor values which are negative or greater than blackbody ($\epsilon = 1$) are discarded, and also measured values strongly showing the tendency of quasi-light sources in relation to other values are discarded. In this way, right measured values are selected so that the temperature and spectral factor can be consistently determined. The values other than these measured values are "quasi-measured values."

The "quasi-measured value" means the presence of a quasi-light source for making the same the measured value about the radiator. It is possible to cover a perfect blackbody at a certain color temperature with a suitable filter such that the blackbody covered therewith provides the same radiant flux as that from another perfect blackbody at a different color temperature, thus producing a quasi-light source at that different color temperature.

While in the description so far no particular relation among the individual effective wavelengths is selected, by selecting an m-color spectrophotometric system such that there holds a relation $$\frac{1}{\lambda_i} - \frac{1}{\lambda_{i+1}} = \alpha \qquad (208'')$$

(where $i = 1, 2, \ldots, m-1$, and $\lambda_m$ is selected within a range from a value very close to zero to infinity) with respect to the effective wavelengths within the m-channel effective wavelength range, from equation (225) there can be obtained $$y^{\frac{1}{\lambda_m}} \sum_{i=1}^{m} F_i y^{(m-i)\alpha} - \sum_{i=1}^{m} F_i = 0 \qquad (225')$$

and $$F_i = (-1)^{i-1}{}_{m-1}C_{i-1}\frac{X_{igl}}{X_{igi}}\left(\frac{\lambda_i}{\lambda_l}\right)^{7-m} \quad (231)$$

Equation (231) represents the combination $$_{m-1}C_{i-1} = \frac{(m-1)!}{(i-1)!(m-i)!}$$

Equation (225') is solved for y on the basis of the Newton-Raphson's law similar to the case of equation (225), and from the value of y thus obtained the right values of spectral factor and temperature are obtained in a manner similar to the case where there is no relation of equation (208″) concerning the effective wavelengths.

A variety of the aforementioned M-color spectrophotometric method making use of the three-color spectrophotometric method, namely a measuring method making use of the precise m-color spectrophotometric method in lieu of the three-color spectrophotometric method, i.e., M-color spectrophotometric method making use of the precise m-color spectrophotometry, will now be described.

In the M-color spectrophotometry making use of the precise m-color spectrophotometric method, measurement of the temperature and spectral factor is made with the precise m-color spectrophotometry with respect to the effective wavelengths in subgroups of suitably selected m channels among M ($M \geq m \geq 3$) channels. This method eliminates errors that are introduced in the case of the M-color spectrophotometric method making use of the three-color spectrophotometry, namely those due to the Wien's radiation law and those due to the approximation of distribution of spectral factor by a straight line.

Again in this method, as in the precise m-color spectrophotometric method, m different measured values are obtained for each subgroup. From these measured values those which are mutually spaced apart are discarded through the comparison of the individual subgroups by using the same method as employed in the case of the M-color spectrophotometric method making use of the three-color spectrophotometric method, and the right measured value is selected as the average temperature value on the basis of the rule of decision by majority. By using this average temperature the spectral factor for each effective wavelength is obtained. The gain $g_i$ in equation (200) is multiplied by the spectral factor thus obtained as weight. Then, the calculation is repeated from the outset for obtaining the spectral factor, and the spectral factor is determined by taking the aforementioned weight into consideration.

For measuring the temperature of a specimen, it is not always necessary to obtain measured values for all the channels. For example, if the specimen is covered with steam, carbon dioxide gas, organic gas, etc. and it is intended to determine the composition by making use of peculiar intermediate infrared absorption characteristics of such gases, the measurement can sometimes be more easily made by setting the effective wavelength of the filter to such peculiar light absorption bands while using none of the detected values of those bands for the measurement of the temperature.

With the aforementioned two measuring methods, i.e., precise m-color spectrophotometric method and M-color spectrophotometric method making use thereof, higher precision can be obtained compared to the first-mentioned two measuring methods for wavelengths above the point defined by Wien's transition rule.

The difference in the measured value between the three-color spectrophotometry method and precise three-color spectrophotometry method with respect to the same radiator will now be discussed.

Setting $$\sum_{i=1}^{m} F_i = 0$$

in equation (225') is the same as using Wien's radiation rule for calculating the radiant flux emission of a perfect blackbody. Since in equation (222) $T \geq 0$, $y \geq 1$, equation (225') can be written as $$\sum_{i=1}^{m} F_i Y^{(m-i)} = 0 \quad (232)$$

and $$Y = \exp\frac{C_2\alpha}{T} \quad (233)$$

Figure 9:
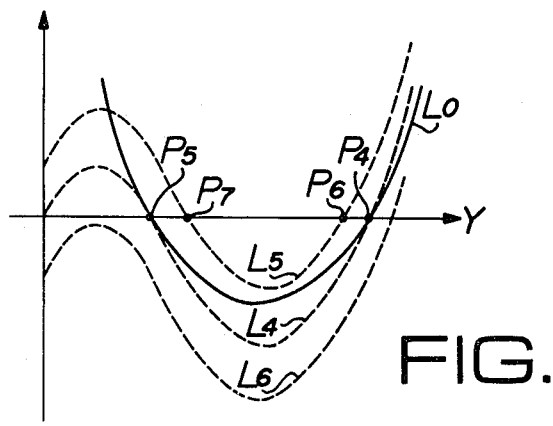
FIG. 9 is a graph showing the difference between the measured values according to the three-color spectrophotometry and those according to the precise three-color spectrophotometry.

Equation (232) is one in which the spectral radiant emission of a perfect blackbody is calculated by Wien's radiation law and the effective wavelengths are chosen such as to satisfy equation (208″) and the spectral factor corresponding to each effective wavelength is approximated by an (m−2)-th degree polynomial. By setting m=3 in equation (232), the aforementioned equations (209), (210) and (211) can be derived. FIG. 9 shows the relation between the root of an equation for obtaining the measured value with the three-color spectrophotometry by setting G(Y) and m=3 in equation (232) and the root of an equation for obtaining the measured value with the precise three-color spectrophotometry by setting m=3 in equation (225'). ($y\alpha = Y$ is set in equation (225').) In FIG. 9, the ordinate is taken for G(Y) or the left side of equation (225'), and the abscissa for Y.

In FIG. 9, plot $L_0$ corresponds to the case of the three-color spectrophotometry. The point $P_4$ of intersection of the plot $L_0$ with the abscissa axis represents $Y_1$ used for obtaining the first kind of values on the basis of the three-color spectrophotometry, and the point $P_5$ represents $Y_2$ used for obtaining the second kind of values.

Plots $L_4$, $L_5$ and $L_6$ all correspond to the case of the precise three-color spectrophotometry. The plot $L_5$ is obtained for $$\sum_{i=1}^{m} F_i < 0,$$

the plot $L_6$ is obtained for $$\sum_{i=1}^{m} F_i > 0$$

and the plot $L_4$ is obtained for $$\sum_{i=1}^{m} F_i = 0.$$

The intersections of the plot $L_4$ with the abscissa axis are the origin and those coinciding with the intersections of the plot $L_0$ with the abscissa axis.

In the precise three-color spectrophotometry generally $$\sum_{i=1}^{m} F_i \neq 0,$$

so that the root of equation (225′) with $m=3$ is obtained as the intersections of the plot $L_6$ or plot $L_5$ with the abscissa axis. By using the intersection points $P_4$ and $P_5$ as the initial values for obtaining the root, the values of, for instance, the points $P_6$ and $P_7$ are obtained from the iterative equation (230).

Now, the extent of measurement error in case when the relative approximation between spectral factor and the effective wavelength by a first-degree polynomia differs from the true value will be discussed with reference to FIG. 6.

While it has been assumed that the value of the spectral factor $\epsilon_1$, $\epsilon_2$ and $\epsilon_3$ for the effective wavelengths $\lambda_1$, $\lambda_2$ and $\lambda_3$ lie on the straight line L in FIG. 6, if the true spectral factor $\epsilon_0$ with respect to the effective wavelength $\lambda_2$ is found at a co-ordinate point $(\lambda_2, P_2')$, equations (205) and (207) should be written respectively as $$X_2 = g_2 \epsilon_0 C_1 \lambda_2^{-5} \exp \frac{-C_2}{\lambda_2 T} \quad (205')$$

and $$\epsilon_1(\lambda_2 - \lambda_3) + d\epsilon_0(\lambda_3 - \lambda_1) + \epsilon_3(\lambda_1 - \lambda_2) = 0 \quad (207')$$

In equation (207′) $d\epsilon_0 = \epsilon_2$.

Thus, the measured value in the three-color spectrophotometry obtained by using equations (205) and (207) should be corrected as follows.

For the first kind of measured values, $$\epsilon_0 = \left( \frac{d + \sqrt{d^2 - \omega}}{1 + \sqrt{1 - \omega}} \right)^{\frac{\lambda_3 + \lambda_1}{\lambda_3 - \lambda_1}} \cdot \epsilon_2 \quad (234)$$

and for the second kind of measured values, $$\epsilon_0 = \left( \frac{d - \sqrt{d^2 - \omega}}{1 - \sqrt{1 - \omega}} \right) \cdot \epsilon_2 \quad (235)$$

where $\omega = \frac{X_1 X_3 g_2^2 \lambda_1^4 \lambda_3^4}{X_2^2 g_1 g_3 \lambda_2^8}$ This means that in the case of the three-color spectrophotometry measurement errors remain. These errors are eliminated by increasing the value of m or M. Alternatively, where the radiator is predetermined and the tendency of the irregularity of the distribution of the spectral factor values is previously known, the relevant factors are incorporated as weight into the spectral gain $g_i$.

Furthermore, the effects of the assumption of the spectral factor upon the measured value of the temperature will be discussed, and thereafter the errors that result with the prior-art two-color spectrophotometry will be set forth.

In the case of approximating the spectral factor by the first-degree polynomial of the effective wavelength as shown in FIG. 6, by setting $$t = \frac{\lambda_3 \epsilon_1}{\lambda_1 \epsilon_3} \quad (236)$$

from equations (210′) and (212′) we obtain $$t = \frac{k}{k} \quad (236')$$

Denoting the measured value of temperature when $t = t_0$ by $T_0$, if the value of t has to be expressed as $t = t_0 + \Delta t$, the measured value of temperature at $t = t_0 + \Delta t$ is also changed to $T_0 + \Delta T_0$. The error $\Delta T_0$ can be obtained from equation (209) and is given as $$\Delta T_0 = -\frac{T_0^2}{2\alpha C_2 t_0} \Delta t \quad (237)$$

When making measurement by assuming $\epsilon_1 = \epsilon_2 = \epsilon_3$, i.e., by assuming the specimen to be a graybody $$t_0 = \frac{\lambda_3}{\lambda_1}$$

can be obtained from equation (236). If the radiator is colored, that is, if $t \neq t_0$, the error resulting from the graybody assumption is $$\Delta T_0 = \frac{T_0 \lambda_1}{2\alpha C_2 \lambda_3} \Delta t \quad (237')$$

$$= \frac{T_0^2 \lambda_1 (2\lambda_1 - \lambda_2)}{2 C_2 (\lambda_2 - \lambda_1)} \Delta t$$

Equation (237′) indicates that no error results in a special case, namely when $\lambda_3 = \infty$, i.e., when $\lambda_2 = 2\lambda_1$. This two-color spectrophotometry, which has the significance of its existence in that the effective wavelength $\lambda_3$ is set to infinity while maintaing the relation of equation (208) in the three-color spectrophotometry, thus making the analysis with respect to the wavelength $\lambda_3$ meaningless as its limit, is a very special type of two-color spectrophotometry.

In other words, the two-color spectrophotometry which makes the analysis with respect to a very special wavelength ($\lambda_2 = 2\lambda_1$) is included in the three-color spectrophotometry according to the invention, in which the effective wavelength $\lambda_3$ can take any value from a positive value close to 0 up to infinity, and is regarded as three-color spectrophotometry in which the effective wavelength is chosen to satisfy the relation of equations (208′′′)

$$\frac{1}{\lambda_1} - \frac{1}{\lambda_2} = \frac{1}{\lambda_2} \quad \lambda_3 = \infty \quad (208''')$$

As is shown, in the temperature measurement method making use of the effective wavelength $\lambda_2 \neq 2\lambda_1$ and assuming the specimen to be a graybody if the specimen is not a graybody the measurement error as given by equation (237') results. Also, in the prior-art two-color spectrophotometric method in which the relative spectral factor of the specimen is specified in the measurement, if the relative spectral factor of the specimen differs from the specified factor, the measurement error as given by equation (237) results.

Now, the comparison of Y for the measured values obtainable in four-color spectrophotometry, in which the effective wavelength of the spectral factor is approximated as a second-degree polynomial by setting G(Y) for the left side of equation (232) and setting m=4, and Y for the measured values obtainable in the three-color spectrophotometry will be made with reference to FIG. 10, and the difference of these measuring methods from the two-color spectrophotometric method will be discussed.

Figure 10:
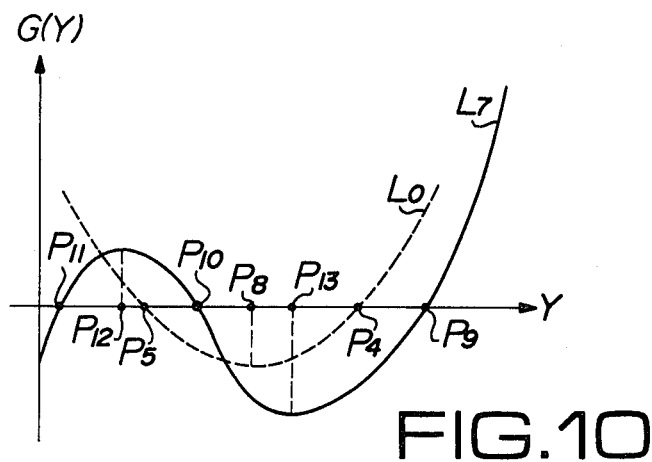
FIG. 10 is a graph showing the differences of the three- and four-color spectrophotometric methods from the prior-art two-color spectrophotometric method.

In FIG. 10, the ordinate is taken for G(Y) given as the left side of equation (232), and the absicissa for Y. Plot $L_0$ is obtained in the case of the three-color spectrophotometry, and it is the same as the plot $L_0$ in FIG. 9. Plot $L_7$ is obtained in the case of the four-color spectrophotometry.

Plot $L_0$ intersects the abscissa axis at points $P_4$ and $P_5$, and plot $L_7$ intersects the abscissa axis at points $P_9$, $P_{10}$ and $P_{11}$. The abscissa co-ordinate for point $P_{12}$, at which the plot $L_7$ is maximum, and the abscissa co-ordinate for point $P_{13}$, at which the plot is minimum, can be obtained by differentiation of the aforementioned G(Y) for Y and solving the result set to zero.

$$\sum_{i=1}^{m-1} \overline{F_i} Y^{m-1-i} = 0 \tag{238}$$

and $$\overline{F^i} = (-1)^{i-1} {}_{m-2}C_{i-1} \frac{X_{iq_1}}{X_{1q_i}} \left(\frac{\lambda_i}{\lambda_1}\right)^{7-m} \tag{239}$$

In equations (238) and (239), the root of equation (238) for m=4, i.e, the value $Y_1$ of the abscissa co-ordinate for the minimum point $P_{13}$ and the value $Y_2$ of the abscissa co-ordinate for the maximum point $P_{12}$, are obtained respectively as $$Y^1 = \frac{X_{2q_1}\lambda_2^3}{X_{1q_2}\lambda_1^3}\left\{1 + \sqrt{1 - \frac{X_1 X_3 q_2^2 \lambda_1^3 \lambda_3^3}{X_2^2 q_1 q_3 \lambda_2^6}}\right\} \tag{240-1}$$

and $$Y^2 = \frac{X_{2q_1}\lambda_2^3}{X_{1q_2}\lambda_1^3}\left\{1 - \sqrt{1 - \frac{X_1 X_3 q_2^2 \lambda_1^3 \lambda_3^3}{X_2^2 q_1 q_3 \lambda_2^6}}\right\}$$

The value $Y_1$ for the point $P_{13}$ is greater than the value $Y_2$ for the point $P_{12}$, which is either a positive value or 0. Considering equation (209'), point $P_5$ is found between points $P_{12}$ and $P_{13}$, and point $P_4$ is found to be greater in value than point $P_{13}$.

Denoting the value of Y for the minimum $P_8$ of plot $L_0$ to $Y_3$ and the value of Y for the abscissa intersection point $P_4$ to $Y_4$ and also denoting the value of the root Y of equation (232) where m=2 is set corresponding to two-color spectrophotometry, by $Y_5$, there is obtained $$\left.\begin{aligned}Y_3 &= \frac{X_{2g_1}\lambda_2^4}{X_{1g_2}\lambda_1^4} \\ Y_4 &= \frac{X_{2g_1}\lambda_2^4}{X_{1g_2}\lambda_1^4} k \\ Y_5 &= \frac{X_{2g_1}\lambda_2^4}{X_{1g_2}\lambda_1^4} \cdot \frac{\lambda_2}{\lambda_1}\end{aligned}\right\} \tag{240-2}$$

where $1 \leq k \leq 2$ and $1 < \lambda_2/\lambda_1$. Generally, $k \neq \lambda_2/\lambda_1$, and the measured values in the case of the two-color spectrophotometry do not coincide with those in the case of the three-color spectrophotometry. The values of Y obtained from equations (240-1) and (240-2) can be utilized as initial values for solving equation (225).

Now, a measuring system for carrying out the measuring methods described above will be shown.

Figure 11:
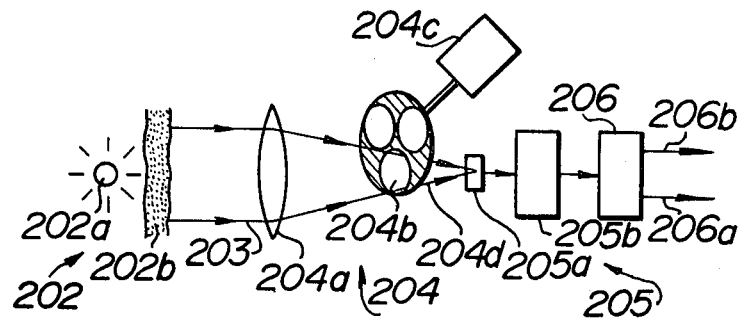
FIGS. 11 and 12 show respective spectral factor measuring systems as fourth and fifth embodiments of the invention.

FIG. 11 shows a fourth embodiment of the invention, which is a system 201 for measuring the spectral emissivity. The system 201 comprises a spectrophotometric system 204 for spectrally analyzing the radiant flux 203 from a specimen (light source) 202 under thermal radiation into at least three channels, a converting means 205 for converting the analyzed radiation flux 204d produced from the spectrophotometric section 204 into an electric value, and a calculating unit 206.

The specimen 202 consists of a film 202b of unknown spectral emissivity covering a perfect blackbody 202a of unknown temperature.

The spectrophotometric system 204 includes a condenser 204a, a plurality of color filters 204b for spectrally analyzing the light from the condenser into at least three different channels of different effective wavelengths and a select switch 204c for switching these filters 204b.

The converting means 205 includes a photoelectric converter 205a and an A-D converter 205b, which is incorporated since the instant embodiment adopts digital calculations.

The calculating unit 206 includes a memory, which memorizes the electric detection values (digital values) for the individual effective wavelengths produced from the converting means 205 and also memorizes as known data the values which are always known, such as the spectral transmittance of the filters 204b, spectral gain g incorporating the gain of the A-D converter 205b and so forth, and each effective wavelength λ as well as the optical constants $C_1$ and $C_2$, and a calculating means for obtaining a required number of, for instance m (M≦m≦3), electric detection values, g, λ, $C_1$ and $C_2$ from the memory and calculating the spectral emissivity from the obtained m electric detection values under a condition provided to constrict the relation among the temperature of the light source 202 and m spectral emissivity values so as to provide for m−1 possible values.

With the spectral emissivity measuring system of the above construction, the spectral emissivity of the specimen is measured in the following way.

The radiant flux 203 from the specimen 202 is spectrally analyzed in the spectrophotometric system 204, and each spectrum 204d therefrom is converted in the converting means 205 into an electric value.

These electric detection values are memorized in the memory for the individual effective wavelengths.

Part or all of these electric detection values are directly read out, and the temperature of the specimen 202 and the spectral emissivity values thereof for the individual effective wavelengths are obtained by the aforementioned three-color spectrophotometric method, M-color spectrophotometric method making use of the three-color spectrophotometry, precise m-color spectrophotometric method or M-color spectrophotometric method making use of the precise m-color spectrophotometric method.

Since in the above measurement the prior art conditions are not provided for the spectral emissivity itself of the specimen, but $m-1$ possible values are provided even though these result in an approximation, the temperature of a specimen having whatever spectral emissivity, i.e., of either a graybody or a colored body, can be accurately measured. The calculations may be simplified by using an $(m-2)$-th degree equation for the approximation of the spectral emissivity of the specimen.

Further, if the filters in the spectrophotometric system 204 are constructed by choosing their effective wavelengths such as to satisfy a particular relation as given by the aforementioned equation (208), (208'), (208''') or (208'''), the arithmetic processing involved, which is simplified even without such setting, can be extremely simplified.

Furthermore, since $m-1$ possible values are provided for the spectral emissivity of the specimen, any special illumination light source for the measurement of spectral factor of a specimen prior to measurement of the temperature thereof, for instance for estimating the emissivity through measurement of reflectance, is not necessary.

Further, by the measuring method according to the invention it is possible to identify a quasi-light source, i.e., a light source having the same color temperature.

Further, the temperature can be measured without being affected by clouding or color of the objective lens in the measuring system.

If the spectral emissivity values of various substances are previously provided in the measuring system, the analysis of the composition of the specimen can be obtained from the correlation between the known spectral emissivity and the measured spectral emissivity.

Moreover, since the thermal radiation of the specimen is employed, the analysis of a composition of the specimen which has to be kept in darkness may likewise be obtained.

Figure 12:
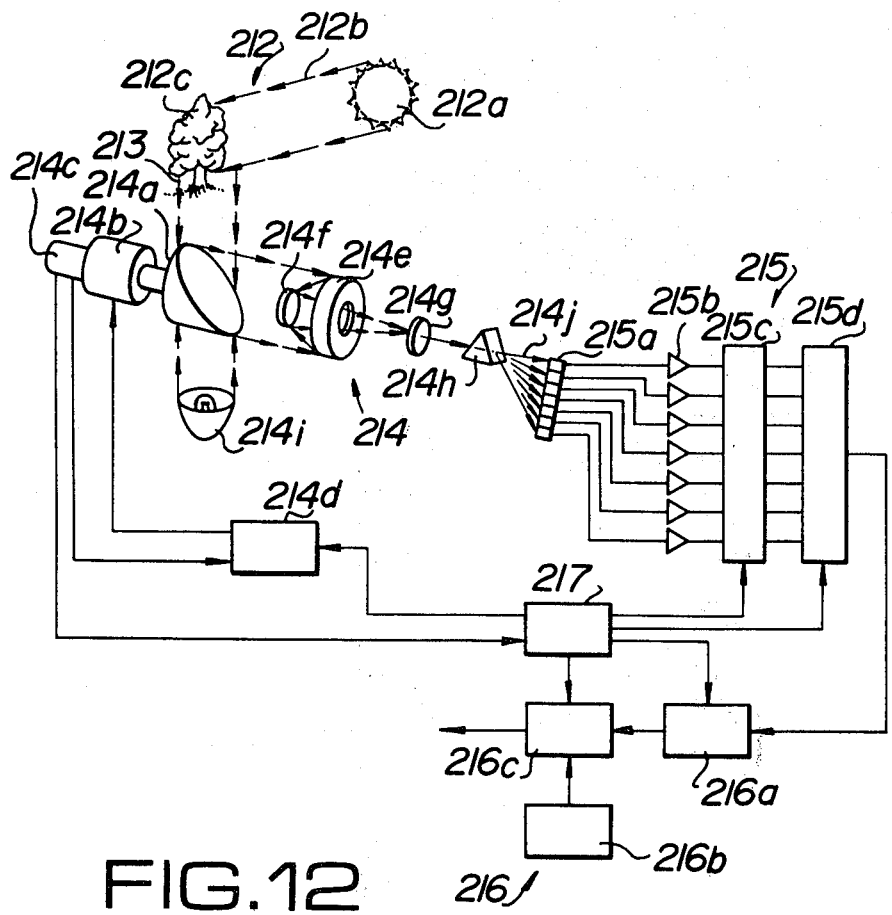

FIG. 12 shows a fifth embodiment of the invention, which is a system 211 for measuring the spectral factor.

In this embodiment, a specimen 212, a spectrophotometric system 214, a converting means 215 and a calculating unit 216 differ from the corresponding parts in the preceding fourth embodiment as follows.

The specimen 212 is a body 212c receiving the radiant flux 212b from the sun 212a. The spectrophotometric system 214 includes a scanning mirror 214a, a motor 214b coupled to a shaft of the scanning mirror 214a, an encoder 214c coupled to the shaft of the motor 214b, a motor control unit 214d connected to the output side of the encoder 214c and serving to supply a drive signal to the motor 214b by receiving a control signal from a timing control means 217, which produces the control signal according to a drive program, and the output of the encoder 214c, a main reflector 214e to reflect the radiant flux 213 having been reflected by the scanning mirror 214a, an auxiliary reflector 214f, (these reflectors constituting a telescope), a collimating lens 214g, a prism 214h and a reference light source 214i which are provided, if necessary, for diagnosis of the inside of the system.

The converting means 215 includes photoelectric converters 215a for effective wavelengths corresponding to respective analyzed radiant fluxes 214j obtained from the prism 214h, amplifiers 215b individually provided for the respective photoelectric converters 215a, a sample hold circuit 215c to temporarily store an analog quantity of appropriate values obtained from the amplifiers, a combination of a multiplexer and an A-D converter 215d to convert sampled values of the analog quantity from the amplifiers 215b simultaneously obtained according to a sampling signal from a timing control means 217 into digital values according to a multiplexer synchronizing signal from the timing control means 217 and supply the digital values thus obtained to a memory 216a to be described hereinbelow.

The calculating unit 216 includes the aforementioned memory 216a, which memorizes the electric detection values from the multiplexer and A-D converter 215d in addresses specified by the timing control means 217 as determined from the position of the scanning mirror 214a and the wavelength; a preset memory 216b, in which the effective wavelength $\lambda$, gain g, optical constants $C_1$ and $C_2$, reference data concerning the sun 212a and the body 212c, data concerning the comparison light source 214i and other constants concerning the measuring system are memorized; and a calculator 216c to perform arithmetic data processing as mentioned in connection with the aforementioned measuring methods by reading out requisite values from the memory 216a and preset memory 216b under the control of calculation synchronizing signals from the timing control means 217.

In this system, the measuring process is the same as that in the preceding fourth embodiment except that the body 212c is scanned, that the analyzed radiant fluxes thereof are converted into parallel analog values which are converted to serial digital values and that the measured values are obtained under the control of the timing control means 217, so that the rest of the process is omitted.

Also, the operation and obtainable effects are the same except for that attributable to the aforementioned difference, and thus are not described.

It is possible to replace the sun in the fifth embodiment with an illumination electric lamp. In this case, it is possible to construct the system such that the illumination light source is included in the subject of scanning by the scanning mirror. Further, it is possible to use a zoom telescope in lieu of the telescope constituted by the main and auxiliary reflectors and make the image circle variable. In the fifth embodiment a means often adopted when constructing an optical system, for instance a pinhole for removing the effects of the thermometric radiation of the system, may be provided right before the prism.

The spectral factor measuring systems of FIGS. 11 and 12 may both be used for the measurement of the spectral emissivity by providing slight correction of the arithmetic data processing as mentioned earlier in connection with the aforementioned measuring methods. Also, they may be used likewise for the measurement of the spectral transmittance.

Figure 13:
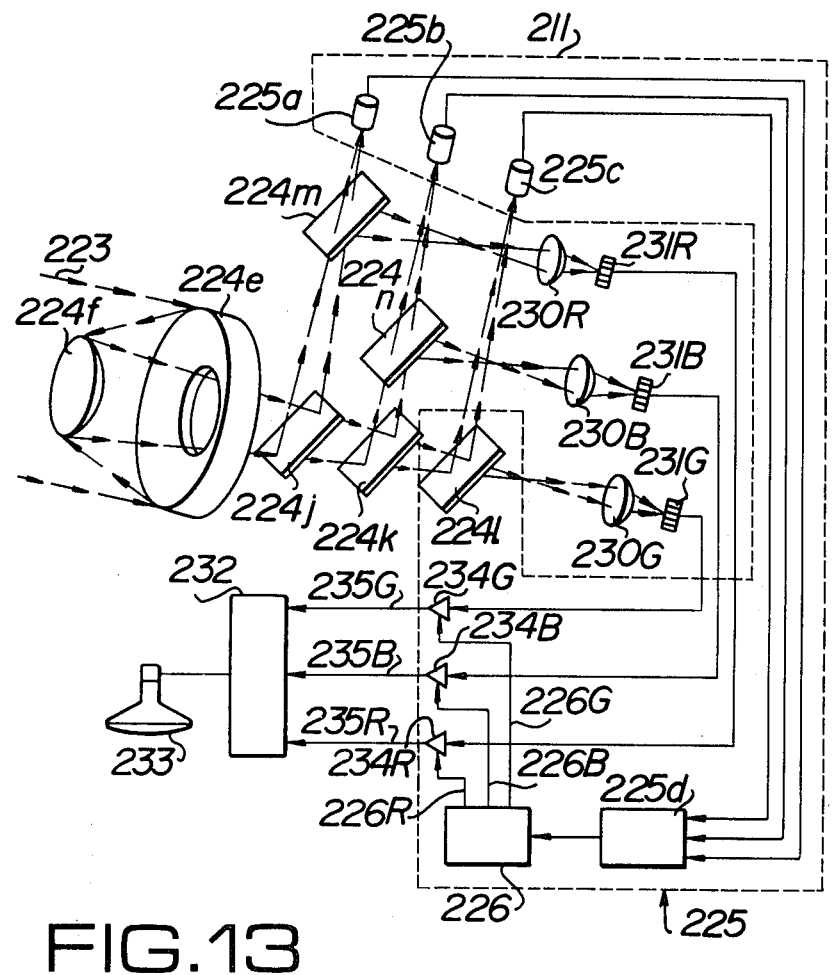
FIG. 13 shows a sixth embodiment of the system according to the invention, which is assembled in a color television set for correcting color distortion that results when the illumination is inadequate.

FIG. 13 shows a sixth embodiment of the invention applied to the case of making color correction of a color television camera device on the basis of the measurement of the temperature of a light source.

In FIG. 13, an objective mirror (consisting of a main reflector 224e and an auxiliary reflector 224f) to receive radiation 223 from a foreground subject (not shown), dichroic mirrors 224j and 224k to spectrally analyze the radiant flux 223 with respect to three wavelengths, a semi-transparent mirror 224m to partly reflect red light reflected by the dichroic mirror 224j, a lens 230R to condense the red light from the semi-transparent mirror 224m, an image sensor 231R to convert the red light from the lens 230R into a red image electric signal, a semi-transparent mirror 224n to partially reflect blue light reflected by the dichroic mirror 224k, a lens 230B to condense the blue light from the semi-transparent mirror 224n, an image sensor 231B to convert the blue light from the lens 230B into a blue image electric signal, a semi-transparent mirror 224l to partially transmit green light from the dichroic mirror 224k, a lens 230G for condensing the green light from the semi-transparent mirror 224l, an image sensor 231G to convert the green light from the lens 230G into a green image electric signal, a modulation/demodulation correction circuit 232 to receive the electric signals from the respective image sensors 231R, 231B and 231G through respective multipliers 234G, 234B, 234R, and a color picture tube 233 to receive an electric video signal from the circuit 232 are parts relevant to the color correction according to the invention.

In the color television camera device shown in FIG. 13, the main reflector 224e, auxiliary reflector 224f and optical path before these parts respectively correspond to the main reflector 214e, auxiliary reflector 214f and optical path before these parts of spectrophotometric system in the FIG. 12 and the dichroic mirrors 224j and 224k and semi-transparent mirrors 224l and 224m correspond to the prism 214h in the FIG. 12 system. Thus, the main reflector 224e, auxiliary reflector 224f, optical path before these parts, dichroic mirrors 224j and 224k and semi-transparent mirrors 224m and 224n constitute a spectrophotometric system 224 of the sixth embodiment of the measuring system.

The photoelectric converters 225a, 225b and 225c corresponding to the respective semi-transparent mirrors 224m, 224n and 224l and multiplexer and A-D converter 225d to convert the analog electric signals from these photoelectric converters into serial electric detection values constitute a converting means of the measuring system of the FIG. 13 embodiment.

A calculator 226 to receive the detection values from the multiplexer and A-D converter 225d constitute a calculating unit of the FIG. 13 embodiment. It performs the afore-mentioned arithmetic data processing to calculate the temperature of the specimen and calculate red, blue and green correction values from the ratio of the analyzed radiant flux of the specimen light source and the analyzed radiant flux of a desired light source, these correction values being fed out to respective output lines 226R, 226B and 226G.

Multipliers 234R, 234B and 234G for the respective image sensors are each provided between each of the image sensors 231R, 231B and 231G and the modulation/demodulation correction circuit 232. In these multipliers, the electric image signals from the individual image sensors are multiplied by the correction values coupled through the corresponding output lines, and red, blue and green image electric signals in the case of a desired light source are coupled from the multipliers corresponding to the respective colors, i.e., red, blue and green multipliers 234R, 234B and 234G, through the lines 235R, 235B and 235G to the modulation/demodulation correction circuit 232. The color correction section is enclosed by a dashed loop 225.

With the measuring system of this embodiment thus assembled in the color television camera device, even if the illumination of the foreground subject is inadequate, it is possible to obtain correct color picture reproduction, In other words, it is possible to correct color distortion resulting from the inadequate illumination of the foreground subject. For example, even if the foreground subject is televised under the illumination of low spectrophotometric temperature at night, i.e., with the main wavelength in the infrared region and containing less visible light, the color of the reproduction can be comparable to that obtainable by daytime photographing. The analyzed radiant flux of the light source illuminating the foreground subject can be determined through measurement of the temperature of the light source by making use of light from the foreground subject so that the difference of the detection values from the detection values that might be obtained for the individual three wavelengths when the foreground subject is illuminated with a light source of a desired analyzed radiant flux can be estimated. That is, the color correction can be made by obtaining the ratio of the two and obtaining the product of the result and the corresponding detection value.

The application of the aforementioned measuring method to a case of temporarily recording analyzed radiant flux images on a recording means, for instance photographic films, and subsequently performing arithmetic data processing similar to that described above by reading out the recorded data will now be described.

Figure 14:
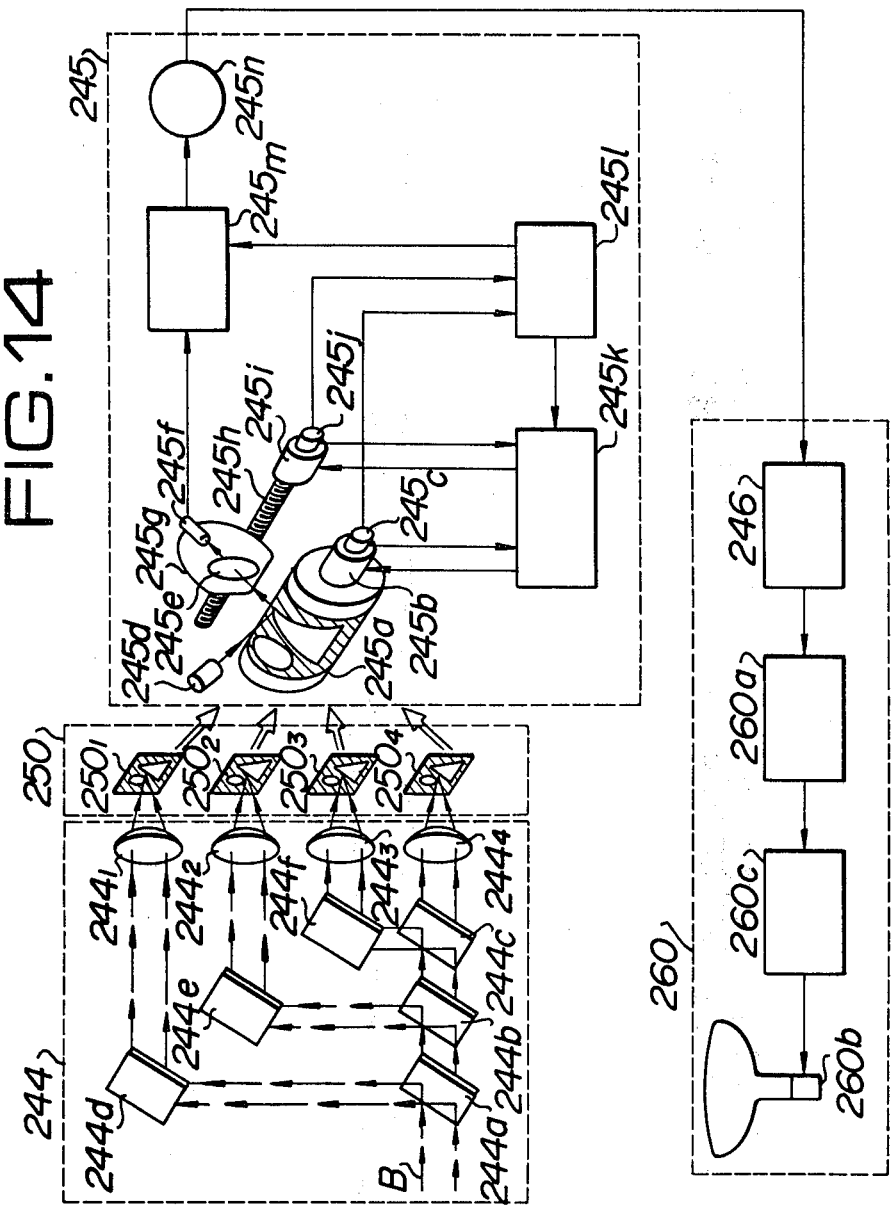
FIG. 14 shows a seventh embodiment of the invention with which a temperature distribution image, a composition image, etc. of the specimen can be displayed by using a means for recording the spectral radiant flux image.

FIG. 14 shows a seventh embodiment of the invention applied to a display system for displaying the temperature distribution image of the composition image of a specimen. Enclosed within a dashed rectangle 224 is the spectrophotometric system of this embodiment. The individual analyzed radiant flux images obtained from this spectrophotometric system 244 are recorded in a recording means 250.

Enclosed within a dashed rectangle 245 is a converting means to convert the values of the coordinates of the individual analyzed radiant flux images into detection values.

Enclosed within a dashed rectangle 260 is an image analysis unit, which includes a calculator 246 to calculate the measured values of temperature and spectral emissivity for the individual image coordinates from the detected values obtained from the converting means 245, a memory 260a to memorize the measured values obtained for all the coordinates of the recorded image, a receiver tube 260b and an interface 260c to convert the individual measured values into video signals for display on the receiver tube 260b.

The spectrophotometric system 244 includes dichroic mirrors 244a, 244b and 244c for successively analyzing the radiant flux B from the specimen (not shown); reflectors 244d, 244e and 244f to reflect the analyzed radiant fluxes from the respective dichroic mirrors; objective lenses $244_1$, $244_2$ and $244_3$ to focus the radiant fluxes from the respective mirrors; and an objective lens $244_4$ to focus the radiant flux transmitted through the dichroic mirror 244c. These analyzed radiant flux images from the respective objective lenses are recorded on a recording means, for instance respective photographic films $250_1$, $250_2$, $250_3$ and $250_4$, of the recording means 250.

The converting means 245 converts the analyzed radiant fluxes for the individual coordinate points of the photographic films into electric digital values through the scanning of the entire coordinates, and has the following construction.

Converting means 245 includes a rotary drum 245a with a photographic film applied to its periphery, a motor 245b to rotate the drum 245a, an encoder 245c mounted on the shaft of the motor 245b, a carriage 245g carrying a light source 245d to illuminate the photographic film on the rotary drum 245a, a lens 245e to focus light from this film and a photoelectric converter 245f to convert the light from the lens 245e into an electric signal, a feed screw 245h to translationally feed the carriage 245g, a motor 245i to rotate the feed screw 245h, an encoder 245j mounted on the shaft of the motor 245i, a motor control 245k to control the drive of the motors 245b and 245i, a timing control 245l to supply a motor drive program signal to the motor control 245k, an A-D converter 245m to convert the analog signals for the individual co-ordinates into the corresponding detected values under the control of a sampling signal from the timing control 245l, and a magnetic tape 245n to memorize the digital values from the A-D converter 245m for the individual coordinates.

In the converting means 245, feedback signals from the encoders 245c and 245j are supplied to the timing control 245l and are also supplied to the motor control 245k while the motor drive program signal is being supplied thereto with the process of the scanning by the optical scanning systems 245d, 245e and 245f so that all the coordinate points of the photographic film can be successively scanned through changes of the relative positions of the rotary drum 245g, which is driven by the motor 245b which is controlled from the motor control 245k, and the optical scanning system on the carriage 245g, which is driven for translational movement by the motor 245i which is controlled by the motor control 245k.

The analog electric signals which are produced through the scanning of the photographic film in the above manner are converted in the A-D converter 245m, which receives the sampling signal from the timing control 245l in synchronism to the scanning of the coordinates, into the digital values which are recorded on the magnetic tape 245n.

The electric detection values read out from the magnetic tape 245n are supplied to the aforementioned image analysis unit 260 for processing, whereby the temperature distribution image of the specimen or composition image thereof obtained from the correlation of the spectral emissivity and temperature of the specimen and those of a known substance (through processing in the calculating unit 246) is displayed on the receiving tube 260b.

The invention will now be described in conjunction with an embodiment thereof for measuring the spectral factor and temperature of a specimen, in which the radiant flux from the specimen is analyzed into M different colors, the temperature of the specimen is calculated from combinations of data for an appropriately selected two among the M analyzed radiant flux colors by assuming the specimen to be a graybody, and the gray factor is corrected to a color-including spectral factor so that a common adequate temperature value can be obtained for any of the two-color combinations.

Figure 15:
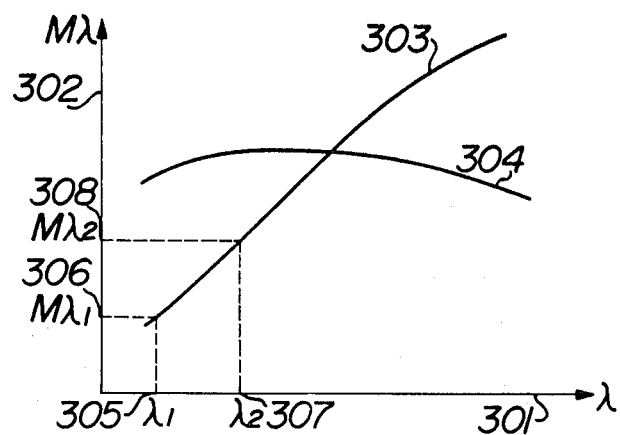
FIG. 15 is a graph showing the relative spectral radiant exitance of graybody.
Figure 16:
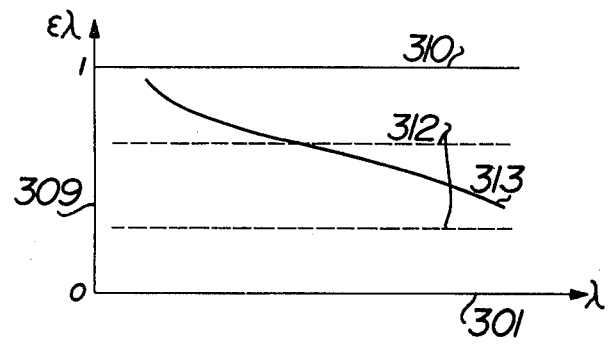
FIG. 16 is a graph showing the spectral emissivity of the specimen.

The analyzed radiant flux distribution and spectral factor which determine the character of the radiant flux from the specimen will be discussed with reference to FIGS. 15 to 17. FIG. 15 is a graph with the ordinate 302 taken for the relative spectral radiant flux emission $M\lambda$ and the abscissa 301 for the wavelength $\lambda$. With the graybody, a characteristic curve which is determined solely by the temperature irrespective of the gray shade inclusive of black is obtained. For example, a curve 303 is obtained at 3,500° K., and a curve 304 at 5,000° K. Thus, if the ratio $M\lambda_2/M\lambda_1$ of the ordinate value $M\lambda_1$ 306 corresponding to the wavelength $\lambda_1$ 305 to the ordinate value $M\lambda_2$ 308 corresponding to the wavelength $\lambda_2$ 307 is known, the curve in question can be identified, so that the temperature can be determined.

The two-color spectrophotometric pyrometer is based upon this principle for measuring the temperature. In FIG. 16, in which the ordinate 309 is taken for the spectral factor $\epsilon\lambda$, for the spectral factor of a blackbody as the specimen, a straight line 310 parallel to the abscissa 301 is obtained. The ordinate value of this is always one. In this case, the measurement of the spectral factor is not needed, and only the temperature may be measured with a single-color spectrophotometric thermometer. When the specimen is a graybody, the shade of which is not clear, the temperature and spectral factor are measured with a two-color spectrophotometric thermometer. The spectral factor in this case is shown as a dashed line 312 parallel to the abscissa 301, that is, it can be measured by merely measuring the distance of the line 312 from the abscissa axis 301. In practice, however, the spectral factor is a complicated function of the wavelength such as given by a curve 313, and the necessity of the system according to the invention is found in this respect.

Figure 17:
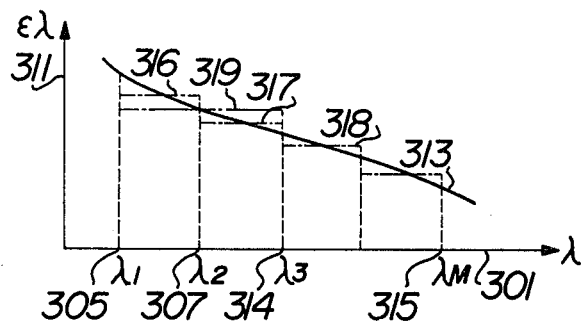
FIG. 17 is a graph showing the approximation of the spectral emissivity of the specimen by the gray emissivity.

FIG. 17 shows the method of approximating the spectral factor of a specimen with the system according to the invention. In FIG. 17, ordinate 311, abscissa 301 and curve 313 respectively correspond to those in FIG. 16. In FIG. 17, abscissa co-ordinate values $\lambda_1$ 305, $\lambda_2$ 307, $\lambda_3$ 314 and $\lambda_M$ 315 of $\lambda$ represents the effective wavelengths for respective M ($M \geq 3$) colors. Dashed line segments 316, 317, 318 and 319 are parallel to the abscissa axis 301 but at unknown distances therefrom. The dashed line segment 316 represents an approximation of the curve 313 over a section $\overline{\lambda_1\lambda_2}$, the dashed line segment 317 represents approximation of the curve 313 over a section $\overline{\lambda_2\lambda_3}$, and the dashed line segment 318 similarly represents an approximation. The dashed line segment 319 represents an approximation of the curve 313 over a section $\overline{\lambda_1\lambda_3}$.

The measuring principles underlying the system according to the invention combine some of the obtained data as the result of analysis into M colors, for instance the effective wavelengths $\lambda_1$ and $\lambda_2$, regard the spectral factor of the specimen to be represented by the dashed line segment 316 and determine the temperature and spectral factor represented by the distance of the dashed line segment 316 from the abscissa axis on the basis of the measuring principles of the two-color spectrophotographic thermometer described earlier in connection with FIGS. 15 and 16. The combination of the effective wavelengths $\lambda_2$ and $\lambda_3$ similarly permits the distance of the dashed line segment 317 from the abscissa axis 301.

By combining the dashed line segments as shown above, the curve 313 is approximated. However, since the slope of the curve 313 and the slope of the dashed line segments (=0) do not coincide, the measured values of the temperature varies with the manner of combining effective wavelengths in practice, and thus the correction of the slope is desired for more accurate measurements. Thus, a method in which the approximation curve of the aforementioned dashed line segments is corrected so that it is no longer parallel to the abscissa axis but has a slope resembling that of the curve 313, thus permitting the same measured temperature value to be obtained for any combination of wavelengths, will now be described.

The spectral radiant flux emission of a blackbody is calculated using Planck's radiation law. The spectral factor of the specimen for an effective wavelength $\lambda_j$ is determined by the physical constants, surface state, shape, positional relation, etc. of the specimen, and it is expressed as $\epsilon_j$. Also, the transmittance of the filter and constants peculiar to the measuring instruments such as those of amplifiers and so forth are previously determined, and they are collectively expressed as $g_j$. Denoting the measured data by $X_j$ a relation of equation (301) [same as equation (220)] can be obtained:

$$X_j = g_j \epsilon_j C_1 \frac{\lambda_j^{-5}}{\exp\left(\frac{C_2}{\lambda_j T}\right) - 1} \tag{301}$$

where $C_1 = 3.74150 \times 10^{-16}$ (in W.m$^2$), $C_2 = 0.0143879$ (in m.deg.), $\lambda_j$ is the effective wavelength of filters (in m), T is the temperature (in °K.), $g_j$ is the spectral gain (in Vm$^3$/W) peculiar to the measuring instrument, $\epsilon_j$ is the spectral factor, $X_j$ is the measured data (in V) and $j = 1, 2, \ldots, M$.

For obtaining the temperature from the combination of i-th and j-th effective wavelengths, equation (302) is used;

$$\frac{X_j}{X_i} = \frac{g_j \epsilon_j}{g_i \epsilon_i} \frac{C_1 \dfrac{\lambda_j^{-5}}{\exp\left(\dfrac{C_2}{\lambda_j t_{ij}}\right) - 1}}{C_1 \dfrac{\lambda_i^{-5}}{\exp\left(\dfrac{C_2}{\lambda_i t_{ij}}\right) - 1}} \tag{302}$$

where $i = 1, 2, \ldots, M$, $j = 1, 2, \ldots, M$, $i \neq j$, and $t_{ij}$ is the temperature obtained from the combination of the i-th and j-th effective wavelengths.

Equation (302) contains the unknowns $\epsilon_i$, $\epsilon_j$ and $t_{ij}$, so that it cannot directly provide the solution. Accordingly, the ratio $\alpha_{ij}$ between $\epsilon_i$ and $\epsilon_j$, namely $$\alpha_{ij} = \frac{\epsilon_j}{\epsilon_i} \tag{303}$$

is regarded to be $\alpha_{ij} = 1$. In so doing equation (302) will contain only one unknown $t_{ij}$ despite the fact that the absolute values of $\epsilon_i$ and $\epsilon_j$ cannot be obtained with the two-color spectrophotometric thermometer. However, once the temperature is obtained, the error $\Delta \alpha_{ij}$ of the assumed value of $\alpha_{ij}$ and the error $\Delta t_{ij}$ of the obtained value of $t_{ij}$ are related by an approximate relation (304);

$$\frac{\Delta t_{ij}}{t_{ij}} = u_{ij} \frac{\Delta \alpha_{ij}}{\alpha_{ij}} \tag{304}$$

where $$u_{ij} = \frac{t_{ij}}{C_2 \left( \dfrac{1}{\left\{1 - \exp\left(\dfrac{-C_2}{\lambda_i t_{ij}}\right)\right\} \lambda_i} - \dfrac{1}{\left\{1 - \exp\left(\dfrac{-C_2}{\lambda_j t_{ij}}\right)\right\} \lambda_j} \right)}$$

Due to the errors involved in equation (304), the calculated value $t_{ij}$ varies with different combinations of the i-th and j-th effective wavelengths.

As the measured value of temperature, the average of these different measured values is used. The average value is substituted into equation (301) to obtain the measured value of the spectral factor for each effective wavelength.

While the average value of temperature thus obtained is based upon the assumption that $\alpha_{ij} = 1$ in equation (303), since an estimation of the state of distribution of the spectral factor is obtained, it is possible to solve equation (302) by assuming $\alpha_{ij}$ afresh for correcting the assumption $\alpha_{ij} = 1$. As this calculation is repeated, $\alpha_{ij}$ and $t_{ij}$ converge to each other, so that the accurate measured value of the spectral factor can be obtained. It is to be noted here that for M=3 two different converged values at most can be obtained, while for M=4 three different converged values at most can be obtained. Therefore, the decision for adopting one of these different values is necessary. For example, a seemingly extraordinary high temperature or spectral factor is precluded. Also, it is necessary to grasp the status of convergence from the state of dispersion of $t_{ij}$. Now, an example taken for M=3 will be discussed with reference to the flow chart of FIG. 18.

First, calculations for two-color analysis are made with respect to three combinations $(\lambda_1, \lambda_2)$, $(\lambda_2, \lambda_3)$ and $(\lambda_3, \lambda_1)$ of two of three effective wavelengths $\lambda_1$, $\lambda_2$ and $\lambda_3$ of the three-color analysis. Then, data $X_1$, $X_2$ and $X_3$ for the respective effective wavelengths are coupled, and in a step 320 the spectral factor is assumed to be as given by the dashed line segments 316, 317 and 319 in FIG. 17. From equation (305)

$$\alpha_{12} = \alpha_{23} = \alpha_{31} = 1 \tag{305}$$

Then in a subsequent step 321 equation (302) is solved to obtain $t_{12}$, $t_{23}$ and $t_{31}$. In the following step 322 the average temperature and dispersion are obtained. If the arithmetic average, for instance, is used to calculate the average temperature, the average temperature is $$\overline{T} = \tfrac{1}{3}(t_{12} + t_{23} + t_{31}) \tag{306}$$

and the dispersion is $$S^2 = \tag{307}$$

$$\frac{1}{3}\left\{\left(\frac{t_{12}}{\bar{t}}-1\right)^2+\left(\frac{t_{23}}{\bar{t}}-1\right)^2+\left(\frac{t_{31}}{\bar{t}}-1\right)^2\right\}$$

In the following step 323 $\epsilon_1$, $\epsilon_2$ and $\epsilon_3$ are obtained by substituting $\bar{t}$ into equation (301).

In the following step 324 whether or not the dispersion $S^2$ is sufficiently small is checked. If it is sufficiently small, an output 325 is produced. If the dispersion $S^2$ is not sufficiently small, the process goes to a step 326, in which $\alpha_{ij}$ is assumed afresh on the basis of $\epsilon_1$, $\epsilon_2$ and $\epsilon_3$. If what is obtained by substituting $\epsilon_1$, $\epsilon_2$ and $\epsilon_3$ into equation (303) is directly used in this assumption, no further convergence is obtained. Accordingly, as $\alpha_{ij}$ is used $$\alpha_{12}=\alpha_{23}=\frac{1}{2}\left(\frac{\epsilon_2}{\epsilon_1}+\frac{\epsilon_3}{\epsilon_2}\right) \quad (308)$$

and also from the relation of equation (303)

$$\alpha_{31}=\frac{1}{\alpha_{12}\alpha_{23}}=\frac{4}{\left(\frac{\epsilon_2}{\epsilon_1}+\frac{\epsilon_3}{\epsilon_2}\right)^2} \quad (309)$$

Also, in the step 326 whether or not the direction of convergence is determined from the observation of the values of $\bar{t}$, $\epsilon_1$, $\epsilon_2$, $\epsilon_3$ and $S^2$, if it is found to be improper, $\alpha_{ij}$ is appropriately assumed without the restrictions of equations (308) and (309).

With the improved assumed value of $\alpha_{ij}$ thus obtained the process returns to the step 321 to repeat the calculations. In this way, the calculations are repeated until the accurate values of temperature and spectral vector are obtained as the output 325. As an alternative to obtaining $\alpha_{ij}$ from equations (308) and (309) there is the following method.

By executing the calculations for obtaining $\epsilon_i$ and $\epsilon_j$ by substituting $t_{ij}$ obtained in the step 321 into equation (301), two different values are obtained for each $\epsilon_1$, $\epsilon_2$ and $\epsilon_3$. These two values are averaged, and $\alpha_{ij}$ is obtained using equation (303) and multiplied by a constant, for instance, to satisfy $\epsilon_{12}\cdot\epsilon_{23}\cdot\epsilon_{31}=1$ to obtain a new assumed value of $\alpha_{ij}$.

Figure 18:
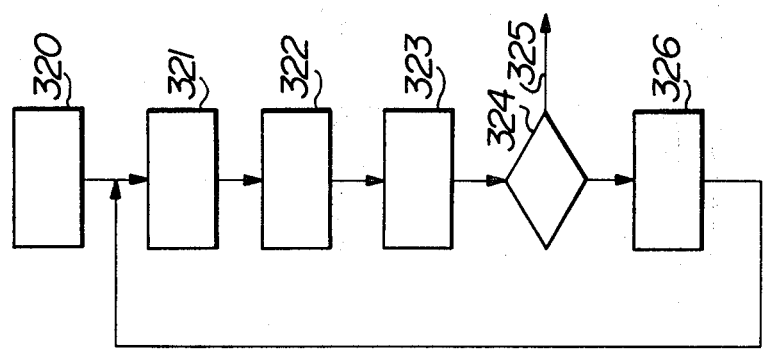
FIG. 18 is a flow chart of arithmetic digital data processing.

The measuring system for carrying out the measuring method described above may have substantially the same construction as the fourth embodiment shown in FIG. 11. In the fourth embodiment of FIG. 11, however, m=2, and the calculating unit includes a memory, which memorizes values concerning the system that are wavelengths, spectral gain and the optical constants $C_1$ and $C_2$, and a calculating means, which calculates the temperature from the measured data of suitably combined two effective wavelengths and data memorized in the memory, this calculation being repeatedly made for various combinations of two effective wavelengths, and determines the spectral emittance from the mutual relations of the results of calculations for the various combinations.

Where Wien's radiation law can be applied to the calculation of the thermal radiation of the specimen, the calculations in the steps 320 and 321 in FIG. 18 are the same as those involved in the prior-art two-color spectrophotometric thermometer. It will be understood that the calculations with electric signals can be executed either with digital means or analog means so long as the calculation formulas are known. The digital means is advantageous because of its simple system even in case of complicated calculations, while it is disadvantageous in that the calculations are slow. The analog means features fast response and the ability to perform continuous calculations, while the system involved is complicated.

Either one of these means is automatically selected depending on the intended application of the measuring system, and the calculating means can be constructed by assembling existing electronic circuitry such as to meet the calculations involved.

Figure 19:
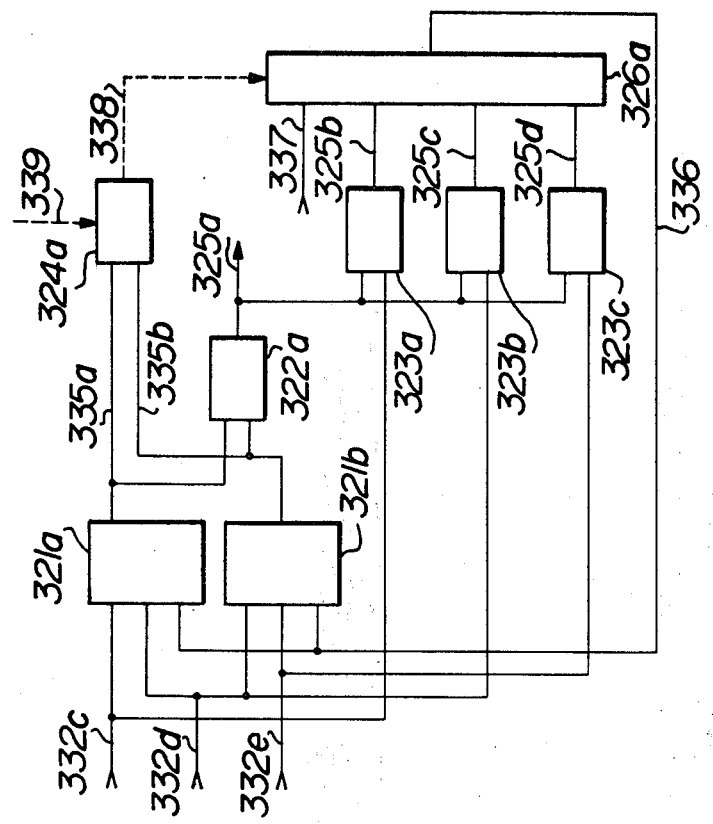
FIG. 19 shows an example of arithmetic analog data processing.

FIG. 19 shows a block diagram of a system using analog processing means, with which the digital processing means shown in FIG. 18 can be replaced if the thermal radiation from the specimen can be approximated by Wien's radiation law. The system of FIG. 19 will now be described in comparison with FIG. 18.

In the circuit of FIG. 19, the temperature is obtained for two two-color combinations $(\lambda_1, \lambda_2)$ and $(\lambda_2, \lambda_3)$ of two among three measured values $X_1$ 332c, $X_2$ 332d and $X_3$ 332e for the respective effective wavelengths $\lambda_1$, $\lambda_2$ and $\lambda_3$, and the calculation for the combination $(\lambda_3, \lambda_1)$ is omitted to simplify the circuit.

Where Wien's radiation law is used in lieu of Planck's radiation law, equation (310) is used in lieu of equation (301);

$$X_j = g_j\epsilon_j C_1 \lambda_j^{-5} \exp\left(\frac{-C_2}{\lambda_j T}\right) \quad (310)$$

where $C_1$, $C_2$, $\lambda_j$, T, $g_j$, $\epsilon_j$ and $X_j$ are the same as in equation (301).

Transfer elements 321a and 321b correspond to the step 321 in FIG. 18, and the transfer function corresponding to equation (302) is given as an equation:

$$\frac{X_j}{X_i} = \frac{g_j\epsilon_j C_1 \lambda_j^{-5} \exp\left(\frac{-C_2}{\lambda_j t_{ij}}\right)}{g_i\epsilon_i C_1 \lambda_i^{-5} \exp\left(\frac{-C_2}{\lambda_i t_{ij}}\right)} \quad (311)$$

or $$t_{ij} = \frac{\left(\frac{1}{\lambda_i}-\frac{1}{\lambda_j}\right)C_2}{\ln\left(\frac{X_j}{X_i}\right) - \ln\alpha_{ij} + \ln\left(\frac{\lambda_j^5 g_i}{\lambda_i^5 g_j}\right)}$$

where $\alpha_{ij}=\epsilon_j/\epsilon_i$ with i=1 and j=2 for the transfer element 321a and i=2 and j=3 for the transfer element 321b.

The transfer element 321a produces $t_{12}$ 335a, and the transfer element 321b produces $t_{23}$ 335b.

A transfer element 322a corresponds to the step 322, and it produces the average temperature $\bar{t}$ 325a. The transfer function for the transfer element 322a corresponding to equation (306) is given as:

$$\bar{t}=\tfrac{1}{2}(t_{12}+t_{23}) \quad (312)$$

Transfer elements 323a, 323b and 323c correspond to the step 323, and produce the respective spectral factor values $\epsilon_1$ 325b, $\epsilon_2$ 325c and $\epsilon_3$ 325d. The transfer function corresponding to equation (301) is given as equation (310), which can be transformed into the form:

$$\epsilon_j = \frac{X_j \lambda_j^5}{g_j C_1} \exp\left(\frac{C_2}{\lambda_j t}\right) \tag{310-a}$$

A transfer element 326a corresponds to the step 326, and it calculates $\alpha_{ij}$ according to equation (308). To the transfer element 326a the initial value $\alpha$337 as $\alpha_{ij}$ is coupled, and either the calculated value $\alpha_{ij}$ or the initial value $\alpha$337 is selected according to a control signal 338 from a decision control element 324a. This element 326a produces the spectral factor $\alpha_{12} = \alpha_{23}$ 336.

The decision control element 324a checks whether $t_{12}$ 335a and $t_{23}$ 335b are close to the same value. If the two are close to each other, it produces a control signal 338 for disconnecting the circuit between the initial value input $\alpha$337 and spectral factor output 336. Also, at the time of starting, it produces a control signal 338 for connecting the circuit between the initial value input 337 and spectral emittance output 336.

As has been mentioned earlier, the convergence is multivalued. In other words, the convergence takes different values depending upon the manner of giving the initial value $\alpha$337. Thus, it is possible to prepare various values of $\alpha$337 so that they can be suitably selected in the start operation 339.

Equation (311) is generally adopted by the calculating means for the two-color spectrophotometric thermometer.

The following description relates to the case in which the specimen is illuminated by illumination light, so that the measurement of the temperature and spectral factor by the aforementioned method is difficult. While in such a case the measurement can be obtained by a multiple light source measuring method which makes the light source emitting the illumination light to be the subject of measurement as well, where the relative spectral radiant flux intensity of the illumination light can be separately measured or assumed, a single light source measuring method for making measurement with respect to a specimen under illumination is employed according to the invention. This method according to the invention permits, in addition to the measurement of the temperature and spectral emissivity, the measurement of the spectral reflectance at the same time, under the assumption that the spectral emissivity and spectral reflectance can take independent values. In the instant method, the term "spectral emissivity" connotes the overall spectral characteristic of all the matter constituting the light path from the specimen to the measuring instrument when the specimen is providing thermal radiation. Also, the term "spectral reflectance" connotes the overall characteristic of all the matter constituting the light path from the illumination light source to the measuring instrument. Thus, the reflected light may contain scattered light, which is attributable to the scattering by water droplets in the light path, i.e., light which may not reach the instrument after reflection by the specimen.

Figure 20:
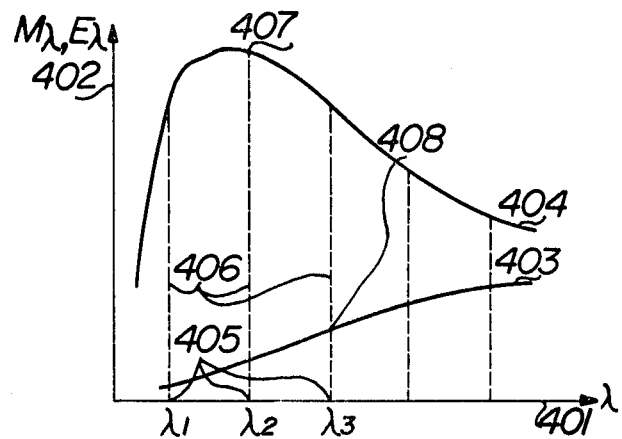
FIG. 20 is a graph showing the relative spectral radiant intensity of illumination light and relative spectral radiant intensity of blackbody.

The principles underlying the measurement in this case will now be described with reference to FIG. 20, which shows the relative spectral radiant flux intensity of the illumination light and the relative spectral flux emission of a blackbody. In the graph of FIG. 20, the ordinate 402 is taken for the relative spectral radiant flux emitance $M_\lambda$ and the relative spectral radiant flux intensity $E_\lambda$, and the abscissa 401 for the effective wavelength $\lambda$. Here, the relative spectral radiant flux emission of the blackbody is represented by a curve 403, which is obtained by calculations using Planck's radiation law. The relative spectral radiant flux intensity of the illumination light is represented by a curve 404, which does not obey Planck's radiation law. Examples of this illumination light are sunlight, and light from a fluorescent lamp. Values $\lambda_1$, $\lambda_2$ and $\lambda_3$ 405 on the abscissa axis 401 represent the effective wavelengths of the individual filters used for th spectrophotometric measurement. In this type of spectrophotometric measurement, the curves 403 and 404 are obtained not through continuous measurement with respect to the wavelength, but by plotting ordinate values corresponding to discrete wavelength values such as those at points 407 and 408 on lines 406 parallel to the ordinate axis 402.

The distributed values in the curve may be measured with the measuring system according to the invention, or they may be separately measured. Where the measurement is made under illumination light, the spectrophotometric method also acts as a means which permits only the illumination light to be incident on the measuring instrument so as to be measured. Also, where measurement is made with respect to a specimen irradiated by solar radiation, the solar spectrum on the ground surface is measured. If the illumination light is provided thermal radiation, measurement of light is not made, but the relative spectral radiant flux intensity of the illumination light is obtained through calculations by measuring the temperature of the radiant flux with a thermocouple or the like. It is preferable that the relative spectral radiant flux intensity of the illumination light be measured at the point as near the place where the specimen stays as possible. Further, where a relative value of the spectral reflectance of the specimen is previously known, it is prefereble that this relative value be included in the relative spectral radiant flux intensity of the illumination light.

From the above considerations, the relative spectral radiant flux intensity of the illumination light for the effective wavelength $\lambda_i$, i.e., the curve 404 in FIG. 20, is defined as $C_1 \lambda_1^{-5} \theta_i$, where $C_1$ is the same value as $C_1$ in equation (401) to be described hereinbelow. The weight $\theta_i$ of the relative spectral radiant flux intensity of the illumination light is of a dispersive character, and the curve 404 thus has hills and valleys. Also, $\theta_i$ is determined such that the spectral reflectance $\rho$ of the specimen changes as smoothly as possible. The true spectral emissivity, denoted by $\epsilon$, is given as $\epsilon = vh$. If the spectral emissivity of the specimen is not known, $h = 1$ is set. If it is known, this value is set as h. The spectral emissivity of the specimen changes smoothly with the wavelength in some cases, while sometimes it changes irregularly as in the case of steam. In the latter case, the measurement is simplified by means of appropriate selection of the effective wavelength of the filter or M-color spectrophotometric method based on the m-color spectrophotometric method under illumination. Even in such a case, the value of h is used for minimizing the effects of hills and valleys that still remain. The character of h is close to hue. The character of v is close to a composite of the brightness and color. Actually, v is a function changing smoothly with the effective wavelength, and it is dealt with as an unknown function in the analysis means according to the invention.

According to the invention, systems for obtaining the temperature, true spectral emissivity and true spectral reflectance of a specimen are provided, and with these systems the true spectral reflectance is absolutely determined together with the data for determining $\theta_i$ once the aforementioned spectral reflectance $\rho$ is obtained.

Also, if the aforementioned v is obtained, the true spectral emissivity $\epsilon$ can be absolutely obtained by using the previously known h. Thus, the main objective of the analysis means of the measuring system according to the invention is to obtain the temperature T and also v and $\rho$, respectively referred to as spectral emissivity and spectral reflectance.

Figure 21:
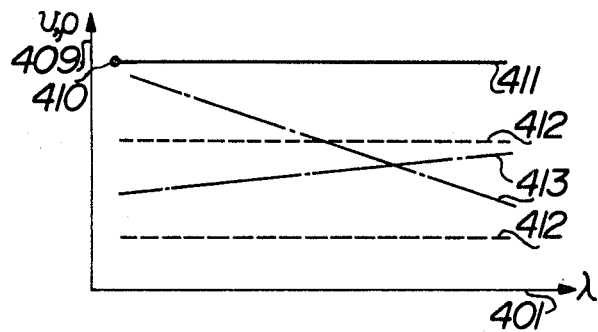
FIG. 21 is a graph showing the spectral factor.

Light incident on the measuring instrument according to the invention may be composite light, which results from the combination of the thermal radiation of a specimen and reflection of an illuminating light. The thermal radiation of a specimen is the radiation which is the result of distortion of the blackbody radiation of the curve 403 due to the true spectral emissivity $\epsilon$. The reflection of the illuminating light is the distortion of the spectral distribution of the illuminating light of curve 403 due to the spectral reflectance $\rho$. FIG. 21 shows a graph with the ordinate 409 taken for the spectral emissivity v and spectral reflectance $\rho$ and the abscissa 401 for the effective wavelength $\lambda$. A straight line 411 passing through a point 410 and parallel to the abscissa axis 401 represents the presence of either radiation or reflection alone. Straight lines 412 parallel to the abscissa axis 401 represent the presence of both radiation and reflection in the same proportions for any wavelength (this state being referred to as gray for convenience sake though actually the definitions of the aforementioned h and $\theta_i$ have to be taken into consideration). Broken lines 413 represent the state in which the proportions of the radiation and reflection vary with the wavelength. Since Kirchhoff's law between the radiation and reflection (radiation + reflection = 1) does not hold, there is no fixed relation between v and $\rho$.

Now, the m-color spectrophotometric method will be described.

In this method, the temperature T of the specimen and the measured data $X_i$ with respect to the effective wavelength $\lambda_i$ are related to each other as equation (401). The effective wavelength $\lambda_i$ is not the main wavelength of the filter, but is a measurement inclusive of the spectral characteristics of lenses and photoelectric converters.

$$X_i = g_i \left[ V_i h_i C_1 \lambda_i^{-5} \frac{1}{\exp\left(\frac{C_2}{\lambda_i T}\right) - 1} + \rho_i C_1 \lambda_i^{-5} \theta_i \right]$$

where $C_1 = 3.74150 \times 10^{-16}$ (W.m²), $C_2 = 0.0143879$ (m.deg.), $\lambda_i$ is the effective wavelength of the filter (known value) (in m), T is the temperature of the specimen (unknown) (in °K.), $g_i$ is the spectral gain peculiar to the instrument (known) (Vm³/W), $v_i$ is the spectral emissivity (unknown), $h_i$ is the weight of the spectral emissivity (known), $\rho_i$ is the spectral reflectance (unknown), $\theta_i$ is the weight of the relative spectral radiant flux intensity of the illuminating light (known), $X_i$ is the measured data (input) (in V) and i = 1, 2, 3, 4, 5.

Rearranging equation (401) gives $$Y_i = v_i u_i + \rho_i \theta_i \quad (402)$$

where $$Y_i = \frac{X_i}{C_1 g_i \lambda_i^{-5}} \quad (403)$$

and $$u_i = \frac{h_i}{\exp\left(\frac{C_2}{\lambda_i T}\right) - 1} \quad (404)$$

$Y_i$ in equation (403) is determined when $x_i$ is input. Either five-color, four-color or three-color spectrophotometric analysis is employed depending upon the subject of measurement. Such types of spectrophotometric analysis will now be individually discussed hereinbelow.

(A) Where the radiation and reflection both have the characteristics of a colored body, the five-color spectrophotometric analysis under illumination is used. In this case, both the spectral emissivity $v_i$ and spectral reflectance $\rho_i$ are regarded as being capable of being expressed as first-degree functions of the effective wavelength $\lambda_i$, namely $$v_i = V_0 + V_1 \lambda_1 \quad (405)$$

$$\rho_i = R_0 + R_1 \lambda_i \quad (406)$$

and thus equations (402), (405) and (406) for i = 1, 2, . . ., 5 contain five unknowns, namely T, $V_0$, $V_1$, $R_0$ and $R_1$. By algebraically eliminating $V_0$, $V_1$, $R_0$ and $R_1$ from equations (402), (405) and (406) a one-unknown equation (407) with the sole temperature T as unknown is obtained.

$$\sum_{i=1}^{5} \sum_{j=i+1}^{5} a_{ij} \frac{u_i}{\theta_i} \frac{u_j}{\theta_j} = 0 \quad (407)$$

where $$\lambda_{ij} = \lambda_i - \lambda_j \quad (408)$$

From (404), $u_i$ and $u_j$ in equation (407) are functions of the sole temperature T set forth unknown. $a_{ij}$ is as in the Table below and is determined when $Y_i$, i.e., input $X_i$ is given.

TABLE $$a_{12} = \frac{Y_3}{\theta_3} - \frac{\lambda_{53}}{\lambda_{54}} \frac{Y_4}{\theta_4} + \frac{\lambda_{43}}{\lambda_{54}} \frac{Y_5}{\theta_5}$$

$$a_{13} = -\frac{\lambda_{31}}{\lambda_{21}} \frac{Y_2}{\theta_2} + \left(\frac{\lambda_{31}\lambda_{42}\lambda_{53}}{\lambda_{21}\lambda_{43}\lambda_{54}} - \frac{\lambda_{31}\lambda_{32}}{\lambda_{21}\lambda_{43}}\right) \frac{Y_4}{\theta_4} - \frac{\lambda_{31}\lambda_{42}}{\lambda_{21}\lambda_{54}} \frac{Y_5}{\theta_5}$$

TABLE-continued $$a_{14} = \frac{\lambda_{41}\lambda_{53}}{\lambda_{21}\lambda_{54}} \frac{Y_2}{\theta_2} + \left(\frac{\lambda_{32}\lambda_{41}}{\lambda_{21}\lambda_{43}} - \frac{\lambda_{41}\lambda_{42}\lambda_{53}}{\lambda_{21}\lambda_{43}\lambda_{54}}\right) \frac{Y_3}{\theta_3} + \frac{\lambda_{32}\lambda_{41}}{\lambda_{21}\lambda_{54}} \frac{Y_5}{\theta_5}$$

$$a_{15} = -\frac{\lambda_{43}\lambda_{51}}{\lambda_{21}\lambda_{54}} \frac{Y_2}{\theta_2} + \frac{\lambda_{42}\lambda_{51}}{\lambda_{21}\lambda_{54}} \frac{Y_3}{\theta_3} - \frac{\lambda_{32}\lambda_{51}}{\lambda_{21}\lambda_{54}} \frac{Y_4}{\theta_4}$$

$$a_{23} = \frac{\lambda_{32}}{\lambda_{21}} \frac{Y_1}{\theta_1} + \left(\frac{\lambda_{31}\lambda_{32}}{\lambda_{21}\lambda_{43}} - \frac{\lambda_{31}\lambda_{42}\lambda_{53}}{\lambda_{21}\lambda_{43}\lambda_{54}} + \frac{\lambda_{53}}{\lambda_{54}}\right) \frac{Y_4}{\theta_4} + \left(\frac{\lambda_{31}\lambda_{42}}{\lambda_{21}\lambda_{54}} - \frac{\lambda_{43}}{\lambda_{54}}\right) \frac{Y_5}{\theta_5}$$

$$a_{24} = -\frac{\lambda_{42}\lambda_{53}}{\lambda_{21}\lambda_{54}} \frac{Y_1}{\theta_1} + \left(\frac{\lambda_{31}\lambda_{42}\lambda_{42}\lambda_{53}}{\lambda_{21}\lambda_{32}\lambda_{43}\lambda_{54}} - \frac{\lambda_{42}\lambda_{53}}{\lambda_{32}\lambda_{54}} - \frac{\lambda_{31}\lambda_{42}}{\lambda_{21}\lambda_{43}}\right) \frac{Y_3}{\theta_3} \frac{\lambda_{31}\lambda_{42}}{\lambda_{21}\lambda_{54}} \frac{Y_5}{\theta_5}$$

$$a_{25} = \frac{\lambda_{43}\lambda_{52}}{\lambda_{21}\lambda_{54}} \frac{Y_1}{\theta_1} + \left(\frac{\lambda_{43}\lambda_{52}}{\lambda_{32}\lambda_{54}} - \frac{\lambda_{31}\lambda_{42}\lambda_{52}}{\lambda_{21}\lambda_{32}\lambda_{54}}\right) \frac{Y_3}{\theta_3} + \frac{\lambda_{31}\lambda_{52}}{\lambda_{21}\lambda_{54}} \frac{Y_4}{\theta_4}$$

$$a_{34} = \left(\frac{\lambda_{42}\lambda_{53}}{\lambda_{21}\lambda_{54}} - \frac{\lambda_{32}}{\lambda_{21}}\right) \frac{Y_1}{\theta_1} + \left(\frac{\lambda_{31}}{\lambda_{21}} - \frac{\lambda_{31}\lambda_{42}\lambda_{53}}{\lambda_{21}\lambda_{32}\lambda_{54}} + \frac{\lambda_{43}\lambda_{53}}{\lambda_{32}\lambda_{54}}\right) \frac{Y_2}{\theta_2} + \frac{\lambda_{43}}{\lambda_{54}} \frac{Y_5}{\theta_5}$$

$$a_{35} = -\frac{\lambda_{42}\lambda_{53}}{\lambda_{21}\lambda_{54}} \frac{Y_1}{\theta_1} + \left(\frac{\lambda_{31}\lambda_{42}\lambda_{53}}{\lambda_{21}\lambda_{32}\lambda_{54}} - \frac{\lambda_{43}\lambda_{53}}{\lambda_{32}\lambda_{54}}\right) \frac{Y_2}{\theta_2} - \frac{\lambda_{53}}{\lambda_{54}} \frac{Y_4}{\theta_4}$$

$$a_{45} = \frac{\lambda_{32}}{\lambda_{21}} \frac{Y_1}{\theta_1} - \frac{\lambda_{31}}{\lambda_{21}} \frac{Y_2}{\theta_2} + \frac{Y_3}{\theta_3}$$

(B) Where the relative spectral emissivity is known for the radiation and only the proportion with respect to the reflection is unknown or the reflection has the characteristics of a colored body, the four-color spectrophotometric analysis under illumination is used.

This analysis is suited for the measurement where the temperature of the specimen is low, the proportion of the thermal radiation is low compared to the reflection and emphasis is placed upon the reflection.

The spectral emissivity $v_i$ is regarded to be an unknown constant, and spectral reflectance $\rho_i$ is regarded to be capable of being expressed as a first-degree function of the effective wavelength:

$$V_i = V_0 \qquad (409)$$

$$\rho_i = R_0 + R_1\lambda_i \qquad (406')$$

In this case, equations (402), (409) and (406') for $i = 1, 2, 3$ and 4 contains four unknowns, namely T, $V_0$, $R_0$ and $R_1$. Algebraic elimination of $V_0$, $R_0$ and $R_1$ in equations (402), (409) and (406') yields a one-unknown equation (410) with the sole temperature T being unknown:

$$-\frac{u_1}{\theta_1} + \left(\frac{\lambda_3 - \lambda_1}{\lambda_3 - \lambda_2} + K\right)\frac{u_2}{\theta_2} - \qquad (410)$$

$$\left(\frac{\lambda_2 - \lambda_1}{\lambda_3 - \lambda_2} + \frac{\lambda_4 - \lambda_2}{\lambda_4 - \lambda_3}K\right)\frac{u_3}{\theta_3} + \frac{\lambda_3 - \lambda_4}{\lambda_4 - \lambda_3} K \frac{u_4}{\theta_4} = 0$$

where $$K = \frac{\dfrac{Y_1}{\theta_1} - \dfrac{\lambda_3 - \lambda_1}{\lambda_3 - \lambda_2} \dfrac{Y_2}{\theta_2} + \dfrac{\lambda_2 - \lambda_1}{\lambda_3 - \lambda_2} \dfrac{Y_3}{\theta_3}}{\dfrac{Y_2}{\theta_2} - \dfrac{\lambda_4 - \lambda_2}{\lambda_4 - \lambda_3} \dfrac{Y_3}{\theta_3} + \dfrac{\lambda_3 - \lambda_2}{\lambda_4 - \lambda_3} \dfrac{Y_4}{\theta_4}} \qquad (411)$$

From equation (404) $u_1$, $u_2$, $u_3$ and $u_4$ in equation (410) are functions of the unknown sole temperature T. Also, K is determined when $Y_i$, i.e., input $X_i$, is given.

(C) Where the relative spectral emissivity of the radiation and the relative spectral reflectance of the reflection are both known and only the proportions of the radiation and reflection are unknown, the three-color spectrophotometric analysis under illumination is used. The spectral emissivity $V_i$ and spectral reflectance $\rho_i$ are both expressed as unknown constants.

$$V_i = V_0 \qquad (409')$$

$$\rho_i = R_0 \qquad (412)$$

In this case, equations (402), (409') and (412) for $i = 1, 2$ and 3 contains three unknowns, namely T, $V_0$ and $R_0$. Algebraic elimination of $V_0$ and $R_0$ in equations (402), (409') and (412) yields a one-unknown equation with the sole temperature T being unknown.

$$\left(\frac{Y_2}{\theta_2} - \frac{Y_3}{\theta_3}\right)\frac{u_1}{\theta_1} + \left(\frac{Y_3}{\theta_3} - \frac{Y_1}{\theta_1}\right)\frac{u_2}{\theta_2} + \qquad (413)$$

$$\left(\frac{Y_1}{\theta_1} - \frac{Y_2}{\theta_2}\right)\frac{u_3}{\theta_3}$$

From equation (404) $u_1$, $u_2$ and $u_3$ in equation (413) are functions of the unknown sole temperature T.

The temperature T of the specimen is obtained using either equation (407), (410) and (413). This T is substituted into equation (402), and two dimensional simultaneous equations concerning $v_i$ and $\rho_i$ are solved to obtain the spectral emissivity and spectral reflectance. At this time, either equations (405) and (406), equations (409) and (406') or equations (409') and (412) are used. Also, two dimensional simultaneous equations concerning $v_i$ and $\rho_i$ are set up by appropriately selecting $m-1$ equations from a set of m equations provided by equation (402) in the m-color spectrophotometric analysis. Any combination of $m-1$ equations as simultaneous equations gives the same answer.

Now, the M-color ($M \geq 4$) spectrophotometric method under illumination will be discussed.

In the five-color spectrophotometric analysis equation (407) can be used as mentioned earlier. Also, measurement can be obtained using equation (410) with respect to four colors suitably selected from five colors. Further, measurement can be obtained using equation (413) with respect to three colors suitably selected from five colors. The measured values that are obtained from these various combinations are compared, and the most plausible temperature, spectral emissivity or spectral reflectance is determined. The decision may be made based on, for instance, the average value, or a value within a highest occurrence frequency range in the measured value distribution may be selected. Measured values in low occurrence frequency ranges are regarded to be based upon a poor assumption of the value of spectral emissivity or spectral reflectance.

Figure 22:
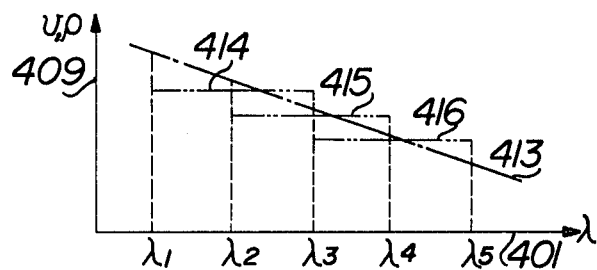
FIG. 22 is a graph showing the M-color spectrophotometric method making use of the m-color spectrophotometry according to the invention.

FIG. 22 illustrates a case wherein $m=3$ and $M=5$, i.e., the five-color spectrophotometric method making use of the three-color spectrophotometric method under illumination.

In FIG. 22, the ordinate 409 is taken for the spectral emissivity $\rho$ and spectral reflectance $\rho$, and the abscissa 409 for the effective wavelength $\lambda$. Dashed line 413 represents the distribution of, for instance, the spectral emissivity $\mu$ like the dashed line 413 in FIG. 21. Values $\lambda_1, \lambda_2, \lambda_3, \lambda_4$ and $\lambda_5$ on the abscissa axis 401 represent the effective wavelengths $\lambda$ of the respective five color filters. Broken line 414 parallel to the abscissa axis 401 represents the distribution of the spectral emissivity of a combination of the effective wavelengths $\lambda_1, \lambda_2$ and $\lambda_3$; broken line 415 represents the distribution of the spectral emissivity of a combination of the effective wavelengths $\lambda_2, \lambda_3$ and $\lambda_4$ and broken line 416 represents the distribution of a the spectral emissivity of combination of the effective wavelengths $\lambda_3, \lambda_4$ and $\lambda_5$. Similar approximation is made for the spectral reflectance. Equation (413) is used for each case. The broken lines 414, 415 and 416 thus obtained constitute as a whole a staircase-like plot with a slope close to that of broken line plot 413. This staircase-like plot is used to correct the weight $h_i$ of the spectral emissivity given by equation (401), and the calculations of the three-color spectrophotometric method under illumination are repeated. Through the repetition of these calculations the exact values of the temperature T, spectral emissivity $v$ and spectral reflectance $\rho$ can be obtained.

The features of the M-color spectrophotometric method making use of the m-color spectrophotometric method under illumination reside in the selection of effective wavelengths of the filters such that they are partially distributed to suit the measurement, and even where the spectral emissivity or spectral reflectance does not change smoothly with the effective wavelength it is possible to obtain a staircase-like measurement.

Embodiments of the measuring system based upon the method described above and applied to actual measurements will not be described.

Figure 23:
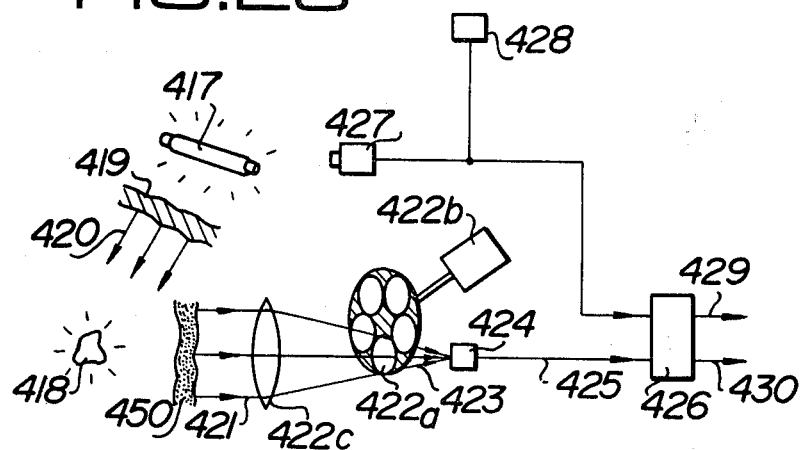
FIG. 23 shows an eighth embodiment of a basic system according to the invention.

FIG. 23 shows an eighth embodiment, which has a basic construction and in which a fluorescent light 417 is used as an illuminating light source. Designated at 418 is a specimen providing thermal radiation which may be of any shape or surface roughness. Light from the illuminating light source 417 is converted through a light-transmitting matter 419 into a light beam 420 of a spectral distribution different from the analyzed radiant flux emission of the illuminating light source itself. The light flux 421 incident upon the measuring instrument is a composite of the radiation from the specimen 418 and reflection of light 420 from the illuminating light source, the composite light being transmitted through a light-transmitting material 450 near the specimen. The light-transmitting material 450 is smoke-like in form, and surrounds the surface of the specimen 418 or material which covers the surface thereof. A monochromator 422 spectrally analyzes the light flux 421 incident on the measuring instrument to produce single spectrum 423 of each effective wavelength, which is incident on a photoelectric converter 424 and converted thereby into an electric quantity 425 which is coupled to a calculating unit 426. In the calculating unit 426, the constants $C_1$ and $C_2$, effective wavelength $\lambda_1$, spectral gain $g_i$ peculiar to the measuring instrument and weight $h_i$ of the spectral emissivity in equation (401) are memorized. Also, the calculating unit 426 includes a memory means 428 to memorize an input representing the weight $\theta_i$ of the relative spectral radiant flux intensity of the illuminating light source 417 obtained in separate measuring instrument 427 and produces from the input of the electric quantity 425 the measured value 429 of the temperature of the specimen 418 and the measured values 430 of the true spectral emissivity and true spectral reflectance thereof through the aforementioned analysis. In this embodiment, filters 422a in the monochromator 422 are successively switched by a switch 422b, and a lens 422c as light 421 incident upon the instrument to effectively reach the photoelectric converter 424.

While in this embodiment the separate measuring instrument 427 and calculator 426 are connected, it is also possible to couple the weight $\theta_i$ of the relative spectral radiant flux intensity to the calculator 426 by manual operation.

Figure 24:
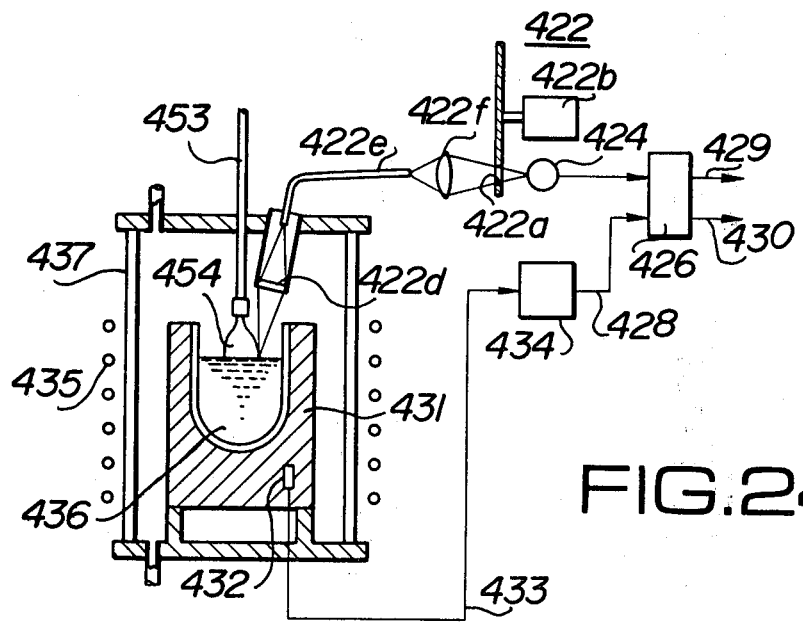
FIG. 24 shows a ninth embodiment of the system according to the invention, which uses a thermocouple for measuring the temperature of an illumination source.

FIG. 24 shows a ninth embodiment of the invention, which measures the temperature of a single crystal precipitation section of a single crystal manufacture crucible. In this embodiment, the temperature of a graphite crucible 431 which constitutes an illuminating light source is taken out as the electric power 433 generated by a thermocouple 432, and from the temperature thus obtained a calculating means 434 calculates the weight $\theta_i$ of the relative spectral radiant flux intensity in equation (401) and couples it to a calculator 426.

As a single crystal 454 attached to a rotative shaft 453 is quietly raised, molten material 436 being heated by a high frequency coil 435 is precipitated into the single crystal 454, so that the single crystal 454 grows. The crucible 431 is isolated from the atmosphere by a vessel 437.

A lens 422d, an optical-fiber cable 422e and a lens 422f act as a whole to perform the role of the lens 422c in the FIG. 23 embodiment. A filter 422a, a switch 422b, a photoelectric converter 424, a temperature measurement value 429 and values 430 of the true spectral emissivity and true spectral reflectance are the same as those of like reference numerals in FIG. 23. In this embodiment, no temperature sensing means in contact with the single crystal precipitation section such as the thermocouple is used. Also, since the operation has to be controlled by detecting sophisticated changes of temperature or spectral factor, an optical temperature such as the prior art measurement ignoring the reflected light is inconvenient. Further, the solidifying section is instable both geometrically and physically, so that the emissivity or reflectance cannot be regarded to be constant.

Figures 25, 26:
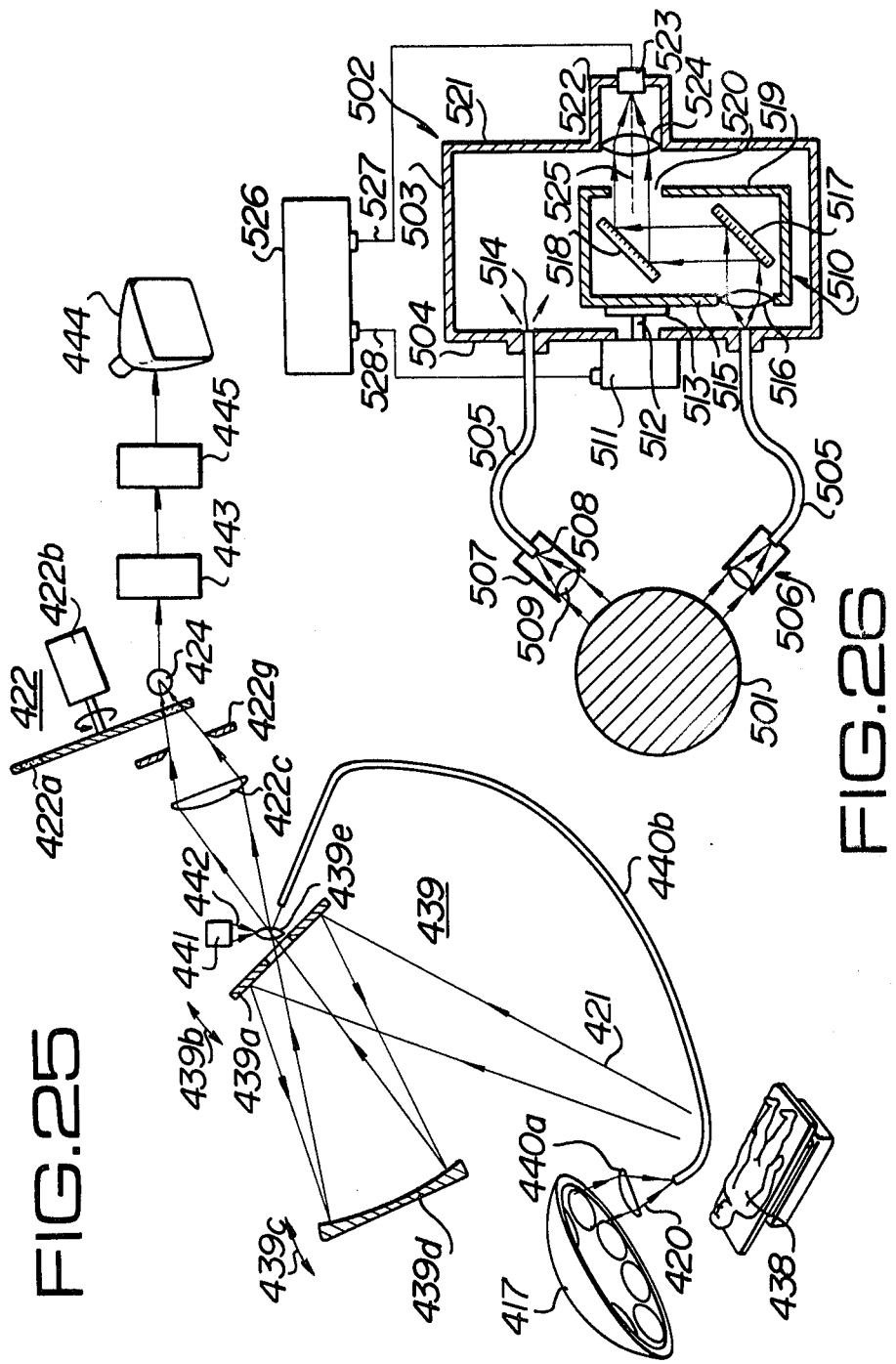
FIG. 25 shows a tenth embodiment of the system according to the invention applied to image measurement by beam scanning.
FIG. 26 is a schematic sectional view showing an eleventh embodiment of the system according to the invention.

FIG. 25 shows a tenth embodiment of the invention, which measures the temperature and the distribution of the spectral emissivity and spectral reflectance of a living body 438 under operation. In this embodiment, the optical system incorporate a beam scanning 439 for obtaining an image, and a means 440 for measuring the illuminating light and a reference temperature light source 441 are assembled in the measuring instrument.

Since the living body 438 is contaminated by blood and also its color is different in different portions, the spectral emissivity or spectral reflectance is not constant. An illuminating light source 418 is provided with means for preventing the emission of light at the effective wavelength of the measuring instrument, but this means is not perfect. A comparator mirror 439e selectively couples either the radiant flux 421 from the specimen or illuminating light 420 or reference light 422 to a spectrophotometric system 422. A calculator 443 memorizes data concerning the reference light 442 and illuminating light 420. The reference light 442 is used for checking if the measuring instrument is accurately operating. For example, for checking the spectrophotometric system 422 the sole reference light 442 is used. Alternatively, the detection of the color change of the scanning beam 439 or adjustment of the display on a receiver 444 is effected by combining the data concerning the reference light 442 and that concerning the illuminating light 420. In this embodiment, the beam scanning 439 is obtained by oscillating a mirror. More particularly, a scanning mirror 439a is oscillated in the directions of arrows 439b, while a condensing mirror 439d is oscillated in the directions 439c at right angles to the aforementioned directions, whereby the entire surface of the specimen is scanned. The illuminating light 430 is led through a lens 440a and an optical-fiber cable 440b to the comparator mirror 439e. An iris 422g adjusts image circle and light incident upon a photoelectric converter 424 to proper light dosage, and an interface 445 converts the output of the calculator 443 into a video signal for display on the receiver 444. The filter 422a, switch 422b and lens 422c are the same as those shown in FIG. 23.

While the above embodiments of FIGS. 23, 24 and 25 are examples of the on-line data processing, where it is necessary to obtain a great quantity of data at one time such as in the measurement of flame of the internal combustion engine and measurement of the earth surface by using an airplane, it is necessary to couple the measured data to the computer through spectrophotograph or magnetic tape.

Now, systems according to the invention, which enable centralized control of multiple measuring points from a single spot and also real time control of these measuring points through high speed scanning of the radiant fluxes from the individual measuring points and are also effective for any of the aforementioned methods of measurement of the temperature and spectral factor, will be described.

FIGS. 26 to 30 show respective embodiments of the invention which serve as a multi-channel radiant flux measurement instrument. More particularly, FIG. 26 shows an eleventh embodiment, which is a multi-channel radiant flux measuring system without any monochromator, and FIGS. 27 to 30 respectively show twelfth to fifteenth embodiments, which are multi-channel radiant flux measuring systems having monochromators.

Referring now to FIG. 26, which shows the eleventh embodiment of the invention, designated at 502 is a scanner which is defined by a housing 503 blocking light from the outside. A number (two in the instant embodiment) of optical-fiber cables 505 are provided to lead the radiant flux emitted from a specimen 501 to a front panel 504 of the housing 503. Each cable 505 has one end provided with a probe 506 facing the specimen 501. Each probe 506 comprises a cylindrical frame 507 having a bottom, to which the corresponding optical-fiber cable 505 is connected. Provided at the opening of the frame 507 is an objective focusing lens 509 which focuses the radiant flux from the specimen 501 on an inlet 508 of the optical-fiber cable 505 at the bottom of the frame. Each optical-fiber cable 505 is secured at the other end to the panel 504 so that the radiant flux led into it is projected from the other end into the housing 503. A scanning section 510 is disposed within the housing 503, and a scanning motor 511 is mounted on a central portion of the panel 504. The scanning section 510 is coupled to a shaft 512 of the scanning motor 511 via a support member 513 so that it can be driven for rotation by the scanning motor 511. The outlets 514 of the individual optical-fiber cables 505 connected to the panel 504 are arranged on the panel 504 at appropriate positions on a circle drawn on the panel and concentric with the shaft 512 of the motor 511. The scanning section 510 has its front plate 515 provided with a collimating lens 516 to convert the radiant flux projected from each outlet 514 into a parallel radiant flux. The distance of the center of the collimating lens 516 from the axis of the shaft 512 of the scanning motor 511 is made equal to the distance of the center of each outlet 514 from the axis of the shaft 512 so that with the rotation of the scanning section 510 each outlet 514 can be brought to a position to face the collimating lens 516. Within the scanning section 510 flat main and auxiliary reflectors 517 and 518 are provided to reflect the parallel radiant flux from the collimating lens 516. The main and auxiliary reflectors 517 and 518 and collimating lens 516 are adapted to be rotated in unison with one another with the rotation of the scanning section 510. The scanning section 510 has its rear wall 519 formed with an opening 520 behind the auxiliary reflector 518 to permit the parallel radiant flux to be led out of the scanning section 510. The housing 503 has its rear wall 521 provided with an outer projection 522. A photoelectric converter 523 is provided at the opening of the outer projection 522, and a condenser lens 524 is provided at the mouth of the outer projection. Thus, the parallel radiant flux from the auxiliary reflector 518 is focused by the condenser lens 524 on the photoelectric converter 523. The parallel radiant flux from the auxiliary reflector 518 is parallel to the optical axis 525 of the condenser lens 524, and this optical axis 525 coincides with the optical axis (not shown) of the photoelectric converter 523.

A photoelectric cable 527 connects the photoelectric converter 523 and an arithmetic processing control unit 526 and permits the electric signals obtained in the photoelectric converter 523 to be coupled to the arithematic processing control unit 526. Also, a scanning cable 528 connects the arithmetic processing control unit 526 and scanning motor 511 and permits the control of rotation of the scanning motor 511 from the arithmetic processing control unit 526.

The operation of the above construction of the eleventh embodiment of the invention will now be described.

The radiant flux from the specimen 501 is focused by the objective focusing lens 509 in each probe 506 on the inlet 508 of each optical-fiber cable 505 and led therethrough to be projected from the outlet 514 thereof and provided at the panel 504 into the housing 503. When the collimating lens 516 provided on the front wall 515 of the scanning section 510 rotated by the scanning motor 511 is brought to a position to face the outlet 514, the radiant flux projected therefrom is rendered by the collimating lens 516 into a parallel radiant flux, which is then reflected by the main and auxiliary reflectors 517 and 518 and led through the opening 520 to the outside of the scanning section 510 to be focused by the condenser lens 524 on the photoelectric converter 523. The radiant flux incident on the photoelectric converter 523 is photoelectrically converted into an electric signal which is coupled through the photoelectric cable 527 to the arithmetic processing control unit 526. The arithmetic processing control unit 526 controls the rotation of the scanning motor 511 through the scanning cable 528, thus controlling the rotation of the scanning section 510 supported by the shaft 512 of the motor 511. The collimating lens 516 is rotated in unison with the scanning section 510 controlled by the arithmetic processing control unit 526 so that it successively faces the outlets 514 of the respective optical-fiber cables 505. Thus, the radiant fluxes from the individual probes 506 are successively scanned to be coupled to the photoelectric converter 523. The arithmetic processing control unit 526 controls the scanning by the scanning section 510 in synchronism with the sampling of the electric signals coupled to it and calculates each radiant flux from the corresponding electric signal. Thus, the measurement of the radiant flux from which probe 506 is being in force can be determined. In this way, instantaneous changes of the radiant flux incident on each probe 506 can be measured.

In this eleventh embodiment, the radiant flux from the specimen 501 is measured with respect to the entire wavelength band by excluding absorption by lenses and so forth. Thus, insofar as no substantial physical and chemical changes of the measurement result from slight changes of the temperature and other variables of the specimen, this measuring instrument is very useful.

For example, it can fully meet the end of the measurement of the preheating temperature of steel pipes before welding and also measurement of the thickness distribution of heat-ray absorbing glass plate. (In the latter case of the measurement, the light intensity of the transmitted light obtained by irradiating the glass plate with heat-rays or the like may be measured.) Also, since the scanning section 510 is provided with only the collimating lens 516 and main and auxiliary reflectors 517 and 518, it can be small in size and light in weight, thus permitting fast rotary scanning and high speed measurement of a number of radiant fluxes.

Generally, the sensitivity of the photoelectric converter varies with the wavelength of the incident radiant flux, so that the photoelectric converter itself serves the role of the filter. However, a filter which transmits only a particular wavelength region of the radiant flux may be provided in series with the focusing lens 524.

Figure 27:
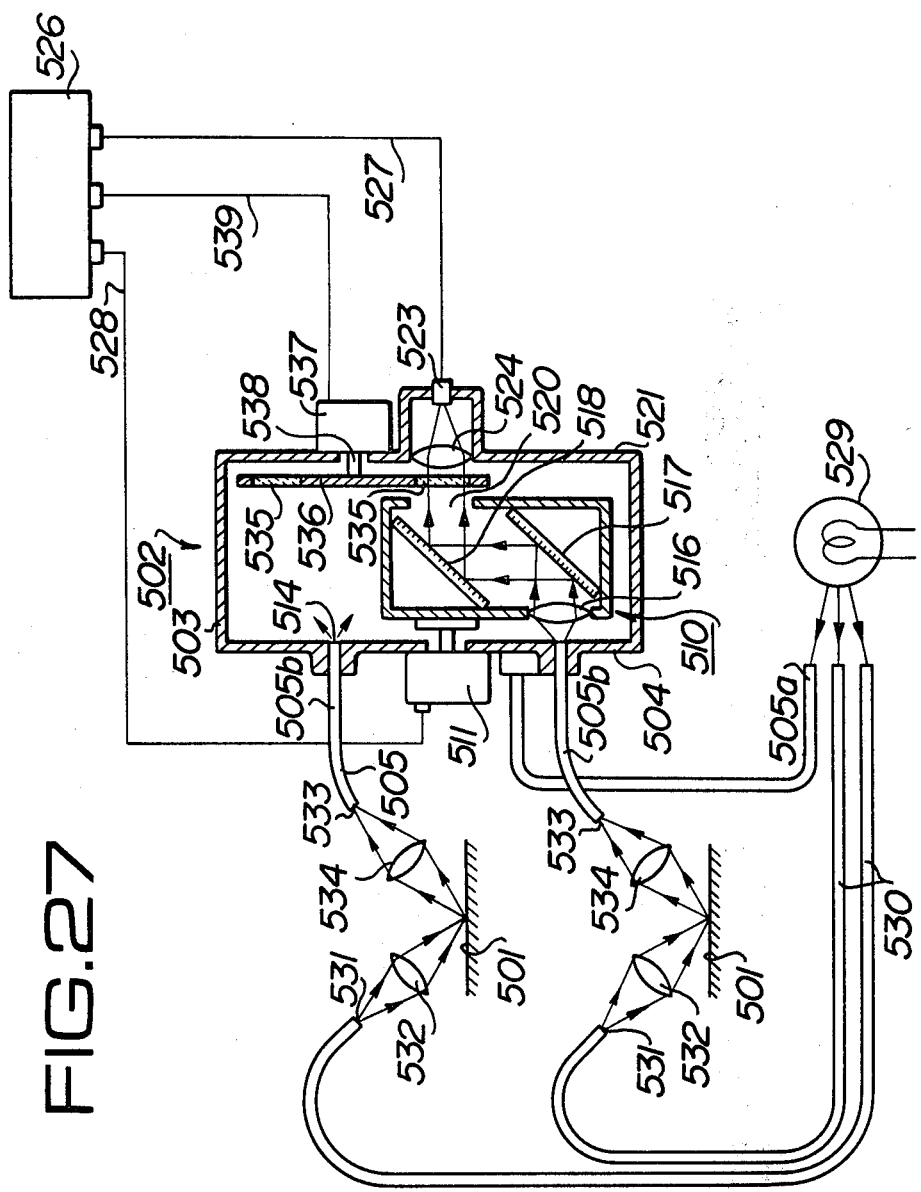
FIG. 27 is a schematic sectional view showing a twelfth embodiment of the system according to the invention.

FIG. 27 shows a twelfth embodiment of the invention, which makes spectral analysis of light reflected from a specimen illuminated from an artificial light source.

In this embodiment, scanner 502, housing 503, panel 504, outlets 514, scanning motor 511, scanning section 510, collimating lens 516, main and auxiliary reflectors 517 and 518, condenser lens 524, photoelectric converter 523, photoelectric cable 527, arithmetic processing control unit 526, scanning cable 528, and opening 520 are of the same construction and arranged in the same way as the corresponding parts in the preceding eleventh embodiment in FIG. 26.

Also, similar to the eleventh embodiment a plurality of optical-fiber cables 505 are connected to the panel 504, but one of them is a reference light optical-fiber cable 505a having one end directly facing a lamp 529 as an artificial light source. The other optical-fiber cables 505b (two cables in the illustration) serve to lead the reflected light and each has one end facing each specimen 501. Futher, optical-fiber cables 530 (two cables in the illustration) for leading illumination light to illuminate the specimens 501 are provided, each having one end disposed in the neighborhood of the lamp 529 like the reference light optical-fiber cable 505a and the other end disposed near each specimen 501. Illumination light condenser lenses 532 are each provided between an illumination light outlet 531 of each illumination light optical-fiber cable 530 and the corresponding specimen 501, and reflected light focusing lenses 534 are each provided between a reflected light inlet 533 of each reflected light optical-fiber cable 505b and the corresponding specimen 501.

A filter plate 536 carrying a plurality of filters 535 is provided as a monochromator within the housing 503. A monochromator drive motor 537 is mounted on a rear wall 521 of the housing 503, and the filter plate 536 is secured to the shaft 538 of the motor 537. The filter plate 536 extends at right angles to the parallel radiant flux from the auxiliary reflector 518 and the optical axis of the condenser lens 524 so that the parallel radiant flux from the auxiliary reflector 518 enters the filter 535 at a zero incidence angle. The filters 535 are arranged on the filter plate 536 at suitable positions on a circle concentric with the shaft 538 of the monochromator drive motor 537 and have a predetermined radius so that they can be brought to a position to transmit the parallel radiant flux from the auxiliary reflector 518. A monochromator cable 539 connects the monochromator drive motor 537 and arithmetic processing control unit 526 for permitting the control of rotation of the motor 537 by the arithmetic processing control unit 526.

The operation of the above construction of the twelfth embodiment will now be described.

The radiant flux from the lamp 529 is guided by the reference light optical-fiber cable 505a and illumination light optical-fiber cables 520. The radiant flux entering the reference light optical-fiber cable 505a is directly led up to the panel 504 and projected from the outlet 514 into the housing 503. The radiant flux entering each illumination light optical-fiber cable 530 is projected from the illumination light outlet 531 and focused by the associated illumination light condenser lens 532 on the corresponding specimen 501, and light reflected thereby is focused by the associated reflected light condenser lens 534 on the reflected light inlet 533 of the associated reflected light optical-fiber cable 505b and led therethrough to be projected from the outlet 514 thereof into the housing 503.

The scanning section 510, as in the preceding eleventh embodiment, is driven for rotation by the scanning motor 511 so that its collimating lens 516 scans the outlets 514, so that each radiant flux is rendered by the collimating lens 516 into a parallel flux which is reflected by the main and auxiliary reflectors 517 and 518 and led through the opening 520 to the outside of the scanning section 510. This parallel radiant flux is incident on a filter 535 provided on the filter plate 536, and a spectral radiant flux containing only a particular wavelength component appears from the filter and is focused by the condenser lens 524 on the photoelectric converter 523.

In this embodiment, the arithmetic processing control unit 526 synchronizes the scanning of the scanning section 510, the switching of the filters 535 and the sampling of the electric signals coupled from the photoelectric converter 523 while effecting the control of the scanning section through the scanning motor 511 and the control of the switching of the filters 535 through the monochromator drive motor 537.

In the above way, the arithmetic processing control unit 526 calculates the spectral flux intensity from the electric signals and identifies from the extent of scanning the reflected light from the specimen 501 or reference light from the lamp 529 being under measurement while identifying from the extent of switching of the filters 535 the wavelength in the analyzed radiant flux under measurement.

Thus, this embodiment of the system can measure the spectral composition or spectral distribution of the reflected light from each specimen 501 or the reference light from the lamp 529 even when each specimen 501 is unstable.

A further feature of this embodiment resides in the fact that since both the radiant flux intensity due to the reflected light from each specimen 501 and that due to reference light from the lamp 529 are coupled to the arithmetic processing control unit 526, comparison of the spectral distribution of the reflected light from the specimen 501 and that of the reference light can be obtained through calculations of the ratio between the intensity of the reflected light and that of the reference light and so forth in the arithmetic processing control unit 526.

While in the above twelfth embodiment the reflected light from the specimens 501 is measured, it is possible to modify this embodiment so as to measure light transmitted through the specimens 501 illuminated by light from the illumination light optical-fiber cables 530, and this alteration cn be readily achieved.

The specimens 501 in this embodiment may, for instance, be products being conveyed on a belt conveyor, and thus this embodiment may be adopted for a product coloring control system in a foodstuff manufacture process such as a soy manufacture process and for a fruit quality selection system. Also, in medical applications it may be employed for diagnosis apparatus such as those for measuring oxygen density of blood and monitoring a patient having jaundice.

Figure 28:
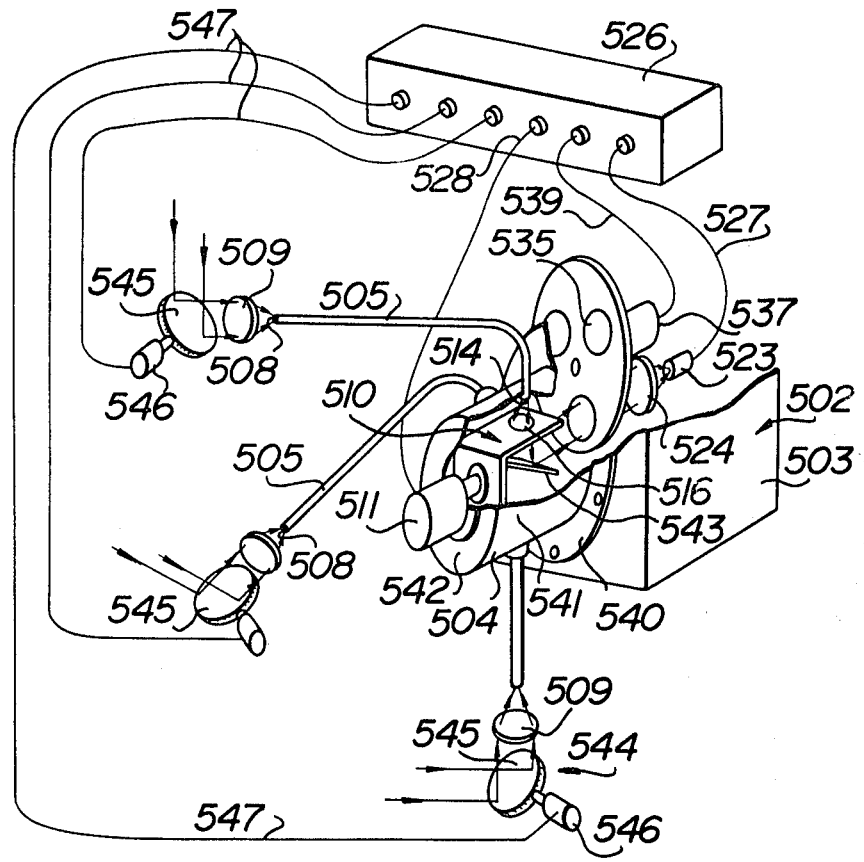
FIG. 28 is a perspective view, partly broken away, showing a thirteenth embodiment of the system according to the invention.

FIG. 28 shows a thirteenth embodiment of the invention, in which scanning mirrors are provided in probes like those shown in FIG. 27 to thereby permit supervision over a wide field.

A scanner 502 in this embodiment has substantially the same construction as that in the preceding twelfth embodiment. The main difference is that in this embodiment the panel 504 is constituted by a cylindrical body having a bottom and provided at the opening with a flange 540, and optical-fiber cables 505 are connected to its peripheral wall 541. The bottom 542 of the panel 504 is provided with a scanning motor 511, and the scanning section 510 is provided with a collimating lens 516 and a reflector 543. The distance of the collimating lens 516 from the bottom 542 is set equal to the distance of the outlet 514 of each optical-fiber cable 505 connected to the panel 504 from the bottom 542 so that the collimating lens 516 of the scanning section 510 can scan the individual outlets 514 by facing them.

In this embodiment, a scanning mirror 545 and a beam scanning motor 546 to scan the scanning mirror 545 are provided for each probe 544 (the frame thereof being not shown) which is disposed to face a corresponding specimen (only the radiant flux therefrom being shown) and a scanner cable 547 is provided to connect each beam scanning motor 546 and an arithmetic processing control unit 526 for permitting the beam scanning motor 546 to be controlled for rotation by the arithmetic processing control unit 526.

The operation of this embodiment will now be described.

Of the radiant flux emitted from each specimen and reflected by the corresponding scanning mirror 545, only the flux entering the associated objective lens 509 in the direction parallel to the optical axis thereof is focused on the inlet 508 of the associated optical-fiber cable 505. Thus, only a portion of the specimen that meets the above condition for the radiant flux is analyzed, but since the scanning mirror 545 is driven by the beam scanning motor 546, a wide field of measurement can be obtained.

As in the preceding twelfth embodiment, the radiant flux led into each optical-fiber cable 505 is led therethrough to be projected from the outlet 514 thereof into the housing 503 and rendered by the collimating lens 516 into a parallel radiant flux, which is reflected by the reflector 543 and then transmitted through a filter 535 to be focused by the condenser lens 524 on the photoelectric converter 523.

The arithmetic processing control system 526 controls the scanning of the scanning section 510 and the switching of the filters 535, and also controls the rotation of each scanning mirror 545 through the associated beam scanning motor 546. Further, it synchronizes the scanning of the scanning section 510, the switching scanning of the filters 535, the scanning of the scanning mirrors 545 and the sampling of the electric signals coupled from the photoelectric converter 523. The spectral radiant flux intensity is calculated from the corresponding sampled electric signal, and the arithmetic processing control section 526 identifies from the extent of scanning of the scanning section 510 the probe 544 under measurement and from the extent of switching of the filters 535 the wavelength of the radiant flux under measurement. Further, it identifies from the extent of scanning of each scanning mirror 545 the region of the specimen faced by the corresponding probe 544. Through the processing of information about the radiant flux obtained in the above way it is possible to obtain the spectral analysis of the specimens over a wide field range and also obtain the centralized measurement of a number of such specimens.

Thus, the system of this embodiment is very effective for systems with the aim of monitoring or controlling over a wide range, for instance the control of the growth of agricultural products, safe operation of plants, exhaust gas control and fire-prevention systems such as smoke sensors.

Figure 29:
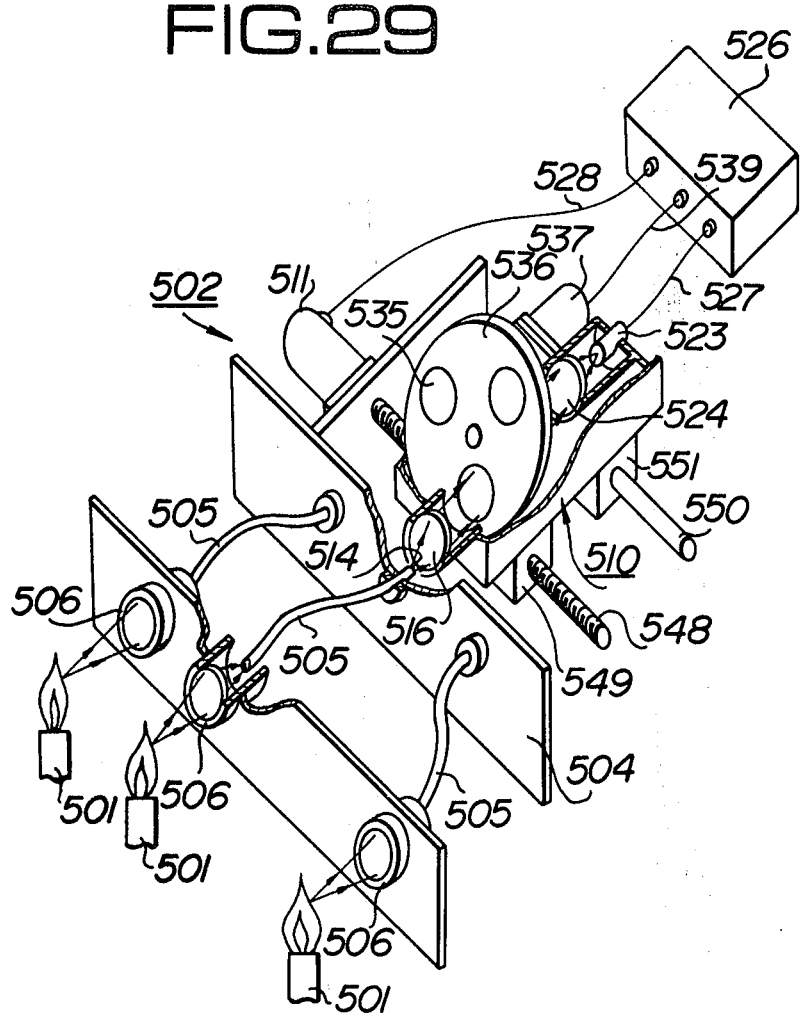
FIG. 29 is a perspective view, partly broken away, showing a fourteenth embodiment of the system according to the invention.

FIG. 29 shows a fourteenth embodiment of the invention, which measures the state of ignition of a number of burners arranged in a row in a furnace.

Designated at 501 are burners which comprise the specimen constituting the subject of measurement. Disposed to face the individual burners 501 are probes 506 each provided at one end of each associated optical-fiber cable 505, which has its other end connected to a panel 504. In this embodiment, filters 535, a monochromator drive motor 537, a condenser lens 524, a photoelectric converter 523 and a collimating lens 516 are mounted in a scanning section 510 provided in a scanner 502. A scanning motor 511 is provided with a feed screw 548 rotated thereby. The underside of the scanning section 510 is provided with a guide member 549, which has a threaded hole in mesh with the feed screw 548 and converts the rotation of the feed screw 548 into lateral movement of the scanning section 510. The underside of the scanning section 510 is also provided with a guide member 551 having a guide hole, through which the guide 550 penetrates. The guide 550, feed screw 548 and panel 504 extend parallel to one another. The individual outlets 514 of the optical-fiber cables 505 are suitably arranged on the panel 504 in a row parallel to the guide 550 so that the collimating lens 516 is brought to face the successive outlets 514 for scanning the same with the movement of the scanning section 510 along the guide 550. The monochromator drive motor 537 and photoelectric converter 523 are moved together with the scanner 510, so that sufficiently long flexible cables are used as the monochromator cable 539 and photoelectric cable 527 connected to the arithmetic processing control system 526.

The operation of this embodiment will now be described.

The radiant flux from each burner 501 is led from the corresponding probe 506 into the associated optical-fiber cable 505 and projected from the outlet 514 thereof provided on the panel 504. The scanning section 510 is caused by the feed screw 548 rotated by the scanning motor 511 to effect translational reciprocal movement, so that the outlets 514 are scanned by the collimating lens 516 provided in the scanning section 510. When the collimating lens 516 is brought to a position to face each outlet 514, the radiant flux projected from the outlet 514 is coupled through a filter 535 and the condenser lens 524 to the photoelectric converter 523. As in the preceding twelfth embodiment, the arithmetic processing unit 526 controls the scanning section 510 and filter plate 536 and synchronizes the scanning of the scanning section 510, switching of the filters 535 and sampling of the electric signal coupled to the photoelectric converter 523, and calculates the spectral radiant flux intensity. In this way, the spectral analysis of the radiant flux from each burner 501 can be obtained.

In the previous eleventh to thirteenth embodiments the outlets 514 of the optical-fiber cables 505 are arranged around a circle on the panel 504, and in this case the number of optical-fiber cables 505 connected to the panel 504 is limited. However, in the fourteenth embodiment the outlets 514 are arranged in a straight line on the panel 504, so that this embodiment is suited for dealing with a number of measuring points, and also it is possible to provide additional measuring points. In another aspect, prior-art systems for monitoring the burner flame by detecting the flame image require a number of optical-fiber cables for each burner, and also the scanning thereof is difficult. The instant embodiment of the invention, is based upon the method of monitoring the ignition state of the flame by spectrally analyzing the radiant flux and effecting the spectral analysis of the flame. (Of course each of the aforementioned optical-fiber cables 505 may consist of either a bundle of a number of thin single fibers or a single fiber covered by sheathing material such as a synthetic resin.) Thus, it is possible to readily obtain a multi-channel system.

Figure 30:
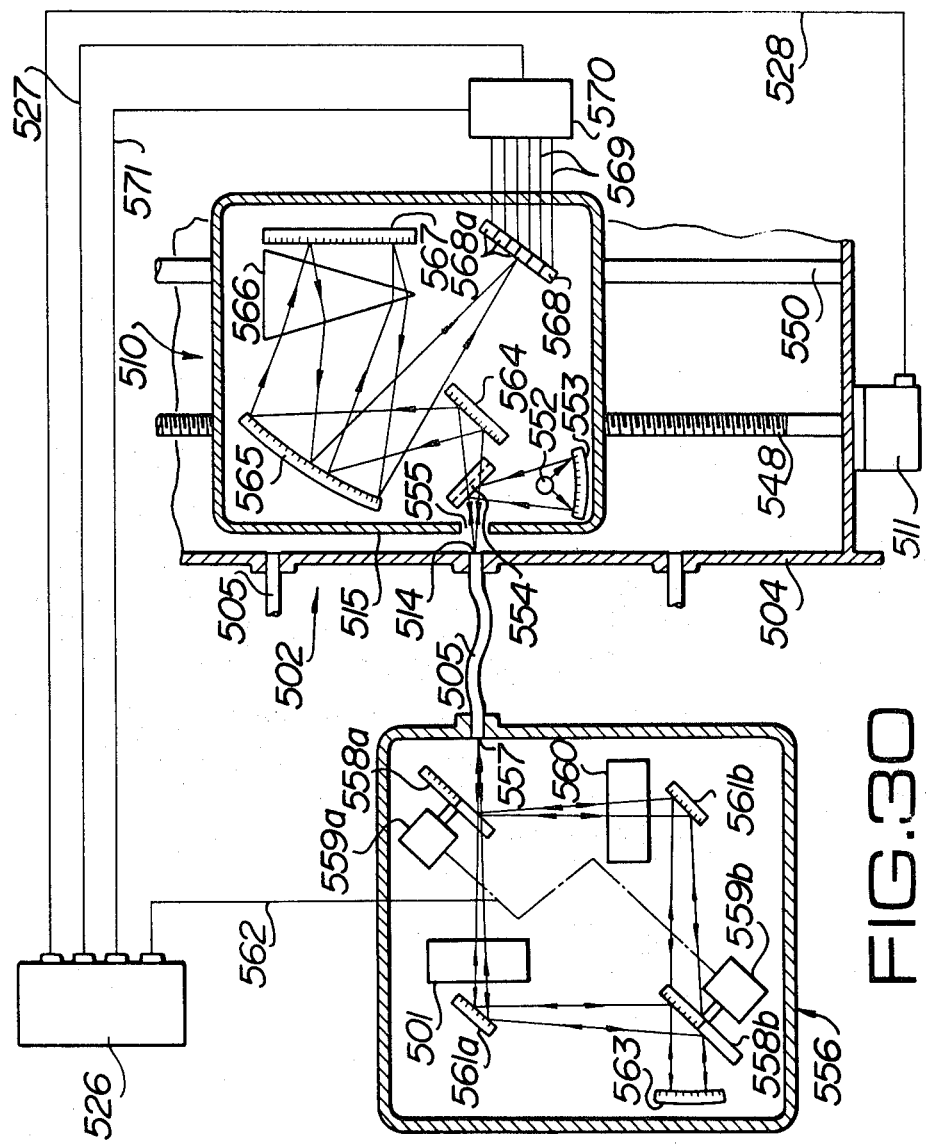
FIG. 30 is a schematic sectional view showing a fifteenth embodiment of the system according to the invention.

FIG. 30 shows a fifteenth embodiment of the invention, which provides automatic spectral analysis and control in a process of manufacture of a chemical product or the like. Also, in this embodiment a prism is used as the monochromator.

As shown in FIG. 30, designated at 502 is a scanner, at 510 a scanning section, at 511 a scanning motor, at 528 a scanning cable, at 548 a feed screw, at 550 a guide, and at 504 a panel. Similar to the preceding embodiment, the feed screw 548, guide 550 and panel 504 extend parallel to one another, and also outlets 514 on the panel 504 are in a similar arrangement. Within the scanning section 510 an artificial light source 552 is provided, and a concave surface reflector 553 is provided near the light source 552 and reflects light therefrom.

Ahead of the concave surface reflector 553 a semi-transparent mirror 554 for reflecting or transmitting the incident light depending upon the incidence angle thereof is provided. The scanning section 510 is provided in its front wall 515 with an opening 555, through which the reflected light from the concave mirror 553 and reflected through the semi-transparent mirror 554 is projected to the outside of the scanning section 510. Each optical-fiber cable 505 has one end connected to each specimen chamber 556 (only one specimen chamber being shown). In the specimen chamber 556, a sector 558*a* consisting of a circular disc with one half thereof constituting a mirror surface and the other half constituting a transparent member so that it either reflects or transmits the radiant flux projected into the specimen chamber 556 is provided near the inlet 557 of the optical-fiber cable 505, and a sector motor 559*a* for rotating the sector 558*a* is provided behind the sector 558*a*. The specimen 501 is disposed at such a position that it is irradiated by the radiant flux transmitted through the sector 558*a*, and a reference specimen 560 is disposed at such a position that it is irradiated by the radiant flux reflected by the sector 558*a*. A flat reflector 561*a* for reflecting the radiant flux transmitted through the specimen 501 is disposed behind the specimen 501, and a flat reflector 561*b* for reflecting the radiant flux transmitted through the reference specimen 560 is disposed behind the reference specimen 560. Another sector 558*b* to either reflect or transmit the radiant fluxes transmitted through the flat reflectors 561*a* and 561*b* is provided, and a sector motor 559*b* is provided behind the sector 558*b*. The two sectors 558*a* and 558*b* are set such that the sector 558*b* reflects the reflected light from the flat reflector 561*a* having been transmitted through the specimen 501 when the sector 558*a* transmits the radiant flux projected from the specimen chamber inlet 557, while sector 558*b* transmits the reflected light from the flat reflector 561*b* having been transmitted through the reference specimen 560 when the sector 558*a* reflects the radiant flux from the specimen chamber inlet 557. The sector motors 559a and 559b are driven so synchronously as to maintain the movement of both sectors 558a, 558b. A sector cable 562 connects the specimen chamber 556 and an arithmetic processing unit 526 and permits the control of rotation of the two sector motors 559a and 559b. Ahead of the sector 558b a concave reflector 563 is provided to reflect light reflected or transmitted by the sector 558b. In the scanner 502, a flat reflector 564 for reflecting the radiant flux projected from the outlet 514 on the panel 504 into the scanner 502 and transmitted through the semi-transparent mirror 554 is provided, and also a concave reflector 565 for reflecting the radiant flux from the flat reflector 564 to produce a parallel radiant flux is provided. Ahead of the concave reflector 565 a prism 566 functioning as a monochromator is provided, and a flat reflector 567 is provided near the prism 566 such as to reflect the radiant flux scattered by the prism 566 so that the reflected radiant flux enters the prism 566 again. The radiant flux obtained as a parallel flux after being dispersed twice by the prism 566 for each wavelength is reflected by the concave reflector 565 so that it is incident on a corresponding photoelectric element 568a of a photoelectric element array 568 serving as a photoelectric converter. Each photoelectric element 568a of the photoelectric element array 568 is connected to a multiplexer 570 by a photoelectric element cable 569 for transmitting an electric signal produced as a result of the incidence of the corresponding spectral radiant flux intensity. The multiplexer 570 successively switches the electric signal inputs from the respective photoelectric elements 568, and the calculator 526 and multiplexer 570 are connected by a switching cable 571, through which the arithmetic processing control unit 526 controls the switching operation. Also, the arithmetic processing control unit 526 and multiplexer 570 is connected by a photoelectric cable 527, through which the electric signal from each photoelectric element 568a selected by the switching operation of the multiplexer 570 is coupled to the arithmetic processing control unit 526.

The operation of the above construction of the fifteenth embodiment will now be described.

The scanning section 510 is fed along the guide 550 by the feed screw 548 driven by the scanning motor 511, so that the opening 555 provided in the scanning section 510 scans the individual outlets 514 on the panel 504. The radiant flux emitted from the artificial light source 552 is reflected by the concave reflector 553 and semi-transparent mirror 554 and led out through the opening 555 to the outside of the scanning section 510. When the opening 555 comes to face each outlet 514, the radiant flux projecting through the opening 555 is led into the optical-fiber cable 505. The radiant flux led into the optical-fiber cable 505 is projected from the specimen chamber inlet 557 into the specimen chamber 556. In the illustrated state of the sectors 558a and 558b, the radiant flux from the inlet 557 is transmitted through the sector 558a, transmitted through the specimen 501 while being partly absorbed thereby, reflected by the flat reflector 561a, sector 558b and concave reflector 563, then reflected again by the sector 558b and flat reflector 561a and transmitted through the specimen 501, and is led back into the optical-fiber cable 505. The radiant flux led out through the optical-fiber cable 505 proceeds through the opening 555, is transmitted through the semi-transparent mirror 554 and is reflected by the flat reflector 564 and concave reflector 565 to enter as a parallel flux into the prism 566. The dispersed radiant flux from the prism 566 is reflected by the flat reflector 567 and then dispersed again by the prism 568 into a parallel flux for each wavelength, which is then reflected by the concave reflector 565 to be focused on corresponding photoelectric element 568a of the photoelectric element array 568. In a state of the sectors 558a and 558b that result after their rotation by 180 degrees in a synchronized relation of the sector motors 559a and 559b, the radiant flux projecting from the specimen chamber inlet 557 is this time reflected by the sector 558a, transmitted through the reference specimen 560, reflected by the flat reflector 561b, transmitted through the sector 558b, reflected by the concave mirror 563 and returns along the same optical path to the optical-fiber cable 505. In this case, the transmitted radiant flux from the reference specimen 560 is measured. The arithmetic processing control unit 526 controls the rotation of the sectors 558a and 558b through the sector cable 562 and sector motors 559a and 559b, controls the scanning section 510 through the scanning motor 511 and controls the electric switching of the multiplexer 570 through the switching cable 571. Further, it controls the synchronization of the scanning of the sectors 558a and 558b, the scanning of the scanning section 510, the switching of the multiplexer 570 and the sampling of the electric signals coupled from the multiplexer 570 through the photoelectric cable 527, and it calculates the spectral radiant flux from each sampled electric signal. Further, it identifies from the extent of scanning of the scanner the radiant flux from the specimen chamber 556 under measurement, determines from the extent of scanning of the sectors 558a and 558b whether the specimen 501 or reference specimen 560 is under measurement and identifies from the extent of switching of the multiplexer 570 the wavelength of the spectral radiant flux under measurement. Thus, the analysis of the physical and chemical properties of the specimen 501 can be obtained through the comparison of the spectral characteristics of the spectral radiant fluxes from the specimen 501 and reference specimen 560. Thus, if the individual specimen chambers 556 are assumed to be respective sites of the process of manufacture of a chemical product or the like and the specimens 501 are assumed to be respective samples obtained in the individual steps of the process, the real time checking of the samples successively conveyed in the process can be obtained through spectral analysis. The photoelectric element array 568 in this embodiment may be replaced with a single photoelectric element and a slit disposed immediately therebefore so that the spectral radiant flux may be focused on the slit through rotational scanning of the prism 566. Further, while the filter and prism are employed as the monochromator in the above embodiment, it is of course possible to replace them with replica (i.e. diffraction gratings), dichroic mirrors, etc. depending upon the use.

Further, it is possible to prepare filters for a number of wavelengths and use filters suited to the individual specimens so as to be able to make measurement with respect to a large number of different specimens.

Further, while the optical-fiber cables 505 in the above embodiment are all exclusive for the system according to the invention, it is possible to commonly use a single optical-fiber cable 505 for the transmission of data in the system according to the invention and for the transmission of other information by adopting a time division system of appropriately assigning the period of processing of data in the system according to the invention by the arithmetic processing control unit 526 and the period of processing of other data if a means for preventing "crosstalk" is provided.

Now, an embodiment of the spectral analysis system, in which constant wavelength ratios of analyzed radiant fluxes can be held by maintaining the relationship among the wavelengths of the spectral radiant fluxes with the same interference filter, will be described. As mentioned hereinabove when the specimen in the three-color spectrophotometric analysis is regarded as a graybody, no error is produced if the three wavelengths are set to meet conditions $1/\lambda_1 - 1/\lambda_2 = 1/\lambda_2 - 1/\lambda_3$ and $\lambda_3 = \infty$, that is a relation $\lambda_2 = 2\lambda_1$, and with this spectral analysis system such selection of wavelengths can be readily made.

Figure 31:
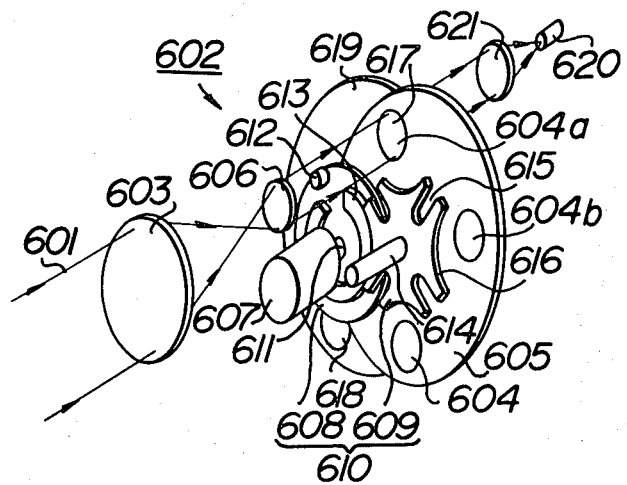
FIG. 31 is a schematic perspective view showing a sixteenth embodiment of the system according to the invention.

FIG. 31 shows a sixteenth embodiment of the invention which makes rough spectral analysis by using cut filters.

In FIG. 31, designated at 601 is the radiant flux incident on the spectral analysis system 602. An objective lens 603 incident is provided within a casing (not shown) defining the spectral analysis system 602. A cut filter disc 605 carrying a plurality of cut filters 604 to effect rough analysis of the radiant flux introduced from the objective lens 603 into the casing is provided to extend perpendicular to the optical axis of the objective lens 603.

The cut filters 604 transmit only one of a plurality of transmission bands of interference film filters and block all the other bands of the spectral radiant flux as will be described hereinbelow. For each interference film filter the plurality of cut filters 604 are provided on the cut filter disc 605. Between the objective lens 603 and cut filter disc 605 is provided a collimating lens 606 for rendering the radiant flux from the objective lens 603 into a parallel radiant flux incident on the cut filter plate 605 at right angles thereto, lens 606 being disposed such that its optical axis coincides with the optical axis of the objective lens 603. A mechanism for causing intermittent rotation of the cut filter disk 605 is constituted by a motor 607, a drive wheel 608 and a driven wheel 609 (these wheels constituting a Zeneva gear means 610). The drive wheel 608 is provided on the side thereof closest to the motor 607 with a pin 612 and a ring-like guide plate 613. The driven wheel 609 is coupled to a shaft 614 of the cut filter disc 605, and the shaft 614 is supported in a bearing (not shown). The driven wheel 609 is provided with a plurality of (four in the illustration) engagement notches 615 uniformly spaced apart in the circumferential direction and extending in the radial direction such that the pin 612 can engage with the driven wheel 609. Driven wheel 609 also has arcuately concave peripheral portions 616 each defined between adjacent engagement notches 615 such that the guide plate 613 can be rotated in frictional contact with these portions 616. The cut filters 604 are arranged on the cut filter disc 605 at positions on a circle concentric with the shaft 614 and at a predetermined angle with respect to the respective engagement notches 615 in the driven wheel 609 so that the cut filters 604 can be successively brought to a position 617, at which the parallel radiant flux from the collimating lens 606 illuminates the cut filter disc 605. In the illustrated embodiment, the engagement notches 615 are four in number, so that four cut filters 604 can be provided. Immediately behind the cut filter disc 605 an interference film filter disc 619 carrying interference film filters 618 is provided parallel to the cut filter disc 605 so that the interference film filters 618 and cut filters 604 can overlap one another. Behind the illumination position 617 a photoelectric converter 620 is provided to convert the spectral radiant flux transmitted through a cut filter 604 and an interference film filter 618 when these filters are brought to overlap each other into an electric signal, and between the interference film filter disc 619 and photoelectric converter 620 a condenser lens 621 to focus the spectral radiant flux on the photoelectric converter 620 is provided such that its optical axis coincides with that of the collimating lens 606. In this embodiment, the plurality of cut filters 604 provided on the cut filter disc 605 constitute the rough spectral analysis means, and the motor 607 and Zeneva gear means 610 constitute the switching means.

Now, the operation of this embodiment will be described.

The incident radiant flux 601 incident on the monochromator 602 is focused by the objective lens 603 and rendered by the collimating lens 606 into a parallel radiation flux to illuminate the illumination position 617 of the cut filter disc 605. The drive wheel 608 of the Zeneva gear means 610 is driven for rotation by the motor 607, whereby the pin 612 provided on the drive wheel 608 is rotated to cause intermittent rotation of the driven wheel 609 by engaging in the engagement notches 615 of the driven wheel 609. In the illustrated embodiment, with one rotation of the drive wheel 608 the driven wheel 609 is rotated by 90° in the opposite direction to the drive wheel 608. The guide plate 613 guides the pin 612 into the notches 615 while restricting the rotation of the driven wheel 609 in frictional contact with the arcuately concave peripheral portions 616 of the driven wheel 609. With the rotation of the driven wheel 609 the cut filter disc 605 is also rotated in unison therewith, so that the individual cut filters 604 are successively brought to the illumination position 617. Meanwhile, the interference film filters 618 on the interference film filter disc 619 are successively brought to a position behind the illumination position 617 to overlap a cut filter 604 found thereat. When an interference film filter 618 is brought to the position behind the illumination position 617 while a cut filter 604a, which effects rough spectral analysis by transmitting only wavelengths in the neighborhood of one of a plurality of transmission bands of different degrees, for instance the first-degree band of that interference film 618 while blocking all the other bands of the spectral radiant flux, is brought to the illumination position 617, the incident radiant flux 601 is rendered to spectrum containing only the first-degree transmission band of the interference film filter 618. Likewise, when an interference film filter 618 is brought to the position behind the illumination position 617 while a cut filter 604a, which transmits only the spectral band of wavelength near the second-degree band of the interference film filter 618 from the radiant flow, is brought to the position of the illumination position 617, the incident radiant flux 601 is spectrally analyzed to a flux containing only the second-degree band of the interference film filter 618.

As the cut filters 604, 604b, . . . are successively brought to the illumination position, spectral radiant fluxes each containing a band of a particular degree of the interference film filter 618, can be obtained. When a different interference film filter 618 is brought to the position behind the illumination position 617 with the rotational scanning of the interference film filter disc 619, with the scanning of the successive cut filters 604, each of which transmits only a band of a particular degree while blocking the bands of the other degrees of that interference film filter 618, to the illumination position, successive spectral radiant fluxes each containing only the band of a particular degree of that interference film filter 618 are obtained in the manner as described above. Each radiant flux obtained in the above way is focused by the condenser lens 621 on the photoelectric converter 620.

By connecting a calculator, which controls the rotation of the motor 607, connecting the calculator and the photoelectric converter 620 for coupling electric signals produced by the photoelectric converter 620 from the individual spectral radiant fluxes and permitting the calculator to control the rotation of the cut filter disc 605 and interference film filter disc 619 while synchronizing these scanning controls and the sampling of the electric signals coupled to the calculator, it is possible to obtain the spectral data concerning the incident radiant flux 601.

The Zeneva gear means 610 in the above embodiment may be omitted, if a motor which is driven synchronously with the motor 607 is installed to drive cut filter disc 605.

Figure 32:
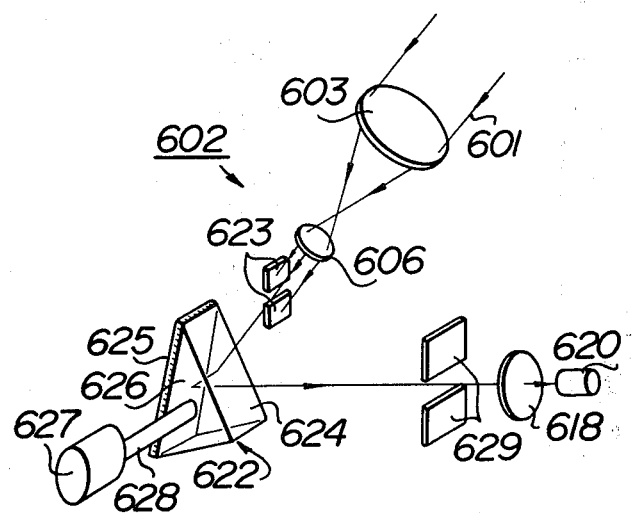
FIG. 32 is a schematic perspective view showing a seventeenth embodiment of the system according to the invention.

FIG. 32 shows a seventeenth embodiment of the invention, which uses a prism for the rough analysis.

In FIG. 32, designated at 601 is the incident radiant flux, at 603 an objective lens, and at 606 a collimating lens. These lenses are of the same construction and arrangement as those in the preceding sixteenth embodiment. Behind the collimating lens 606 a prism 622 for effecting rough analysis by scattering the parallel radiant flux from the collimating lens 606 is provided, and an inlet slit 623 for rendering the parallel radiant flux from the collimating lens 606 into a narrow flux is provided between the prism 622 and collimating lens 606. The prism 622 is provided on its side facing its incidence surface 624, on which the narrow parallel radiant flux from the inlet slit 623 is incident, with a reflecting surface 625 to reflect the radiant flux entering it. Also, one side of the prism 622 defined between the incidence surface 624 and reflection surface 625, referred to here as motor side 626, is provided with a prism drive motor 627 to rotate the prism 622. The prism drive motor 627 has its shaft 628 coupled to the motor side 626 at right angles thereto. The prism 622 is orientated such that its motor side 626 is parallel to the parallel radiant flux from the inlet slit 623. Ahead of the incidence surface 624 of the prism 622 an outlet slit 629 is provided to selectively pass only a particular wavelength band of the radiant flux incident on and scattered by the prism 622. Behind the outlet slit 629 an interference film filter 618 is provided to extend parallel thereto, and behind the interference film filter 618 a photoelectric converter 620 is provided for converting the spectral radiant flux transmitted through the interference film filter 618 into an electric signal. In this embodiment, the prism 622, inlet slit 623 and outlet slit 629 constitute the rough spectral analysis means, and the prism drive motor 627 constitutes the switching means.

The operation of this seventeenth embodiment will now be described.

The incident radiant flux 601 is focused by the objective lens 603 and then rendered by the collimating lens 606 into a parallel radiant flux, which is then rendered by the inlet slit 623 into a narrow parallel radiant flux which is in turn incident on the incidence surface 624 of the prism 622. The radiant flux incident on the prism 622 is dispersed thereby, and after reflection by the reflecting surface 625 it is dispersed again before emanating from the prism 622 at the incidence surface 624 thereof. The radiant flux dispersed by the prism 622 and projecting from the incidence surface 624 thereof has different angles of projection from the incidence surface 624 with the wavelength. Thus, the radiant flux passed through the slit 629 is a spectral radiant flux containing only a particular wavelength band of the radiant flux projected from the prism 622, and with the rotation of the prism 622 caused by the prism drive motor 627 the wavelength band of the spectral radiant flux passing through the outlet slit 629 may be progressively shifted toward the short or long wavelength side. Thus, by previously measuring the wavelength band of the radiant flux passing through the outlet slit 629 for each position of the prism 622 and by scanning the prism 622 to its successive rotational positions of measured wavelengths with the prism drive motor 627 it is possible to permit roughly analyzed radiant flux having a wavelength in the neighborhood of the transmission band of a particular degree of the interference film filter 618 to enter the interference film filter 618. Each roughly analyzed radiant flux, after being transmitted through the interference film filter 618, thus contains only the band of a particular degree of the interference film filter 618, so that it can be converted by the photoelectric converter 620 into an electric signal.

By connecting a calculator, which controls the rotation of the prism drive motor 627, to the prism drive motor 627, connecting the photoelectric converter 620 to the calculator and permitting the calculator to effect control of the synchronization of the scanning of the prism 622 and the sampling of the electric signals coupled from the photoelectric converter 620 to it, it is possible to measure successive radiant fluxes containing only particular bands of the incident radiant flux of particular degrees of the interference film filter 618. Further, the prism drive motor 627 may be provided with a speed reduction mechanism such as a sine-bar mechanism.

Further, while the above embodiment employs the cut filters 604 and prism 622, it is of course possible to use diffraction gratings, dichroic mirrors, etc. Furthermore, where the chromatic aberration or absorption of a lens constitutes the subject of measurement, it is possible to replace the objective lens 603 with a Cassigrain reflector and omit the collimating lens 606.

I claim:
1. A method of measuring the temperature and a spectral factor of a specimen, comprising the steps of:
spectrally separating a radiant flux from said specimen with respect to effective wavelengths for n ($n \geq 3$) different channels;
converting the intensities of the respective spectrally separated radiant fluxes into corresponding electric detection values;
obtaining electric values for effective wavelengths for m ($n \geq m \geq 3$) different channels selected from said electric values for effective wavelengths for n channels;
approximating spectral factors with respect to said effective wavelengths for said m different channels with an (m−2)-th order polynomial representing the effective wavelengths, thereby obtaining the temperature of said specimen from said electric detection values for said effective wavelengths for said m different channels; and obtaining the spectral factor of said specimen from said obtained temperature and said electric detection values for said effective wavelengths for m channels.

2. A method of measuring the temperature and a spectral factor of a specimen according to claim 1, wherein:

said effective wavelengths for said m different channels are selected so as to hold the relation:

$$\frac{1}{\lambda_i} - \frac{1}{\lambda_{i+1}} = C$$

(wherein C is a constant and i=1, 2, ..., m−1) among said effective wavelengths for said m different channels.

3. A method of measuring the temperature and a spectral factor of a specimen according to claim 1, wherein:

the temperature of said specimen is obtained from a plurality of temperature values obtained for respective sub-groups of m different channels selected from said n channels; and said spectral factor of said specimen is obtained from said obtained temperature and said electric detection values.

4. A method of measuring the temperature and a spectral factor of a specimen illuminated by light of known spectral radiant flux distribution, comprising the steps of:

spectrally separating a radiant flux from said specimen with respect to effective wavelengths for n (5≧n≧3) different channels;

converting the intensities of the respective spectrally separated radiant fluxes into corresponding electric detection values;

obtaining electric detection values for effective wavelengths for m (n≧m≧3) different channels selected from said electric detection values for effective wavelengths for said n different channels;

approximating the spectral emissivity and spectral reflectance of said specimen for each of said effective wavelengths for said m different channels as polynomials of the effective wavelength containing m−1 parameters, thereby obtaining the temperature of said specimen from said electric detection values for the effective wavelengths for said m different channels; and obtaining the spectral emissivity and spectral reflectance of said specimen for each of said effective wavelengths for said m different channels from said obtained temperature and said electric detection values.

5. A method of measuring the temperature and a spectral factor of a specimen according to claim 4, wherein:

the temperature of said specimen is obtained from a plurality of temperature values obtained for respective sub-groups of m channels selected from said n different channels, and the spectral emissivity and spectral reflectance of said specimen are obtained from said obtained temperature and said electric detection values.

6. A method of measuring the temperature and a spectral factor of a specimen according to claim 4, wherein:

in said approximating step the spectral emissivity and spectral reflectance are approximated with a linear function of the effective wavelength for m=5.

7. A method of measuring the temperature and a spectral factor of a specimen according to claim 4, wherein:

in said approximating step the spectral emissivity and spectral reflectance are approximated one as a linear function of the effective wavelength and the other as a constant for m=4.

8. A method of measuring the temperature and a spectral factor of a specimen according to claim 4, wherein:

in said approximating step the spectral emissivity and spectral reflectance are approximated by a respective constant for m=3.

9. A method of measuring the temperature and a spectral factor of a specimen, comprising the steps of:

spectrally separating a radiant flux from said specimen with respect to effective wavelengths for n (n≧3) different channels;

converting the intensities of the respective spectrally separated radiant fluxes into corresponding electric detection values;

obtaining a plurality of effective wavelength sets each including two different effective wavelengths selected from the effective wavelengths corresponding to said electric detection values;

setting the ratio between the spectral factors for said two effective wavelengths in each said set to unity;

obtaining the temperature for each said set from the ratio between the two electric detection values corresponding to the effective wavelengths in each said set;

obtaining an average temperature from said obtained temperature for the respective sets;

obtaining the temperature distribution and the spectral factor for each of the effective wavelengths from said average temperature;

comparing said temperature distribution with a preset value; and selecting said average temperature and spectral factor as the temperature and spectral factor of said specimen if said temperature distribution value is less than said preset value, and if said temperature distribution value is greater than said preset value, repeating said step wherein the temperature for each set is obtained from the ratio between the two electric detection values corresponding to the effective wavelengths in each set, by setting a new spectral factor ratio for each of said sets on the basis of said spectral factor obtained in said step wherein said temperature distribution is obtained.

10. A method of measuring the temperature and spectral factor of specimens of N different types, comprising the steps of:

receiving radiant fluxes from specimens of N different types as a single radiant flux and spectrally separating said single radiant flux with respect to effective wavelengths for M (M 2 N) different channels so as to satisfy a relation:

$$\frac{1}{\lambda_i} - \frac{1}{\lambda_{i+1}} = C$$

(wherein C is a constant and i = 1, 2, ..., 2 N−1) for each of adjacent 2 N effective wavelengths of M different effective wavelengths;

converting the intensities of the individual spectrally separated radiant fluxes into respective electric detection values;

obtaining the temperatures of the specimens of said N different types from the electric detection values for the effective wavelengths for the 2 N different channels by regarding the specimens of said N different types as graybodies and using the relation:

$$\frac{1}{\lambda_i} - \frac{1}{\lambda_{i+1}} = C;$$

obtaining the spectral factor of each of said specimens of said N different types from said obtained temperatures and said electric detection values; and obtaining the temperatures and spectral factors of said specimens from said electric detection values by expressing the spectral factors of said specimens as polynomials and employing said obtained spectral factors by regarding the specimens of said N different types as graybodies as approximations to said polynomials and said obtained temperatures by regarding the specimens of said N different types as graybodies as approximations to the temperatures of said specimens.

* * * * *